(12) United States Patent
Kahn et al.

(10) Patent No.: US 10,187,115 B2
(45) Date of Patent: Jan. 22, 2019

(54) SYSTEMS AND METHODS FOR DC POWER LINE COMMUNICATION IN A PHOTOVOLTAIC SYSTEM

(71) Applicant: Maxim Integrated Products, Inc., San Jose, CA (US)

(72) Inventors: Seth M. Kahn, San Francisco, CA (US); Charles J. Razzell, Pleasanton, CA (US); Vincent W. Ng, Milpitas, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/433,958

(22) Filed: Feb. 15, 2017

(65) Prior Publication Data

US 2017/0163311 A1    Jun. 8, 2017

Related U.S. Application Data

(63) Continuation-in-part of application No. 15/209,124, filed on Jul. 13, 2016.

(Continued)

(51) Int. Cl.
*H04B 3/54* (2006.01)
*G05F 5/00* (2006.01)
(Continued)

(52) U.S. Cl.
CPC .............. *H04B 3/548* (2013.01); *G05F 5/00* (2013.01); *H02S 40/34* (2014.12); *H04B 3/542* (2013.01);
(Continued)

(58) Field of Classification Search
None
See application file for complete search history.

(56) References Cited

U.S. PATENT DOCUMENTS

| 7,068,017 B2 | 6/2006 | Willner et al. |
| 7,719,140 B2 | 5/2010 | Ledenev et al. |

(Continued)

FOREIGN PATENT DOCUMENTS

| WO | 2011/019936 A1 | 2/2011 |
| WO | 2012/109426 A2 | 8/2012 |
| WO | 2014/080337 A2 | 5/2014 |

OTHER PUBLICATIONS

Final Office Action in U.S. Appl. No. 15/209,124, dated Oct. 31, 2017, 27 pages.

(Continued)

*Primary Examiner* — Curtis King
(74) *Attorney, Agent, or Firm* — Lathrop Gage LLP

(57) ABSTRACT

A method for direct current power line communication in a photovoltaic system includes (a) transferring power between at least one photovoltaic device and a load using a power line, (b) maintaining a magnitude of a current flowing through the power line above a threshold value in a normal operating mode of the photovoltaic system, (c) detecting a change in operation of the power line in response to magnitude of a direct current component of the current flowing through the power line falling below the threshold value, and (d) in response to the detected change in operation of the power line, decoding operating state of the power line to obtain information.

11 Claims, 36 Drawing Sheets

Related U.S. Application Data

(60) Provisional application No. 62/191,945, filed on Jul. 13, 2015.

(51) Int. Cl.
  *H02S 40/34* (2014.01)
  *H04Q 9/00* (2006.01)
  *H02J 3/38* (2006.01)

(52) U.S. Cl.
  CPC .............. *H04B 3/546* (2013.01); *H04Q 9/00* (2013.01); *H02J 3/385* (2013.01); *H04B 2203/5412* (2013.01); *H04Q 2209/30* (2013.01); *H04Q 2209/823* (2013.01); *Y02E 10/58* (2013.01)

(56) References Cited

U.S. PATENT DOCUMENTS

| | | | |
|---|---|---|---|
| 8,013,472 B2 | 9/2011 | Adest et al. | |
| 8,035,249 B2 | 10/2011 | Shaver, II et al. | |
| 8,044,648 B1 | 10/2011 | Kahn et al. | |
| 8,274,172 B2 | 9/2012 | Hadar et al. | |
| 8,427,009 B2 | 4/2013 | Shaver, II et al. | |
| 8,531,055 B2 | 9/2013 | Adest et al. | |
| 8,587,151 B2 | 11/2013 | Adest et al. | |
| 8,669,675 B2 | 3/2014 | Capp et al. | |
| 8,816,535 B2 | 8/2014 | Adest et al. | |
| 8,872,384 B2 | 10/2014 | Stratakos et al. | |
| 8,947,194 B2 | 2/2015 | Sella et al. | |
| 8,970,161 B1* | 3/2015 | Cuadros | H02J 7/0068 320/101 |
| 8,981,707 B1* | 3/2015 | Buuck | H02J 3/385 320/101 |
| 9,035,626 B2 | 5/2015 | Stratakos et al. | |
| 9,112,379 B2 | 8/2015 | Sella et al. | |
| 9,401,599 B2 | 7/2016 | Har-Shai et al. | |
| 9,438,035 B2 | 9/2016 | Capp et al. | |
| 9,590,526 B2 | 3/2017 | Adest et al. | |
| 9,620,956 B2 | 4/2017 | Jankowski | |
| 2003/0234038 A1* | 12/2003 | Kurokami | H01L 31/0687 136/255 |
| 2008/0122518 A1* | 5/2008 | Besser | H02J 3/382 327/518 |
| 2008/0247201 A1* | 10/2008 | Perol | B64G 1/443 363/73 |
| 2010/0002470 A1* | 1/2010 | Kiamilev | G05F 1/67 363/16 |
| 2010/0106438 A1* | 4/2010 | Fornage | G05F 1/67 702/64 |
| 2010/0253151 A1* | 10/2010 | Gerhardinger | G05F 1/67 307/82 |
| 2010/0259931 A1 | 10/2010 | Chemel | |
| 2010/0301991 A1 | 12/2010 | Sella et al. | |
| 2011/0013432 A1* | 1/2011 | Wagoner | H02J 3/383 363/95 |
| 2011/0067750 A1 | 3/2011 | Ueda | |
| 2011/0084557 A1* | 4/2011 | Ger | H02J 3/383 307/82 |
| 2012/0187106 A1* | 7/2012 | Ashkenazy | F24D 11/004 219/438 |
| 2012/0193986 A1* | 8/2012 | Easwaran | G05F 1/67 307/63 |
| 2012/0235486 A1* | 9/2012 | Li | H02J 3/385 307/64 |
| 2012/0326512 A1 | 12/2012 | Yokoyama et al. | |
| 2013/0009483 A1 | 1/2013 | Kawate et al. | |
| 2013/0057225 A1* | 3/2013 | Celani | H02J 7/0083 320/153 |
| 2013/0181527 A1* | 7/2013 | Bhowmik | H02M 7/44 307/63 |
| 2014/0103723 A1* | 4/2014 | Jergovic | H02J 3/385 307/43 |
| 2014/0103891 A1* | 4/2014 | Stratakos | G05F 1/67 323/271 |
| 2014/0152107 A1* | 6/2014 | Shimada | G05F 1/67 307/52 |
| 2014/0184137 A1* | 7/2014 | Huang | H02J 3/385 320/101 |
| 2014/0285010 A1* | 9/2014 | Cameron | H02J 1/14 307/29 |
| 2014/0327313 A1* | 11/2014 | Arditi | H01L 31/02021 307/63 |
| 2015/0028679 A1* | 1/2015 | Francescutto | H02J 3/383 307/63 |
| 2015/0097429 A1* | 4/2015 | Takenaka | H02J 7/35 307/22 |
| 2015/0144176 A1* | 5/2015 | Chang | H02J 3/383 136/244 |
| 2015/0188415 A1* | 7/2015 | Abido | H02M 3/005 307/103 |
| 2015/0222170 A1* | 8/2015 | Berger | H02M 1/44 363/40 |
| 2015/0333503 A1* | 11/2015 | Bermingham | H02H 7/268 361/62 |
| 2015/0381108 A1 | 12/2015 | Hoft et al. | |
| 2016/0006392 A1 | 1/2016 | Hoft | |
| 2016/0179116 A1* | 6/2016 | Bacque | G05F 1/625 700/298 |
| 2016/0195284 A1* | 7/2016 | Chaudhry | F24H 1/202 392/449 |
| 2016/0197575 A1* | 7/2016 | Armstrong | H02S 30/20 320/101 |
| 2016/0246320 A1* | 8/2016 | Chang | G05F 1/67 |
| 2016/0308365 A1 | 10/2016 | Mayer et al. | |
| 2016/0322827 A1* | 11/2016 | Gupta | H02M 3/04 |
| 2017/0150241 A1* | 5/2017 | Collin | H04Q 9/14 |
| 2017/0271973 A1* | 9/2017 | Jones | H02J 3/383 |
| 2017/0294780 A1* | 10/2017 | Adest | H02J 3/385 |
| 2017/0302102 A1* | 10/2017 | Teggatz | H02J 7/35 |
| 2018/0013286 A1* | 1/2018 | Bacque | H02J 3/24 |

OTHER PUBLICATIONS

International Search Report with Written Opinion corresponding to International Patent Application No. PCT/US2016/042042, dated Oct. 27, 2016, 7 pages.
Office Action corresponding to U.S. Appl. No. 15/209,124, dated Apr. 21, 2017.
Office Action dated Apr. 5, 2018 for U.S. Appl. No. 15/209,124.
Notice of Allowance dated Mar. 2, 2018 for U.S. Appl. No. 15/209,124.

* cited by examiner

SYSTEMS AND METHODS FOR DC POWER LINE COMMUNICATION IN A PHOTOVOLTAIC SYSTEM

RELATED APPLICATIONS

This application is a continuation in part of U.S. patent application Ser. No. 15/209,124, filed Jul. 13, 2016, which claims benefit of priority to U.S. Provisional Patent Application Ser. No. 62/191,945, filed Jul. 13, 2015. Each of the aforementioned applications is incorporated herein by reference.

BACKGROUND

Photovoltaic cells are often used to recharge batteries, or to provide power to an electric grid and/or a building through an inverter. Photovoltaic cells often, however, provide less output power than expected from known device efficiency and illumination.

One reason that photovoltaic cells may deliver less than optimum power is that their maximum power output under typical conditions is often at a voltage that is not well matched to their load. This mismatch occurs, in part, because typical photovoltaic cells are temperature sensitive, and a sufficient quantity of photovoltaic cells must be connected in series to provide required voltage magnitude at high temperatures. This large photovoltaic cell count becomes excessive at low temperatures where photovoltaic cells' maximum power output voltage is highest. Similarly, maximum power output voltage may change with illumination changes. Other losses occur when any one series-connected photovoltaic cell in a module of interconnected photovoltaic cells ("photovoltaic module") generates less current than other photovoltaic cells in the photovoltaic module. Barring additional circuitry, the output current of a series string of photovoltaic cells is effectively limited by photocurrent produced in the weakest, or most shaded, cell.

Since shading affects photocurrent produced in photovoltaic cells, often limiting current production of a series string of cells to that of a most-shaded cell of the string, un-shaded cells in the same series string may yield substantially less power than they are otherwise capable of. Further, shading of cells may vary with time of day, sun angle, obstruction position, and even the position of wind-blown leaves or other debris on a photovoltaic panel.

Maximum Power Point Tracking (MPPT) controllers are frequently connected between a photovoltaic module and a load, such as an inverter or a battery. MPPT controllers typically include a switching circuit, such as a buck DC-to-DC converter, that converts an input power at a module voltage to an output power for the load at a load voltage, and control circuitry that seeks to find a module voltage at which the photovoltaic module produces maximum power. The switching circuit of the MPPT controller serves to decouple the photovoltaic module and load voltages. Some examples of MPPT controllers and associated systems and methods are discussed in U.S. Patent Application Publication Nos. 2012/0043818, 2012/0043823, and 2012/0044014 to Stratakos et al., which are incorporated herein by reference.

Many photovoltaic system applications require communication between system components. For example, safety requirements may necessitate that MPPT controllers be capable of being remotely disabled. As another example, MPPT controllers may need to communicate status information to a central device for photovoltaic system monitoring. Accordingly, conventional MPPT controllers are frequently capable of communicating with a remote device using radio frequency ("RF") networking or power line communication ("PLC") networking. Both RF and PLC networking systems transmit data by generating a high frequency carrier wave, modulating the carrier wave, transmitting the carrier wave over a medium, and demodulating the carrier wave. Consequentially, RF and PLC networking systems require high frequency transceivers, as well as modulating and demodulating equipment. The transmission medium in RF networking systems is typically air, while the transmission medium in PLC networking systems is a power line. It is important to note that PLC networking operates on top of power delivery and distribution across a power line, and PLC networking typically does not disturb power delivery through the power line.

SUMMARY

In an embodiment, a method for direct current power line communication in a photovoltaic system includes (a) transferring power between a photovoltaic device and a load using a power line, (b) detecting a change in operation of the power line, and (c) in response to the detected change in operation of the power line, decoding operating state of the power line to obtain information.

In an embodiment, a method for direct current power line communication in a photovoltaic system includes (a) transferring power between a photovoltaic device and a load using a power line, (b) changing operation of the power line, and (c) encoding operating state of the power line to represent information to be communicated.

In an embodiment, a communication controller for direct current power line communication in a photovoltaic system includes (a) a detecting module configured to detect a change in operation of the power line and (b) a decoding module configured to, in response to the change in operation of the power line detected by the detecting module, decode operating state of the power line to obtain information.

In an embodiment, a communication controller for direct current power line communication in a photovoltaic system includes (a) a switching device for electrically coupling to the power line and (b) a pulse control module configured to: (1) cause the switching device to change operating states and thereby change operation of the power line and (2) cause the switching device to switch to encode operating state of the power line to represent information to be communicated.

In an embodiment, a method for direct current power line communication in a photovoltaic system includes (a) transferring power between at least one photovoltaic device and a load using a power line, (b) maintaining a magnitude of a current flowing through the power line above a threshold value in a normal operating mode of the photovoltaic system, (c) detecting a change in operation of the power line in response to magnitude of a DC component of the current flowing through the power line falling below the threshold value, and (d) in response to the detected change in operation of the power line, decoding operating state of the power line to obtain information.

In an embodiment, a photovoltaic system includes (a) a power line, (b) at least one photovoltaic device electrically coupled to the power line, (c) a load electrically coupled to the power line, where the load is configured to ensure that a magnitude of current flowing through the power line remains above a threshold value during normal operation of the photovoltaic system, and (d) a communication controller configured to detect a change in operation of the power line in response to current flowing through the power line dropping below the threshold value.

In an embodiment, a method for direct current power line communication in a photovoltaic system includes (a) transferring power between at least one photovoltaic device and a load using a power line, (b) performing MPPT by the load, (c) detecting MPPT activity of the load, and (d) in response to detecting the MPPT activity of the load, causing the at least one photovoltaic device to remain enabled.

In an embodiment, a photovoltaic system includes (a) a power line, (b) at least one photovoltaic device electrically coupled to the power line, (c) a load electrically coupled to the power line, where the load is configured to perform MPPT, (d) an MPPT detector configured to detect MPPT activity of the load, and (e) a controller configured to cause the at least one photovoltaic device to remain enabled in response to the MPPT detector detecting MPPT activity of the load.

DETAILED DESCRIPTION OF THE EMBODIMENTS

Applicant has developed systems and methods for direct current (DC) power line communication in photovoltaic systems. The systems and methods repurpose a system power line for communication, thereby potentially eliminating the need for high-frequency transceivers and associated components that are required when using conventional RF and PLC communication techniques. Accordingly, the disclosed systems and methods potentially significantly simplify photovoltaic system communication relative to conventional techniques.

Figure 1:
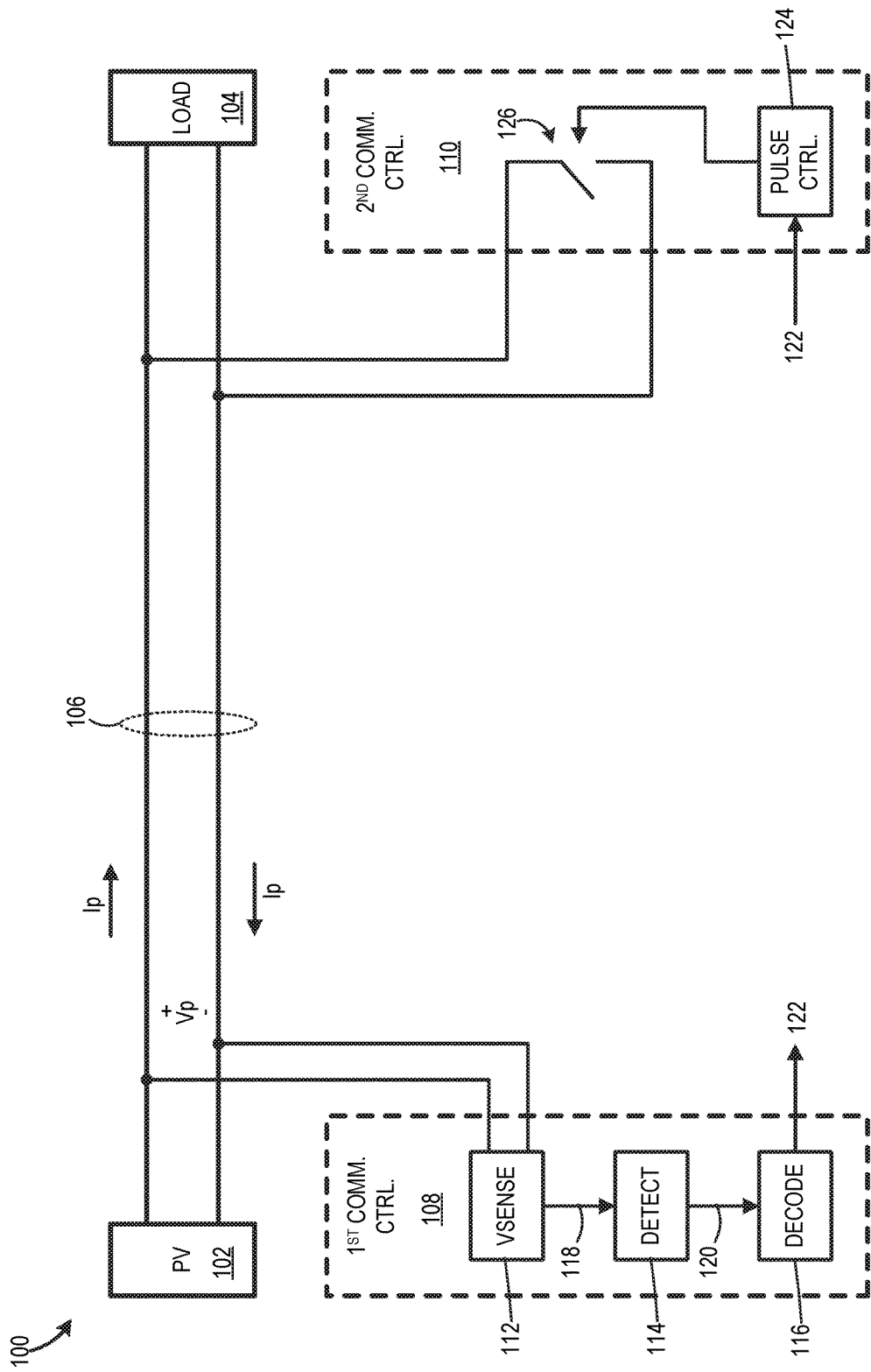
FIG. 1 illustrates a photovoltaic system capable of DC power line communication by changing operation of a power line in the voltage domain, according to an embodiment.

FIG. 1 illustrates a photovoltaic system 100 capable of DC power line communication by changing operation of a power line in the voltage domain. Photovoltaic system 100 includes a photovoltaic device 102 electrically coupled to a load 104 via a power line 106. The term "photovoltaic device" in this document means one or more electrically-coupled photovoltaic cells, such as a single-junction photovoltaic cell, a multijunction photovoltaic cell, a photovoltaic module of interconnected photovoltaic cells, or a panel of multiple interconnected photovoltaic modules. Load 104 is, for example, an inverter for transforming DC power from photovoltaic device 102 to AC power. Load 104 could take other forms, however, without departing from the scope hereof.

Photovoltaic system 100 further includes a first communication controller 108 and a second communication controller 110 each electrically coupled to power line 106. First communication controller 108 includes a voltage sensing module 112, a detecting module 114, and decoding module 116. Voltage sensing module 112 generates a voltage signal 118 representing voltage Vp on power line 106. In some embodiments, voltage sensing module 112 is simply an electrical tap across power line 106, such that voltage signal 118 is the same as voltage Vp on power line 106. In some other embodiments, voltage sensing module 112 includes electronic circuitry, such as amplification circuitry, level-shifting circuitry, scaling circuitry, and/or analog-to-digital conversion circuitry, which generates voltage signal 118, so that voltage signal 118 represents, but is not necessarily the same as, voltage Vp. Voltage signal 118 is either an analog signal or a digital signal, depending on the implementation of voltage sensing module 112.

Detecting module 114 detects a change in operation of power line 106 in the voltage domain. Specifically, detecting module 114 monitors voltage signal 118 and generates a change signal 120 representing a change in operation of power line 106, in response to voltage Vp dropping below a threshold value. In some embodiments, detecting module 114 compares only a DC component of voltage Vp to the threshold value. Additionally, in some embodiments, detecting module 114 is disabled during start-up and/or shut down of photovoltaic system 100, to avoid false detection of events associated with system start-up or shutdown. Detecting module 114 is at least partially implemented, in some embodiments, by digital and/or analog circuitry, such as comparison circuitry which compares voltage signal 118 to a reference signal representing the threshold value. Alternately or additionally, detecting module 114 is at least partially implemented by a processor executing instructions in the form of software or firmware stored in a memory, to perform the functions of detecting module 114. Change signal 120 is either an analog signal or a digital signal, depending on the implementation of detecting module 114.

Decoding module 116 decodes operating state of power line 106 to obtain transmitted information. Specifically, decoding module 116 decodes logic and/or timing of one or more voltage pulses on power line 106 to obtain information 122 transmitted from second communication controller 110 to first communication controller 108, in response to assertion of change signal 120. For example, in some embodiments, decoding module 116 obtains information 122 based on the following: (1) a number of pulses on power line 106 within a particular time frame, (2) widths of one or more pulses on power line 106, (3) frequency of pulses on power line 106, and/or (4) a pattern of pulses on power line 106. In some embodiments, decoding module 116 is at least partially implemented by electronic circuitry, such as pulse detection and counting circuitry, which detects pulses on change signal 120 and their associated timing. Decoding module 116 is alternately or additionally implemented at least in part by a processor executing instructions in the form of software or firmware stored in a memory, to perform the functions of decoding module 116. Information 122 is either in analog or digital form, depending on the implementation of decoding module 116.

Although modules 112, 114, 116 of first communication controller 108 are illustrated as discrete elements, one or more of these modules may be partially or completely combined without departing from the scope hereof. For example, in a particular embodiment, detecting module 114 and decoding module 116 are implemented by a common processor executing instructions, in the form of firmware or software, stored in a memory.

Second communication controller 110 includes a pulse control module 124 and a switching device 126 electrically coupled across power line 106. In the context of this document, the term "switching device" refers to a device which can be controlled to switch between conductive and non-conductive states, including, but not limited to, a field effect transistor, a bipolar junction transistor, or an insulated gate bipolar transistor. Pulse control module 124 receives information 122 to be communicated to first communication controller 108, and pulse control module 124 encodes operating state of power line 106 to represent information 122 by controlling switching device 126 to vary operation of power line 106 in the voltage domain.

In particular, pulse control module 124 causes switching device 126 to operate in its non-conductive state under normal operation of photovoltaic system 100, i.e., when power line 106 is not transmitting information. However, upon receipt of information 122, pulse control module 124 causes switching device 126 to switch from its non-conductive state to its conductive state, thereby shunting power line 106 and changing operation of power line 106 in the voltage domain. Such shunting of power line 106 causes voltage Vp to significantly drop, such as to near zero, so that Vp is outside of an expected normal operating range. Pulse control module 124 causes switching device 126 to remain in its conductive state for a predetermined period of time, thereby generating a voltage pulse on power line 106 at least partially representing information 122. In some embodiments, pulse control module 124 is adapted to control switching device 126 to generate several voltage pulses on power line 106 in response to information 122, such as to serially transmit several bits of information representing information 122 and/or communication protocols. In some other embodiments, pulse control module 124 is adapted to control switching device 126 to remain in its conductive state indefinitely in response to information 122, thereby generating a voltage pulse on power line 106 having an indefinite width.

Although pulse control module 124 and switching device 126 are illustrated as discrete elements, these elements may be partially or completely combined without departing from the scope hereof. Pulse control module 124 may be implemented by hardware, by a processor executing instructions in the form of software or firmware stored in a memory, or a combination thereof. For example, in a particular embodiment, pulse control module 124 includes pulse detection circuitry which detects information 122 in the form of one or more pulses on an input signal to pulse control module 124, as well as circuitry which causes switching device 126 to operate in its conductive state for a predetermined amount of time in response to each detected pulse of information 122. As another example, in a particular embodiment, pulse control module 124 includes a processor executing instructions, in the form of software or firmware stored in a memory, which control switching of switching device 126 in a predetermined manner in response to information 122, thereby encoding information 122 in the form of voltage pulses on power line 106.

Additionally, although switching device 126 is illustrated as directly coupled across power line 106, in some alternate embodiments, one or more additional electrical components, such as resistors and/or capacitors, are electrically coupled in series with switching device 126. In these alternate embodiments, switching device 126 switches the additional electrical components in/out of a circuit including power line 106 to change operation of power line 106.

Figure 2:
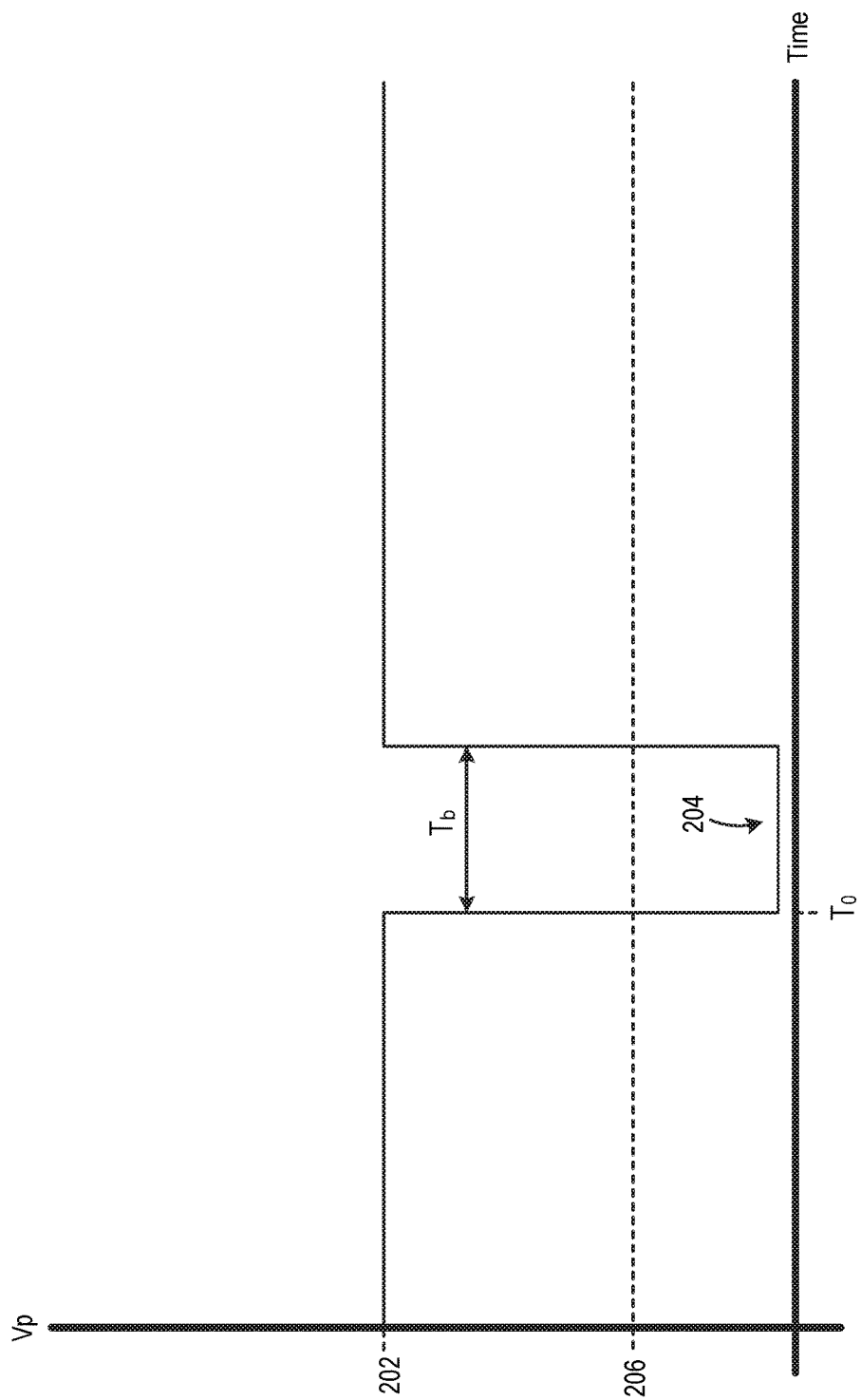
FIG. 2 illustrates one example of the FIG. 1 system transmitting information across a power line in a single pulse, according to an embodiment.

FIG. 2 illustrates one example of system 100 transmitting information across power line 106 in a single pulse. Prior to time $T_0$, voltage Vp on power line 106 has value 202 which is, for example, a maximum power point voltage of photovoltaic device 102. At time $T_0$, pulse control module 124 causes switching device 126 to switch from its non-conductive state to its conductive state in response to receipt of information 122. Consequentially, voltage Vp drops from value 202 to near zero at time $T_0$. Pulse control module 124 causes switching device 126 to remain in its conductive state for period $T_b$ to generate a voltage pulse 204 on power line 106, where voltage pulse 204 represents information 122.

Voltage sensing module 112 at first communication controller 108 generates voltage signal 118 representing voltage Vp. Detecting module 114 detects voltage Vp dropping below a threshold value 206 at time $T_0$, and in response, detecting module 114 asserts change signal 120. Decoding module 116 then decodes voltage pulse 204 to obtain information 122, in response to assertion of change signal 120.

Figure 3:
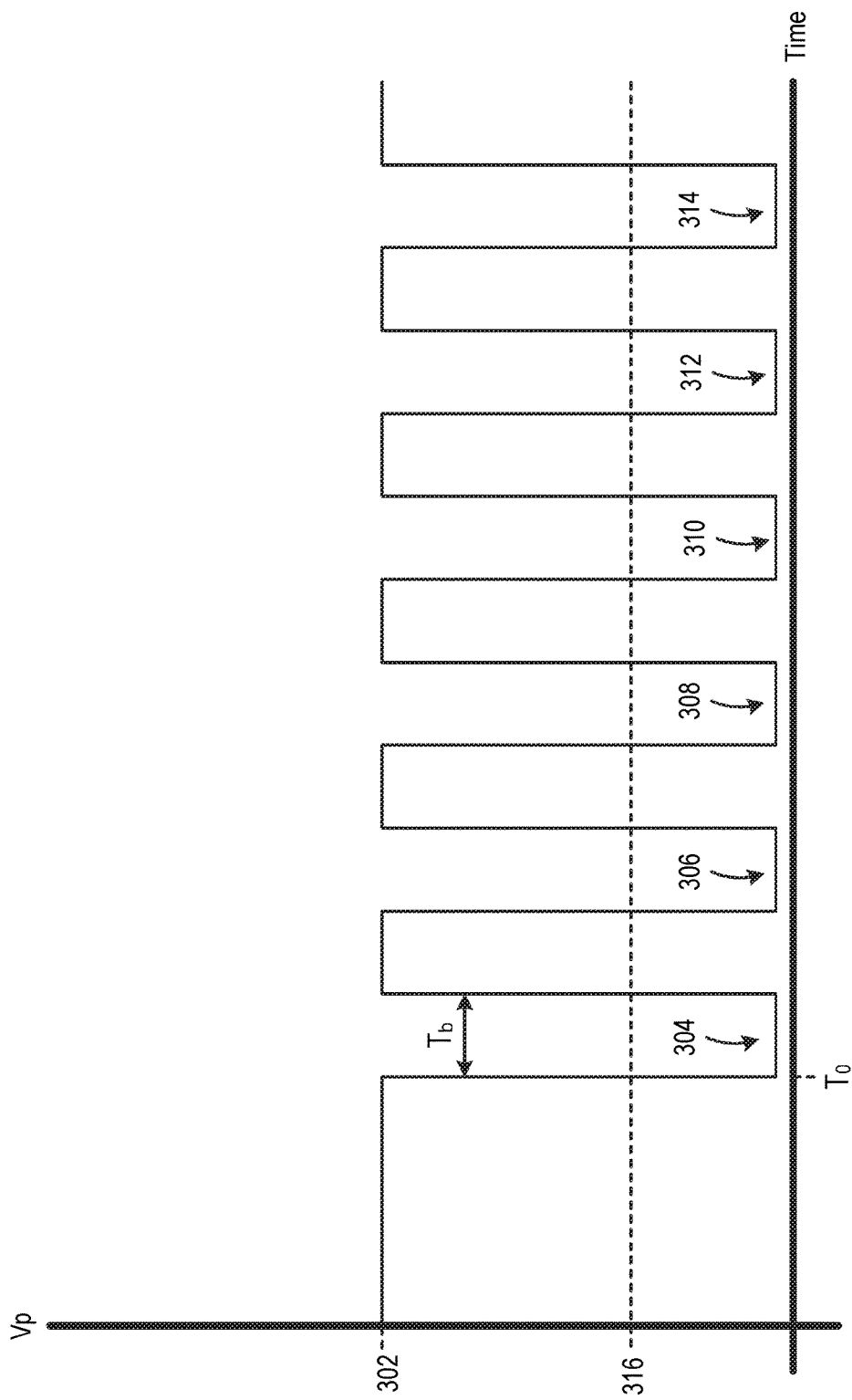
FIG. 3 illustrates one example of the FIG. 1 system transmitting information across a power line in multiple pulses, according to an embodiment.

FIG. 3 illustrates one example of system 100 transmitting information across power line 106 in multiple pulses. Prior to time $T_0$, voltage Vp on power line 106 has value 302. At time $T_0$, pulse control module 124 causes switching device 126 to switch from its non-conductive state to its conductive state in response to receipt of information 122. Consequentially, voltage Vp drops from value 302 to near zero at time $T_0$. Pulse control module 124 causes switching device 126 to remain in its conductive state for period $T_b$ to generate a voltage pulse 304 on power line 106. Pulse control module 124 subsequently causes switching device 126 to switch between its conductive and non-conductive states several times to generate additional pulses 306-314. Pulses 304-314 collectively implement a serial communications scheme. For example, in a particular embodiment, pulses 304 and 306 are start pulses, pulses 308 and 310 are data pulses, and pulse 312 and 314 are end pulses. Pulse control module 124 sets the state of data pulses 308 and 310 to represent information 122 as two-bit payload. Widths and timing of pulses 304-314 could vary without departing from the scope hereof.

Voltage sensing module 112 at first communication controller 108 generates voltage signal 118 representing voltage Vp. Detecting module 114 detects voltage Vp dropping below a threshold value 316 at time $T_0$, and in response, detecting module 114 asserts change signal 120. Decoding module 116 then decodes data pulses 308 and 310 to obtain information 122 in two-bit form, in response to assertion of change signal 120. In some alternate embodiments, pulses 304-314 represent information 122 in a different manner, such as based on width of one or more of the pulses and/or frequency of the pulses.

Switching device 126 typically has low impedance when operating in its conductive state. Therefore, transition of switching device 126 from its non-conductive state to its conductive state will typically cause current Ip flowing through power line 106 to significantly increase to a value beyond an expected normal operating range. Accordingly, first communication controller 108 can be modified to detect a change in operation of power line 106 in the current domain.

Figure 4:
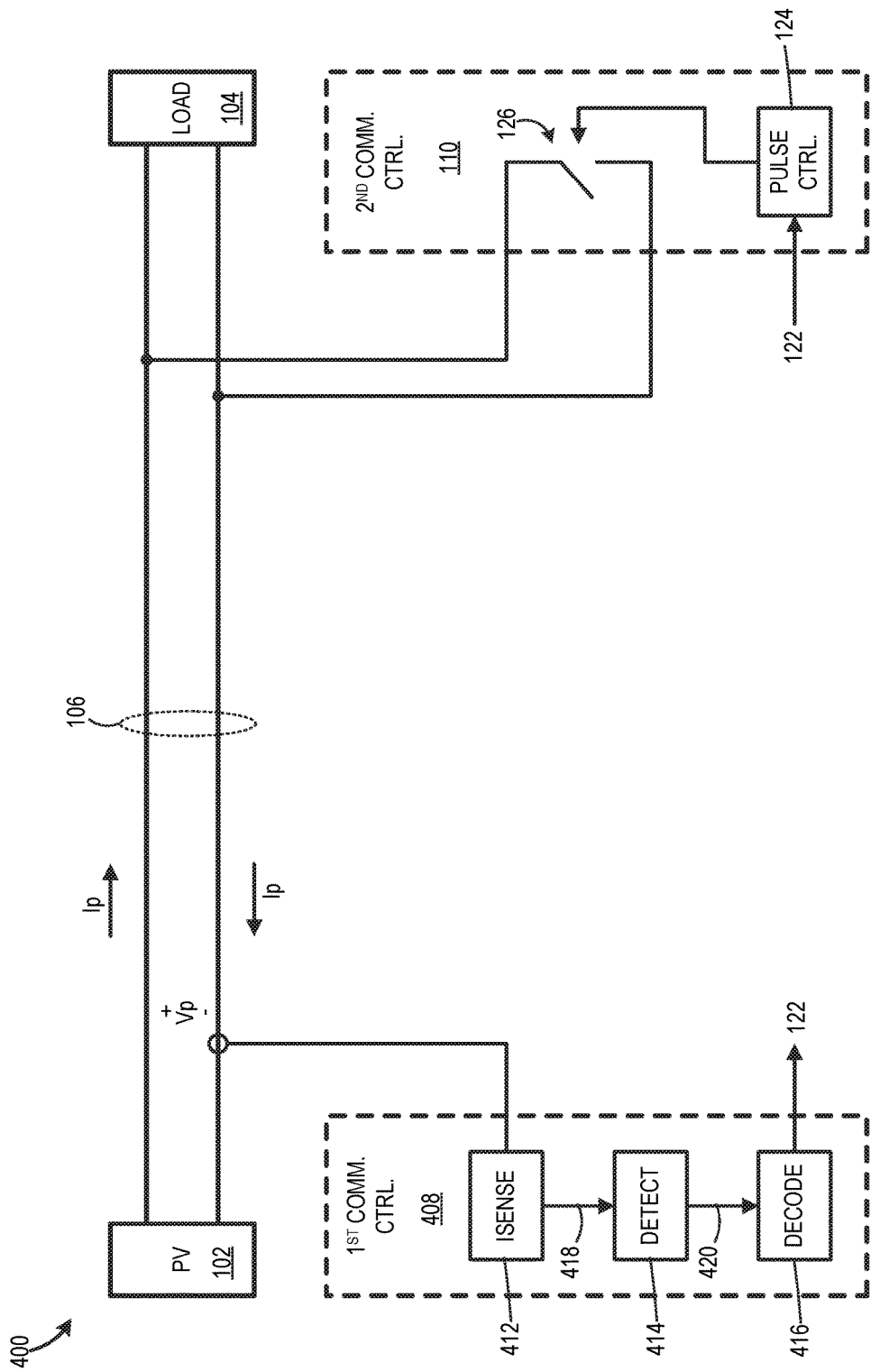
FIG. 4 illustrates a photovoltaic system capable of DC power line communication by changing operation of a power line in the current domain, according to an embodiment.

For example, FIG. 4 illustrates a photovoltaic system 400, which is like photovoltaic system 100 of FIG. 1, but where first communication controller 108 is replaced with a first communication controller 408 capable of detecting changes in power line 106 operation in the current domain. First communication controller 408 includes a current sensing module 412, a detecting module 414, and decoding module 416. Current sensing module 412 generates current signal 418 representing current Ip flowing through power line 106. In some embodiments, current sensing module 412 directly determines magnitude of current Ip, such as by sensing a voltage across a current sense resistor electrically coupled in series with power line 106. In some other embodiments, current sensing module 412 indirectly determines or estimates magnitude of current Ip, such as by using methods disclosed in U.S. Pat. Nos. 6,160,441 and 6,445,244 to Stratakos et al., each of which is incorporated herein by reference. Current signal 418 could be either an analog signal or a digital signal, depending on the implementation of current sensing module 412.

Detecting module 414 detects a change in operation of power line 106 in the current domain. Specifically, detecting module 414 monitors current signal 418 and generates a change signal 420 representing a change in operation of power line 106, in response to current Ip rising above a threshold value. In some embodiments, detecting module 414 compares only a DC component of current Ip to the threshold value. Additionally, in some embodiments, detecting module 414 is disabled during start-up and/or shut down of photovoltaic system 400, to avoid false detection of events associated with system start-up or shutdown. Detecting module 414 is at least partially implemented, in some embodiments, by digital and/or analog circuitry, such as comparison circuitry which compares current signal 418 to a reference signal representing the threshold value. Alternately or additionally, detecting module 414 is at least partially implemented by a processor executing instructions in the form of software or firmware stored in a memory, to perform the functions of detecting module 414. Change signal 420 is either an analog signal or a digital signal, depending on the implementation of detecting module 414.

Decoding module 416 decodes operating state of power line 106 to obtain transmitted information. Specifically, decoding module 416 decodes logic and/or timing of one or more current pulses on power line 106 to obtain information 122 transmitted from second communication controller 110, in response to assertion of change signal 420. For example, in some embodiments, decoding module 416 obtains information 122 based on the following: (1) a number of pulses on power line 106 within a particular time frame, (2) widths of one or more pulses on power line 106, (3) frequency of pulses on power line 106, and/or (4) a pattern of pulses on power line 106. In some embodiments, decoding module 416 is at least partially implemented by electronic circuitry, such as pulse detection and counting circuitry, which detects pulses on change signal 420 and their associated timing. Decoding module 416 is alternately or additionally implemented at least in part by a processor executing instructions in the form of software or firmware stored in a memory, to perform the functions of decoding module 416.

Although modules 412, 414, 416 of first communication controller 408 are illustrated as discrete elements, one or more of these modules may be partially or completely combined without departing from the scope hereof. For example, in a particular embodiment, detecting module 414 and decoding module 416 are implemented by a common processor executing instructions, in the form of firmware or software, stored in a memory.

Figure 5:
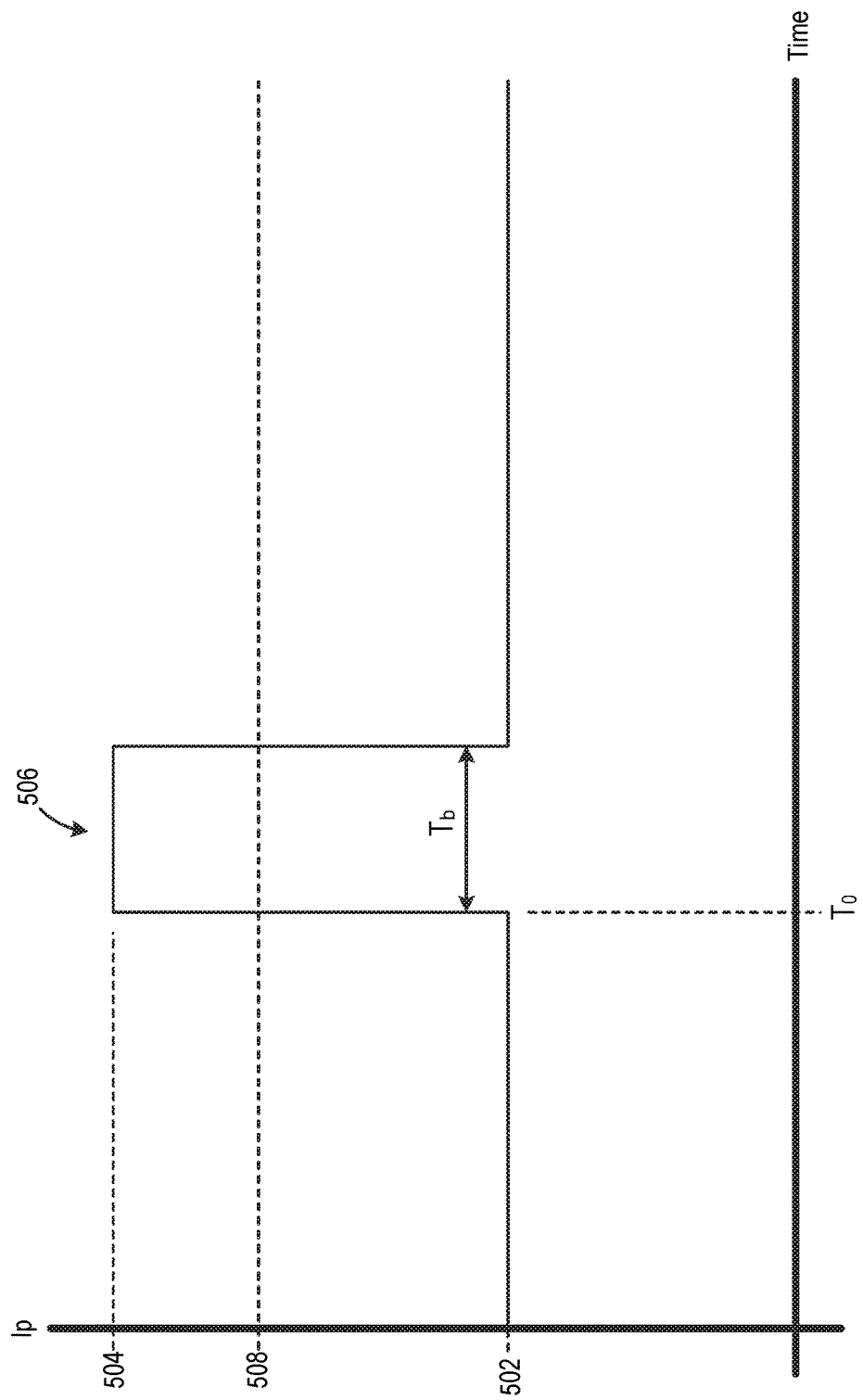
FIG. 5 illustrates one example of the FIG. 4 system transmitting information across a power line in a single pulse, according to an embodiment.

FIG. 5 illustrates one example of system 400 transmitting information across power line 106 in a single pulse. Prior to time $T_0$, current Ip flowing through power line 106 has value 502 which is, for example, a maximum power point current of photovoltaic device 102. At time $T_0$, pulse control module 124 causes switching device 126 to switch from its non-conductive state to its conductive state in response to receipt of information 122. Consequentially, current Ip increases from value 502 to value 504 at time $T_0$. Pulse control module 124 causes switching device 126 to remain in its conductive state for period $T_b$ to generate a current pulse 506 through power line 106, where current pulse 506 represents information 122.

Current sensing module 412 of first communication controller 408 generates current signal 418 representing current Ip. Detecting module 414 detects current Ip rising above a threshold value 508 at time $T_0$, and in response, detecting module 414 asserts change signal 420. Decoding module 416 then decodes current pulse 506 to obtain information 122, in response to assertion of change signal 420.

Photovoltaic system 400 could be configured to transmit information across power line 106 in multiple current pulses. For example, one embodiment of photovoltaic system 400 is configured to transmit information across power line 106 in a manner analogous to that discussed above with respect to FIG. 3.

Power line 106 may experience voltage and current disturbances during normal operation of photovoltaic system 100 or 400, such as due to changes in power available from photovoltaic device 102 or drawn by load 104. It is desirable to avoid erroneously detecting these disturbances as communication events. Therefore, in certain embodiments of systems 100 and 400, the pulses generated by switching device 126 on power line 106 are significantly different from those expected during normal disturbances on power line 106, or in other words, the pulses have one or more characteristics, such as magnitude, persistence, pattern, and/or frequency, that are not present during normal operation of power line 106. For example, the pulses may have a pattern, width, and/or frequency significantly different from expected normal disturbances. Detecting modules 114 and 414 may be configured to ignore pulses not having characteristics like those of pulses generated by second communication controller 110. Consider FIG. 3 again, for instance. The widths of start pulses 304 and 306 and the separation between pulses 304 and 306 may be selected so that start pulses 304 and 306 are significantly different from expected normal disturbances on power line 106, and detecting module 114 may be configured to ignore pulses other than the combination of start pulses 304 and 306.

Figure 6:
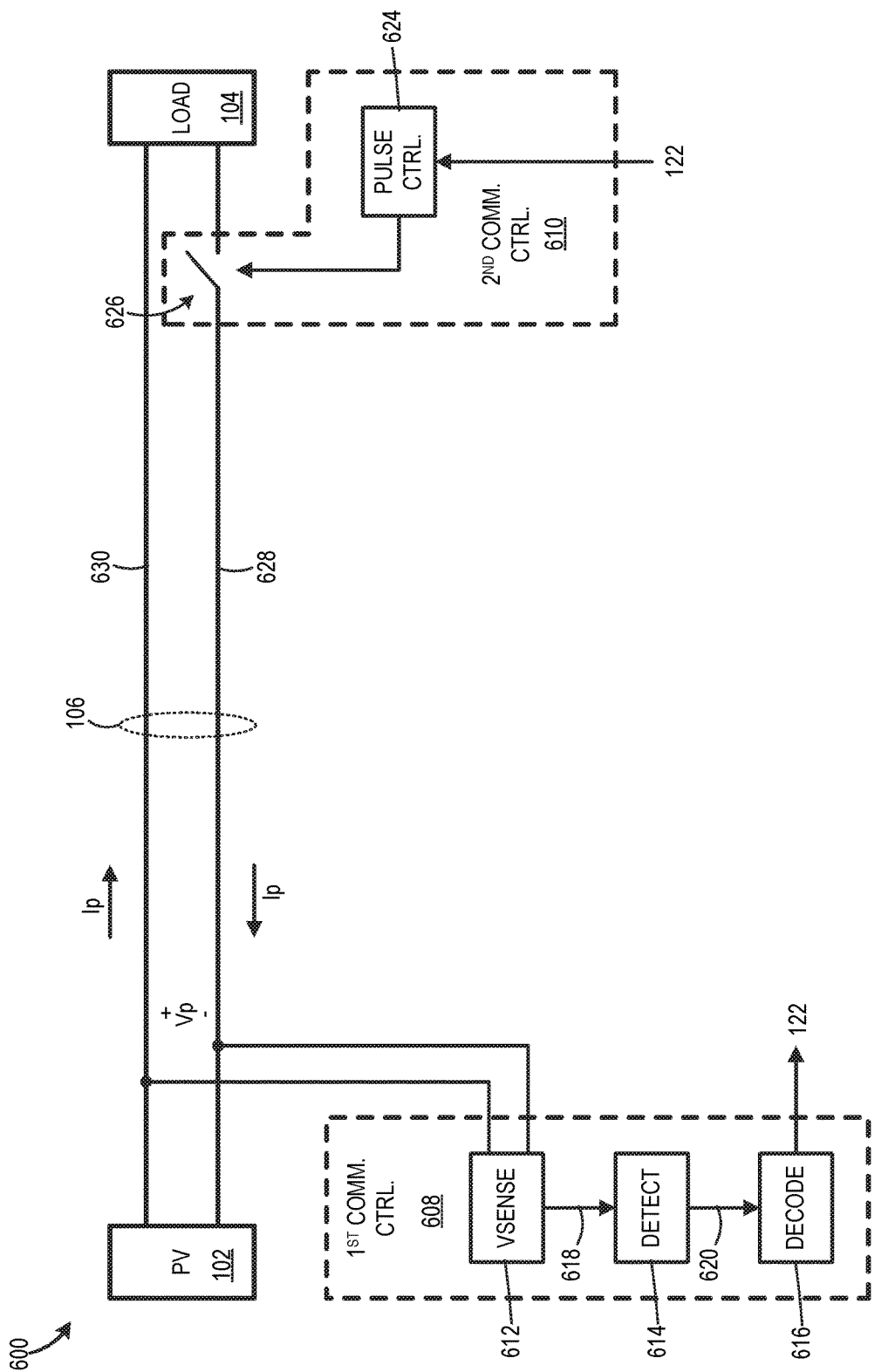
FIG. 6 illustrates a photovoltaic system which is similar to the FIG. 1 photovoltaic system, but where magnitude of voltage on the power line is increased to change operation of power line, according to an embodiment.

FIG. 6 illustrates a photovoltaic system 600 which is similar to photovoltaic system 100 of FIG. 1, but where magnitude of voltage Vp on power line 106 is increased beyond a normal expected range to change operation of power line 106. Photovoltaic system 600 has the same components as photovoltaic system 100, but with first communication controller 108 and second communication controller 110 replaced with first communication controller 608 and second communication controller 610, respectively.

First communication controller 608 includes a voltage sensing module 612, a detecting module 614, and decoding module 616. Voltage sensing module 612 generates a voltage signal 618 representing voltage Vp on power line 106. In some embodiments, voltage sensing module 612 is simply an electrical tap across power line 106, such that voltage signal 618 is the same as voltage Vp on power line 106. In some other embodiments, voltage sensing module 612 includes electronic circuitry, such as amplification circuitry, level-shifting circuitry, scaling circuitry, and/or analog-to-digital conversion circuitry, which generates voltage signal 618, so that voltage signal 618 represents, but is not necessarily the same as, voltage Vp. Voltage signal 618 could be either an analog signal or a digital signal, depending on the implementation of voltage sensing module 612.

Detecting module 614 detects a change in operation of power line 106 in the voltage domain. Specifically, detecting module 614 monitors voltage signal 618 and generates a change signal 620 representing a change in operation of power line 106, in response to voltage Vp rising above threshold value. In some embodiments, detecting module 614 compares only a DC component of voltage Vp to the threshold value. Additionally, in some embodiments, detecting module 614 is disabled during start-up and/or shut down of photovoltaic system 600, to avoid false detection of events associated with system start-up or shutdown. Detecting module 614 is at least partially implemented, in some embodiments, by digital and/or analog circuitry, such as comparison circuitry which compares voltage signal 618 to a reference signal representing the threshold value. Alternately or additionally, detecting module 614 is at least partially implemented by a processor executing instructions in the form of software or firmware stored in a memory, to perform the functions of detecting module 614. Change signal 620 is either an analog signal or a digital signal, depending on the implementation of detecting module 614.

Decoding module 616 decodes operating state of power line 106 to obtain transmitted information. Specifically, decoding module 616 decodes logic and/or timing of one or more voltage pulses on power line 106 to obtain information 122 transmitted from second communication module 610, in response to assertion of change signal 620. For example, in some embodiments, decoding module 616 obtains information 122 based on the following: (1) a number of pulses on power line 106 within a particular time frame, (2) widths of one or more pulses on power line 106, (3) frequency of pulses on power line 106, and/or (4) a pattern of pulses on power line 106. In some embodiments, decoding module 616 is at least partially implemented by electronic circuitry, such as pulse detection and counting circuitry, which detects pulses on change signal 620 and their associated timing. Decoding module 616 is alternately or additionally implemented at least in part by a processor executing instructions in the form of software or firmware stored in a memory, to perform the functions of decoding module 616. Information 122 is either in analog or digital form, depending on the implementation of decoding module 116.

Second communication controller 610 includes a pulse control module 624 and a switching device 626 electrically coupled in series with power line 106. Pulse control module 624 receives information 122 to be communicated to first communication controller 608, and pulse control module 624 encodes operating state of power line 106 to represent information 122 by controlling switching device 626 to vary operation of power line 106 in the voltage domain.

In particular, pulse control module 624 causes switching device 626 to operate in its conductive state under normal operation of photovoltaic system 600, i.e., when power line 106 is not transmitting information. However, upon receipt of information 122, pulse control module 624 causes switching device 626 to switch from its conductive state to its non-conductive state, thereby impeding flow of current Ip through power line 106 and causing voltage Vp to rise to a value outside of an expected normal operating range. Pulse control module 624 causes switching device 626 to remain in its non-conductive state for a predetermined period of time, thereby generating a voltage pulse on power line 106 representing information 122. In some embodiments, pulse control module 624 is adapted to control switching device 626 to generate several voltage pulses on power line 106 in response to information 122, such as to transmit several bits of information representing information 122 and/or communication protocols. In some other embodiments, pulse control module 624 is adapted to control switching device 626 to remain in its non-conductive state indefinitely in response to information 122, thereby generating a voltage pulse on power line 106 having an indefinite width. Pulse control module 624 may also be configured such that voltage pulses generated on power line 106 by switching device 626 are significantly different from voltage disturbances expected during normal operation of photovoltaic system 600, and detecting module 614 may be configured to ignore pulses not having characteristics like those generated by second communication controller 610.

Pulse control module 624 may be implemented by hardware, by a processor executing instructions in the form of software or firmware stored in a memory, or a combination thereof. For example, in a particular embodiment, pulse control module 624 includes pulse detection circuitry which detects information 122 in the form of one or more pulses on an input signal to pulse control module 624, as well as circuitry which causes switching device 626 to operate in its non-conductive state for a predetermined amount of time in response to each detected pulse of information 122. As another example, in a particular embodiment, pulse control module 624 includes a processor executing instructions, in the form of software or firmware stored in a memory, which control switching of switching device 626 in a predetermined manner in response to information 122, thereby encoding information 122 in the form of voltage pulses on power line 106.

Some alternate embodiments include one or more additional electrical components, such as resistors and/or capacitors, electrically coupled in parallel with switching device 626. These additional electrical components provide a path for current Ip when switching device 626 is in its non-conductive state. Consequentially, in these alternate embodiments, magnitude of current Ip potentially has a non-zero value when switching device 626 is in its non-conductive state.

Figure 7:
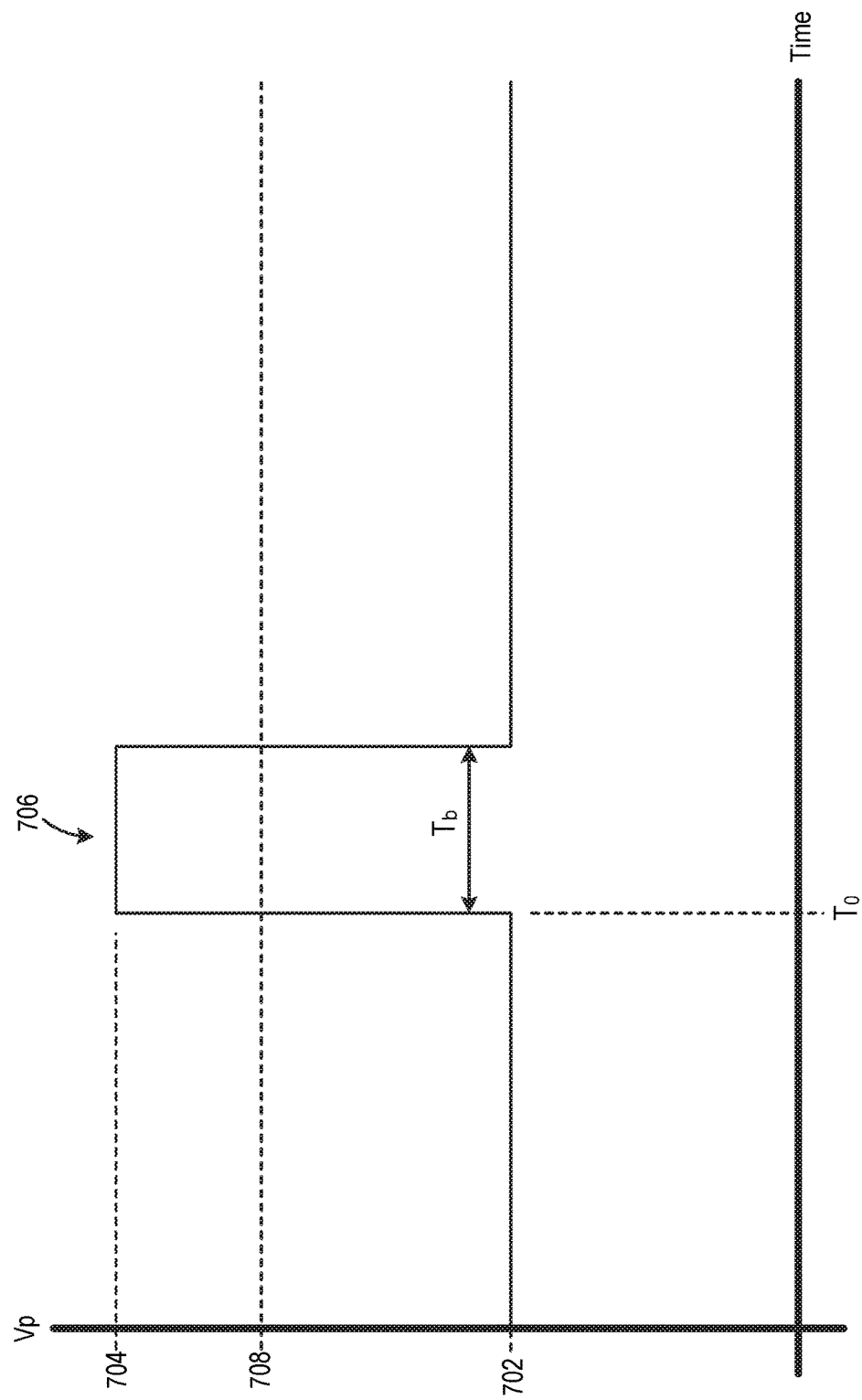
FIG. 7 illustrates one example of the FIG. 6 system transmitting information across a power line in a single pulse, according to an embodiment.

FIG. 7 illustrates one example of system 600 transmitting information across power line 106 in a single pulse. Prior to time $T_0$, voltage Vp on power line 106 has value 702 which is, for example, a maximum power point voltage of photovoltaic device 102. At time $T_0$, pulse control module 624 causes switching device 626 to switch from its conductive state to its non-conductive state in response to receipt of information 122. Consequently, voltage Vp rises from value 702 to open circuit voltage 704 of photovoltaic device 102 at time $T_0$. Pulse control module 624 causes switching device 626 to remain in its non-conductive state for period $T_b$ to generate a voltage pulse 706 on power line 106, where voltage pulse 706 represents information 122.

Voltage sensing module 612 of first communication controller 608 generates voltage signal 618 representing voltage Vp. Detecting module 614 detects voltage Vp rising above a threshold value 708 at time $T_0$, and in response, detecting module 614 asserts change signal 620. Decoding module 616 then decodes voltage pulse 706 to obtain information 122, in response to assertion of change signal 620.

Transition of switching device 626 from its conductive state to its non-conductive state will cause current Ip to significantly decrease to a value that is outside of an expected normal operating range, such as to zero. Accordingly, first communication controller 608 can be modified to detect a change in operation of power line 106 in the current domain.

Figure 8:
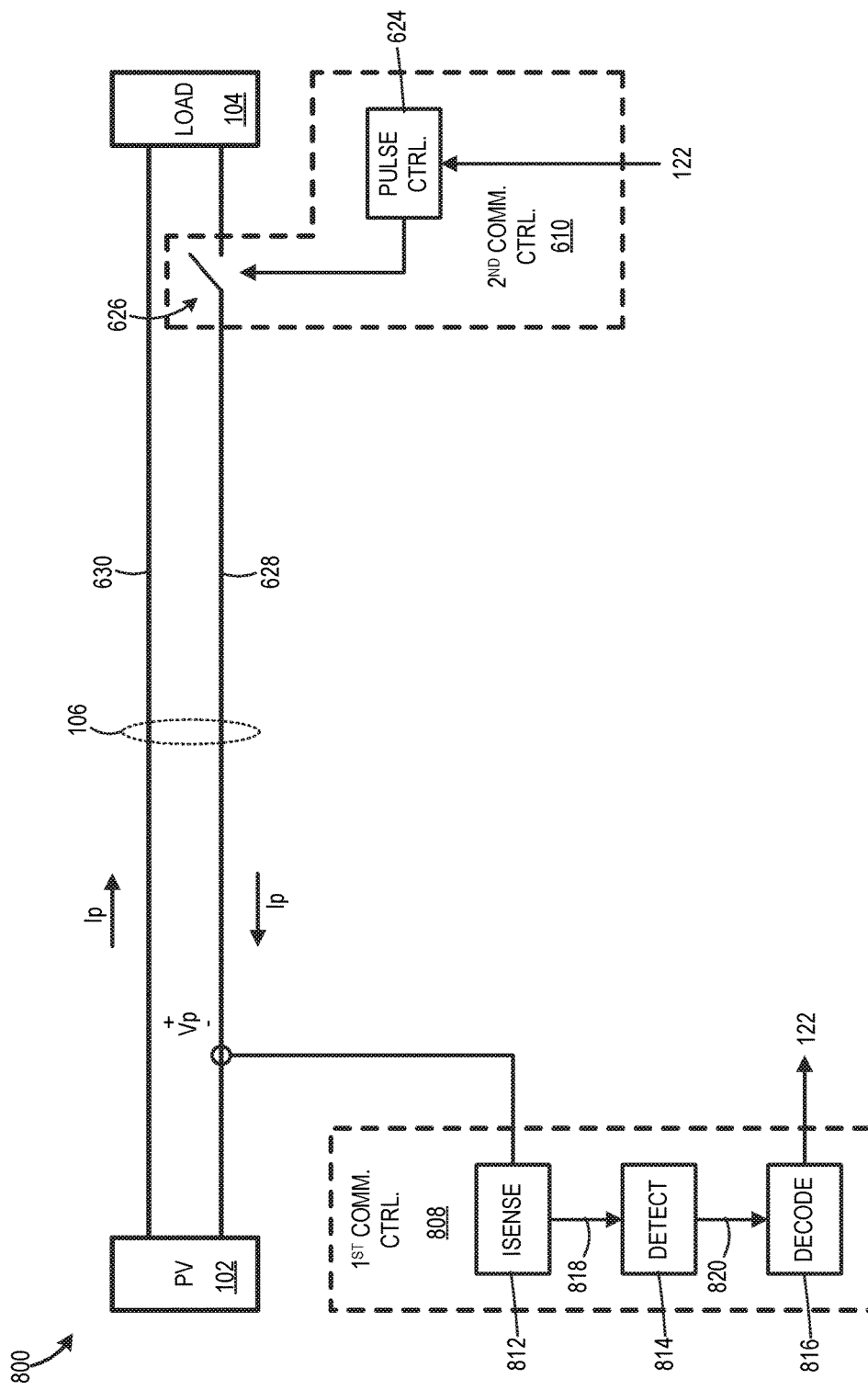
FIG. 8 illustrates another photovoltaic system capable of DC power line communication by changing operation of a power line in the current domain, according to an embodiment.

FIG. 8 illustrates a photovoltaic system 800, which is like photovoltaic system 600 of FIG. 6, but where first communication controller 608 is replaced with a first communication controller 808 capable of detecting changes in power line 106 operation in the current domain. First communication controller 808 includes a current sensing module 812, a detecting module 814, and a decoding module 816. Current sensing module 812 generates current signal 818 representing current Ip flowing through power line 106. In some embodiments, current sensing module 812 directly determines magnitude of current Ip, such as by sensing a voltage across a current sense resistor electrically coupled in series with power line 106. In some other embodiments, current sensing module 812 indirectly determines or estimates magnitude of current Ip, such as by using methods disclosed in U.S. Pat. Nos. 6,160,441 and 6,445,244 to Stratakos et al. Current signal 818 could be either an analog signal or a digital signal, depending on the implementation of current sensing module 812.

Detecting module 814 detects a change in operation of power line 106 in the current domain. Specifically, detecting module 814 monitors current signal 818 and generates a change signal 820 representing a change in operation of power line 106, in response to current Ip falling below a threshold value. In particular embodiments, detecting module 814 compares only a DC component of current Ip to the threshold value. In some other embodiments, detecting module 814 monitors current signal 818 and generates a change signal 820 representing a change in operation of power line 106, in response to a change in polarity of a DC component of current Ip, which is caused, for example, by an external device (not shown) or load 104 injecting current into power line 106, thereby causing polarity of current Ip to change. Additionally, in some embodiments, detecting module 814 is disabled during start-up and/or shut down of photovoltaic system 800, to avoid false detection of events associated with system start-up or shutdown. Additionally, detecting module 814 may be configured to ignore pulses not having characteristics like those generated by second communication controller 610.

Detecting module 814 is at least partially implemented, in some embodiments, by digital and/or analog circuitry, such as comparison circuitry which compares current signal 818 to a reference signal representing the threshold value. Alternately or additionally, detecting module 814 is at least partially implemented by a processor executing instructions in the form of software or firmware stored in a memory, to perform the functions of detecting module 814. Change signal 820 is either an analog signal or a digital signal, depending on the implementation of detecting module 814.

Decoding module 816 decodes operating state of power line 106 to obtain transmitted information. Specifically, decoding module 816 decodes logic and/or timing of one or more current pulses on power line 106 to obtain information 122 transmitted from second communication module 610, in response to assertion of change signal 820. For example, in some embodiments, decoding module 816 obtains information 122 based on the following: (1) a number of pulses on power line 106 within a particular time frame, (2) widths of one or more pulses on power line 106, (3) frequency of pulses on power line 106, and/or (4) a pattern of pulses on power line 106.

In some embodiments, decoding module 816 is at least partially implemented by electronic circuitry, such as pulse detection and counting circuitry, which detects pulses on change signal 820 and their associated timing. Decoding module 816 is alternately or additionally implemented at least in part by a processor executing instructions in the form of software or firmware stored in a memory, to perform the functions of decoding module 816. Information 122 is either in analog or digital form, depending on the implementation of decoding module 816.

Although modules 812, 814, 816 of first communication controller 808 are illustrated as discrete elements, one or more of these modules may be partially or completely combined without departing from the scope hereof. For example, in a particular embodiment, detecting module 814 and decoding module 816 are implemented by a common processor executing instructions, in the form of firmware or software, stored in a memory.

Figure 9:
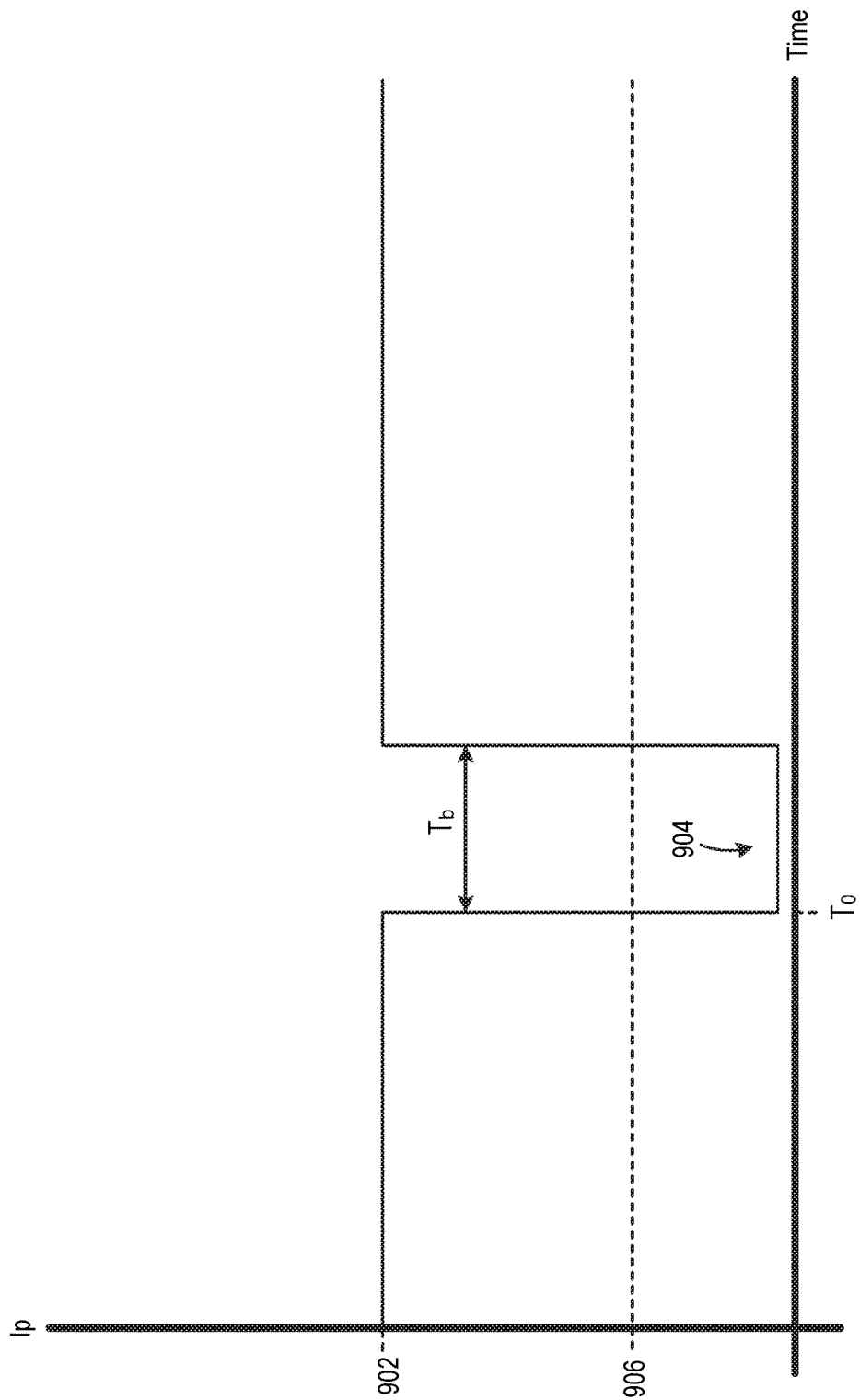
FIG. 9 illustrates one example of the FIG. 8 system transmitting information across a power line in a single pulse, according to an embodiment.

FIG. 9 illustrates one example of system 800 transmitting information across power line 106 in a single pulse. Prior to time $T_0$, current Ip flowing through power line 106 has value 902 which is, for example, a maximum power point current of photovoltaic device 102. At time $T_0$, pulse control module 624 causes switching device 626 to switch from its conductive state to its non-conductive state in response to receipt of information 122. Consequentially, current Ip decreases from value 902 to near zero at time $T_0$. Pulse control module 624 causes switching device 626 to remain in its non-conductive state for period $T_b$ to generate a current pulse 904 through power line 106, where current pulse 904 represents information 122.

Current sensing module 812 of first communication controller 808 generates current signal 818 representing current Ip. Detecting module 814 detects current Ip falling below a threshold value 906 at time $T_0$, and in response, detecting module 814 asserts change signal 820. Decoding module 816 then decodes current pulse 904 to obtain information 122, in response to assertion of change signal 820.

Photovoltaic system 800 could be configured to transmit information across power line 106 in multiple current pulses. For example, one embodiment of photovoltaic system 800 is configured to transmit information across power line 106 in a manner analogous to that discussed above with respect to FIG. 3. Pulse control module 624 could also be configured such that current pulses generated on power line 106 by switching device 626 are significantly different from current disturbances expected during normal operation of photovoltaic system 600.

Switching device 626 is illustrated in FIGS. 6 and 8 as being electrically coupled in series with a negative conductor 628 of power line 106. However, switching device 626 could alternately be electrically coupled in series with a positive power conductor 630 of power line 106. In some alternate embodiments of photovoltaic system 600 or 800 including multiple photovoltaic devices 102 and/or multiple loads 104, the location of switching device 626 in power line 106 may affect extent of communication within the photovoltaic system. For example, consider an alternate embodiment of photovoltaic system 600 including multiple strings of photovoltaic devices 102 electrically coupled in parallel. Placing switching device 626 in a portion of power line 106 serving multiple strings allows simultaneous communication with all of the strings. On the flip side, placing switching device 626 in a portion of power line 106 serving only a single string allows individual communication with the particular string.

Figure 10:
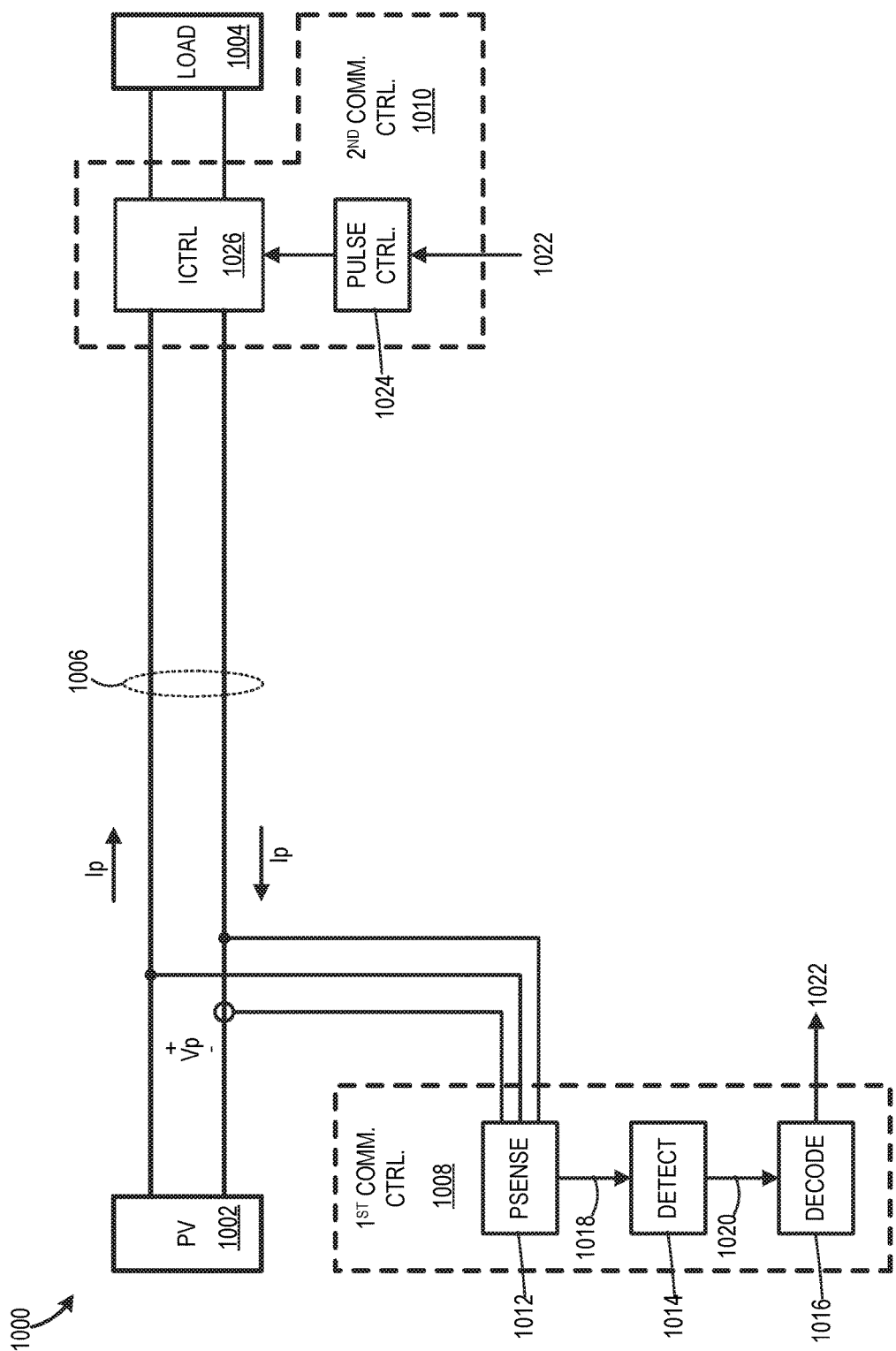
FIG. 10 illustrates a photovoltaic system capable of DC power line communication by changing operation of a power line in the power domain, according to an embodiment.

Applicant has further determined that information can be transmitted across a power line in the power domain, where power is the product of voltage and current under DC conditions. FIG. 10 illustrates a photovoltaic system 1000 capable of DC power line communication by changing operation of a power line in the power domain. Photovoltaic system 1000 includes a photovoltaic device 1002 electrically coupled to a load 1004 via a power line 1006. Load 1004 is, for example, an inverter for transforming DC power from photovoltaic device 1002 to AC power. Load 1004 could take other forms, however, without departing from the scope hereof.

Photovoltaic system 1000 further includes a first communication controller 1008 and a second communication controller 1010. First communication controller 1008 includes a power sensing module 1012, a detecting module 1014, and decoding module 1016. Power sensing module 1012 generates a power signal 1018 representing power P being transmitted by power line 1006 from photovoltaic device 1002 to load 1004. In some embodiments, power sensing module 1012 generates power signal 1018 from the product of signals representing voltage Vp on power line 1006 and current Ip through power line 1006. Voltage Vp and current Ip are determined, for example, using techniques similar to those discussed with respect to voltage sensing module 112 and current sending module 412, respectively. Power signal 1018 is either an analog signal or a digital signal, depending on the implementation of power sensing module 1012.

Detecting module 1014 detects a change in operation of power line 1006 in the power domain. Specifically, detecting module 1014 monitors power signal 1018 and asserts a change signal 1020 representing a change in operation of power line 1006, in response to power P dropping below a threshold value. In some alternate embodiments, however, detecting module 1014 asserts change signal 1020 in response to power P rising above a threshold value. Furthermore, in yet other alternate embodiments, detecting module 1014 asserts change signal 1020 in response to "negative" flow of power through power line 1006, or in other words, in response to power flowing from load 1004 to photovoltaic device 1002. In certain embodiments, detecting module 1014 compares only a DC component of power P to the threshold value. Additionally, in some embodiments, detecting module 1014 is disabled during start-up and/or shut down of photovoltaic system 1000, to avoid false detection of events associated with system start-up or shutdown. Detecting module 1014 is at least partially implemented, in some embodiments, by digital and/or analog circuitry, such as comparison circuitry which compares power signal 1018 to a reference signal representing the threshold value. Alternately or additionally, detecting module 1014 is at least partially implemented by a processor executing instructions in the form of software or firmware stored in a memory, to perform the functions of detecting module 1014. Change signal 1020 is either an analog signal or a digital signal, depending on the implementation of detecting module 1014.

Decoding module 1016 decodes operating state of power line 1006 to obtain transmitted information. Specifically, decoding module 1016 decodes logic and/or timing of one or more power pulses on power line 1006 to obtain information 1022 transmitted from second communication module 1010, in response to assertion of change signal 1020. For example, in some embodiments, decoding module 1016 obtains information 1022 based on the following: (1) a number of pulses on power line 1006 within a particular time frame, (2) widths of one or more pulses on power line 1006, (3) frequency of pulses on power line 1006, and/or (4) a pattern of pulses on power line 106. In some embodiments, decoding module 1016 is at least partially implemented by electronic circuitry, such as pulse detection and counting circuitry, which detects pulses on change signal 1020 and their associated timing. Decoding module 1016 is alternately or additionally implemented at least in part by a processor executing instructions in the form of software or firmware stored in a memory, to perform the functions of decoding module 1016. Information 1022 is either in analog or digital form, depending on the implementation of decoding module 1016.

Although modules 1012, 1014, 1016 of first communication controller 1008 are illustrated as discrete elements, one or more of these modules may be partially or completely combined without departing from the scope hereof. For example, in a particular embodiment, detecting module 1014 and decoding module 1016 are implemented by a common processor executing instructions, in the form of firmware or software, stored in a memory.

Second communication controller 1010 includes a pulse control module 1024 and a power control module 1026 electrically coupled to load 1004. Power control module 1026 is capable of controlling power drawn by load 1004. In some embodiments, power control module 1026 includes circuitry, such as a DC-to-DC converter, separate from load 1004. In some other embodiments, power control module 1026 is part of load 1004. For example, in certain embodiments where load 1004 is an inverter, power control module 1026 includes circuitry within the inverter for adjusting power output of the inverter. Pulse control module 1024 receives information 1022 to be communicated to first communication controller 1008, and pulse control module 1024 encodes operating state of power line 1006 to represent information 1022 by controlling power control module 1026 to vary operation of power line 1006 in the power domain.

In particular, pulse control module 1024 causes power control module 1026 to not affect power drawn by load 1004 under normal operation of photovoltaic system 1000, i.e., when power line 1006 is not transmitting information. However, upon receipt of information 1022, pulse control module 1024 causes power control module 1026 to decrease power drawn by load 1004 to a value that is outside an expected normal operating range, thereby changing operation of power line 1006 in the power domain. Pulse control module 1024 causes power control module 1026 to decrease load 1004's power draw for a predetermined period of time, thereby generating a power pulse on power line 1006 representing information 1022. Alternately, pulse control module 1024 causes power control module 1026 to decrease load 1004's power draw indefinitely in response to information 1022, thereby generating a power pulse on power line 1006 having an indefinite width. In some embodiments, pulse control module 1024 is adapted to control power control module 1026 to generate several power pulses on power line 1006 in response to information 1022, such as to transmit several bits of information representing information 1022 and/or communication protocols. In some alternate embodiments, pulse control module 1024 causes power control module 1026 to increase, instead of decrease, power drawn by load 1004 upon receipt of information 1022. In these alternate embodiments, detecting module 1014 of first communication controller 1008 is also modified to assert change signal 1020 in response to power P rising above, instead of falling below, a threshold value. Pulse control module 1024 may be implemented by hardware, by a processor executing instructions in the form of software or firmware stored in a memory, or a combination thereof.

Figure 11:
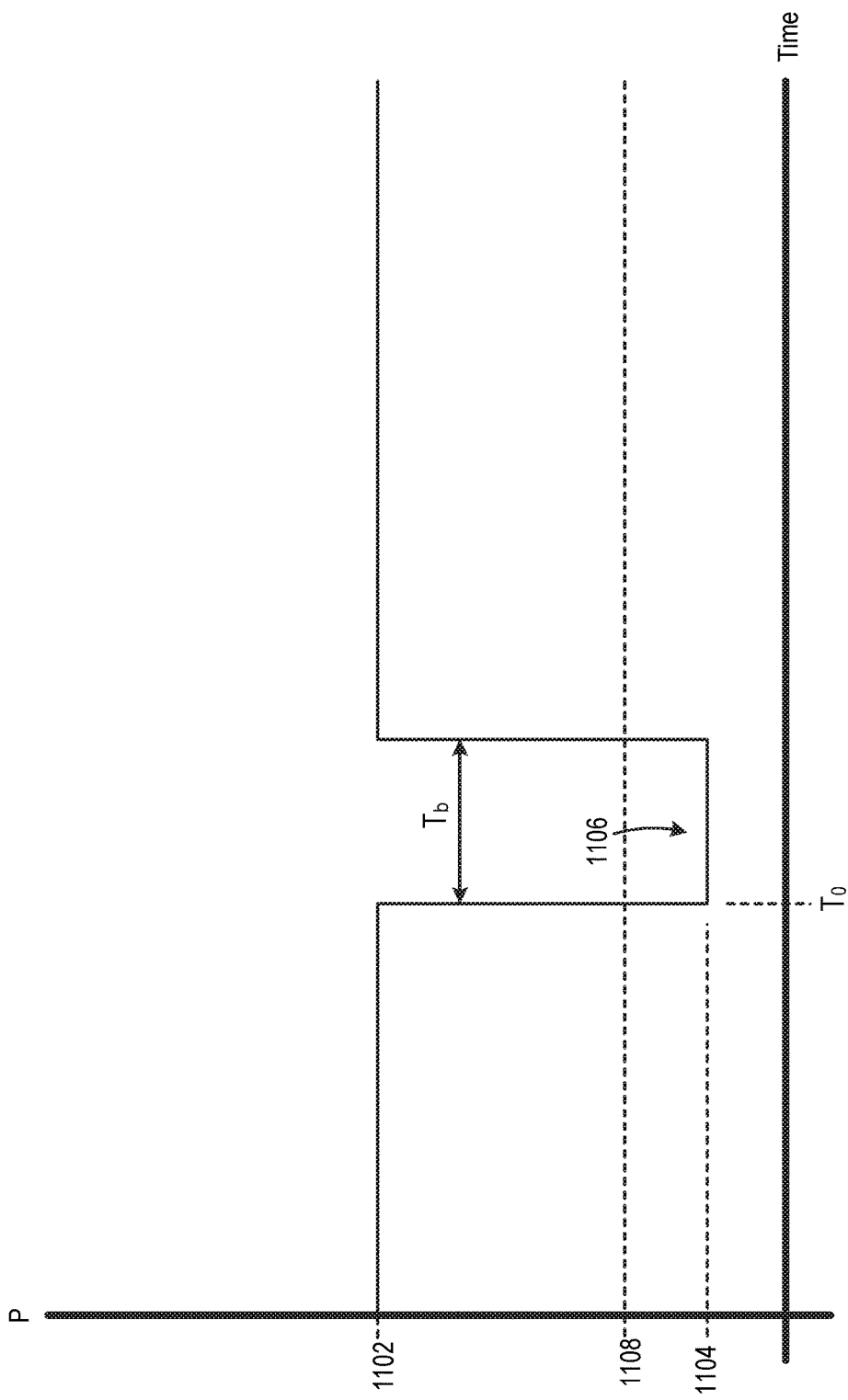
FIG. 11 illustrates one example of the FIG. 10 system transmitting information across a power line in a single pulse, according to an embodiment.

FIG. 11 illustrates one example of system 1000 transmitting information across power line 1006 in a single pulse. Prior to time $T_0$, power P flowing through power line 1006 has value 1102 which is, for example, a maximum power point of photovoltaic device 1002. At time $T_0$, pulse control module 1024 causes power control module 1026 to reduce power drawn by load 1004 from value 1102 to 1104. Pulse control module 1024 causes power control module 1026 to keep load 1004's power dissipation at value 1104 for period $T_b$ to generate a power pulse 1106 on power line 1006, where power pulse 1106 represents information 1022.

Power sensing module 1012 at first communication controller 1008 generates power signal 1018 representing power P. Detecting module 1014 detects power P dropping below a threshold value 1108 at time $T_0$, and in response, detecting module 1014 asserts change signal 1020. Decoding module 1016 then decodes power pulse 1106 to obtain information 1022, in response to assertion of change signal 1020.

In some embodiments, pulse control module 1024 may also be configured such that power pulses generated on power line 1006 by switching device 1026 are significantly different from power disturbances expected during normal operation of photovoltaic system 1000, or in other words, such that the power pulses have one or more characteristics, such as magnitude, persistence, frequency, and/or pattern not present during normal operation of power line 1006. Detecting module 1014 may be configured to ignore pulses not having characteristics like those generated by second communication controller 1010, in these embodiments.

Figure 12:
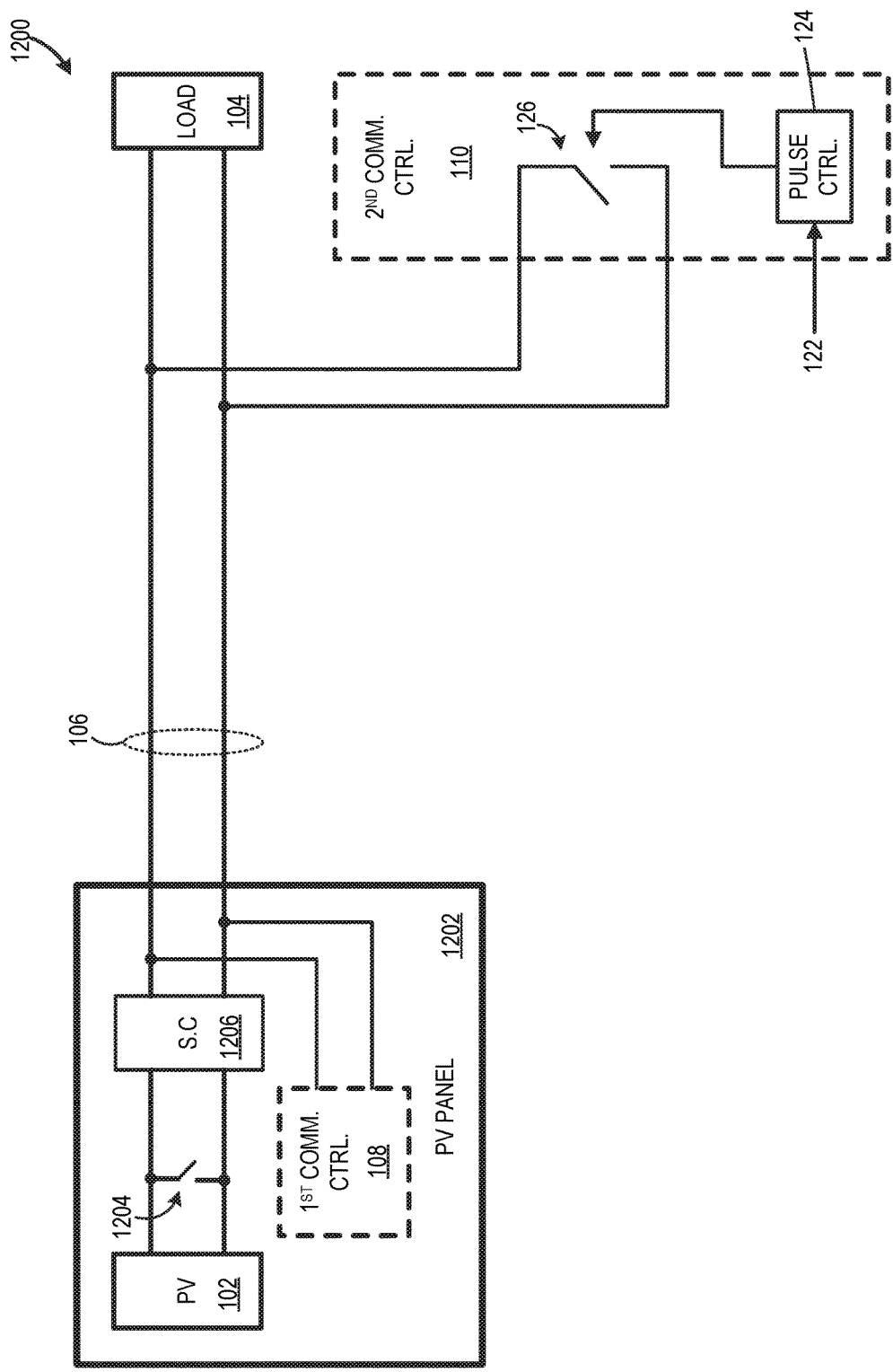
FIG. 12 illustrates a photovoltaic system like that of FIG. 1, but where a photovoltaic device and a first communication controller are co-packaged in a common photovoltaic panel, according to an embodiment.

First communication controllers 108, 408, 608, 808, or 1008 and/or second communication controllers 110, 610, or 1010 can be co-packaged with various photovoltaic system components or can be remote from system components. For example, FIG. 12 illustrates a photovoltaic system 1200, which is like photovoltaic system 100 of FIG. 1, but where photovoltaic device 102 and first communication controller 108 are co-packaged in a common photovoltaic panel 1202. Details of first communication controller 108 are not shown in FIG. 12 to promote illustrative clarity.

Co-packaging of photovoltaic device 102 and first communication controller 108 may be particularly useful when information communicated from second communication controller 110 to first communication controller 108 includes commands to disable or enable photovoltaic device 102. In this document, disabling a photovoltaic device means to reduce availability of power from the photovoltaic device to either zero or a non-zero value. Conversely, enabling a photovoltaic device means to increase availability of power from the photovoltaic device. In embodiments supporting enabling and disabling of photovoltaic device 102, the system further includes circuitry for disabling photovoltaic device 102, such as a disable switch 1204 capable of shorting photovoltaic device 102. Disable switch 1204 could alternately be replaced with a switch electrically coupled in series with photovoltaic device 102, where the switch opens in response to a disable command to isolate photovoltaic device 102 from power line 106. Photovoltaic panel 1202 optionally includes a switching circuit 1206 in place of or in addition to disable switch 1204. Switching circuit 1206 is capable of preventing photovoltaic device 102 from providing power to power line 106. Switching circuit 1206 has, for example, a buck-type, boost-type, or buck-boost-type topology, and in some embodiments, switching circuit 1206 is capable of performing MPPT.

Figure 13:
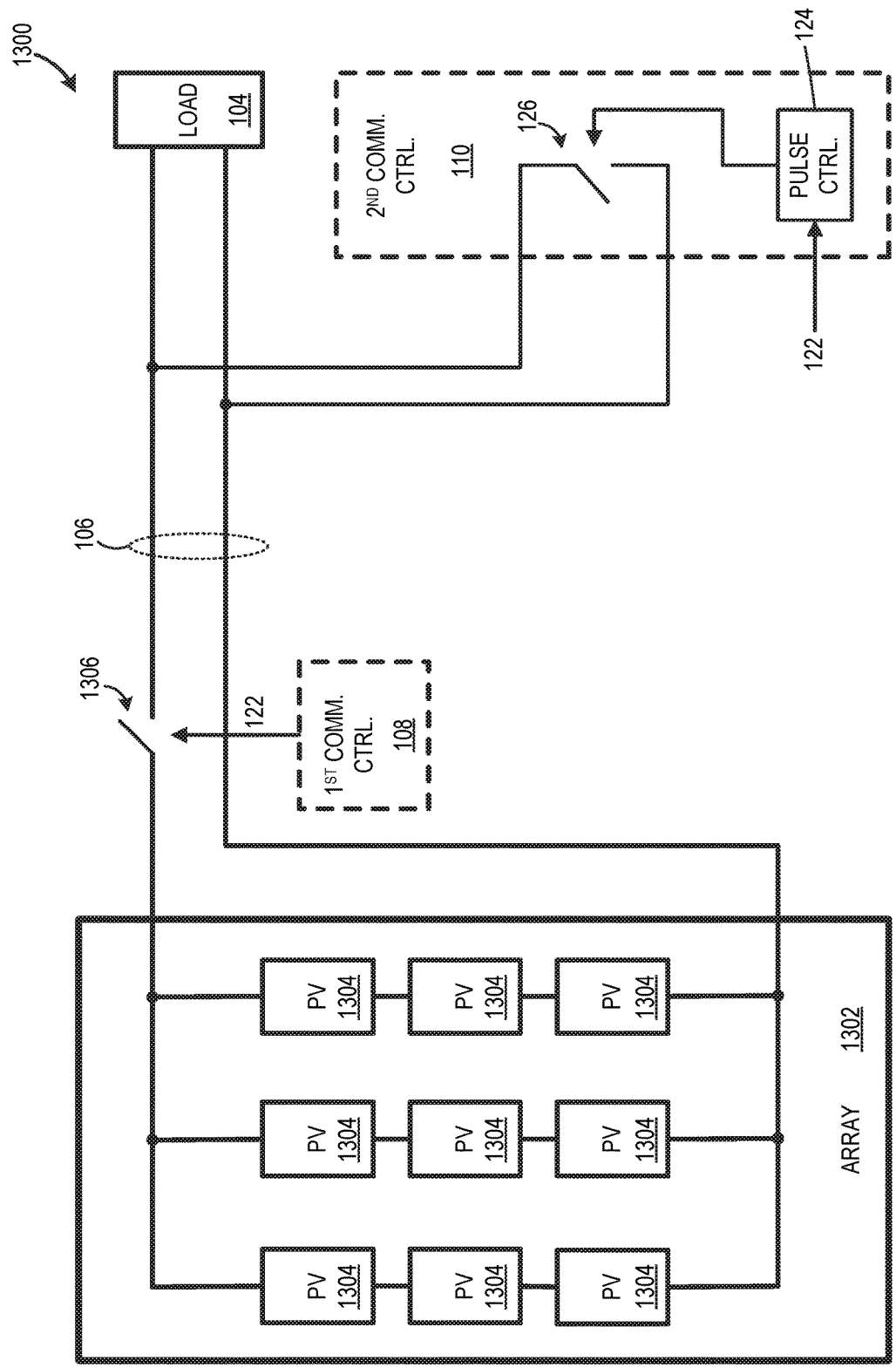
FIG. 13 illustrates a photovoltaic system like that of FIG. 1, but where the photovoltaic device is an array of photovoltaic modules, and the first communication controller is communicatively coupled to a disable switch, according to an embodiment.

As another example, FIG. 13 illustrates a photovoltaic system 1300, which is like photovoltaic system 100 of FIG. 1, but where photovoltaic device 102 is an array 1302 of photovoltaic modules 1304 and first communication controller 108 is communicatively coupled to a disable switch 1306. Details of first communication controller 108 are not shown in FIG. 13 to promote illustrative clarity. Disable switch 1306 is disposed at an edge of array 1302 and is capable of enabling and disabling array 1302 based on information 122 communicated from second communication controller 110 to first communication controller 108. In particular, switch 1306 closes in response to information 122 including an enable command, thereby electrically coupling array 1302 to power line 106. Switch 1306 opens in response to information 122 including a disable command, thereby electrically isolating array 1302 from power line 106. In some alternate embodiments, array 1302 is replaced with a single string of photovoltaic devices.

Figure 14:
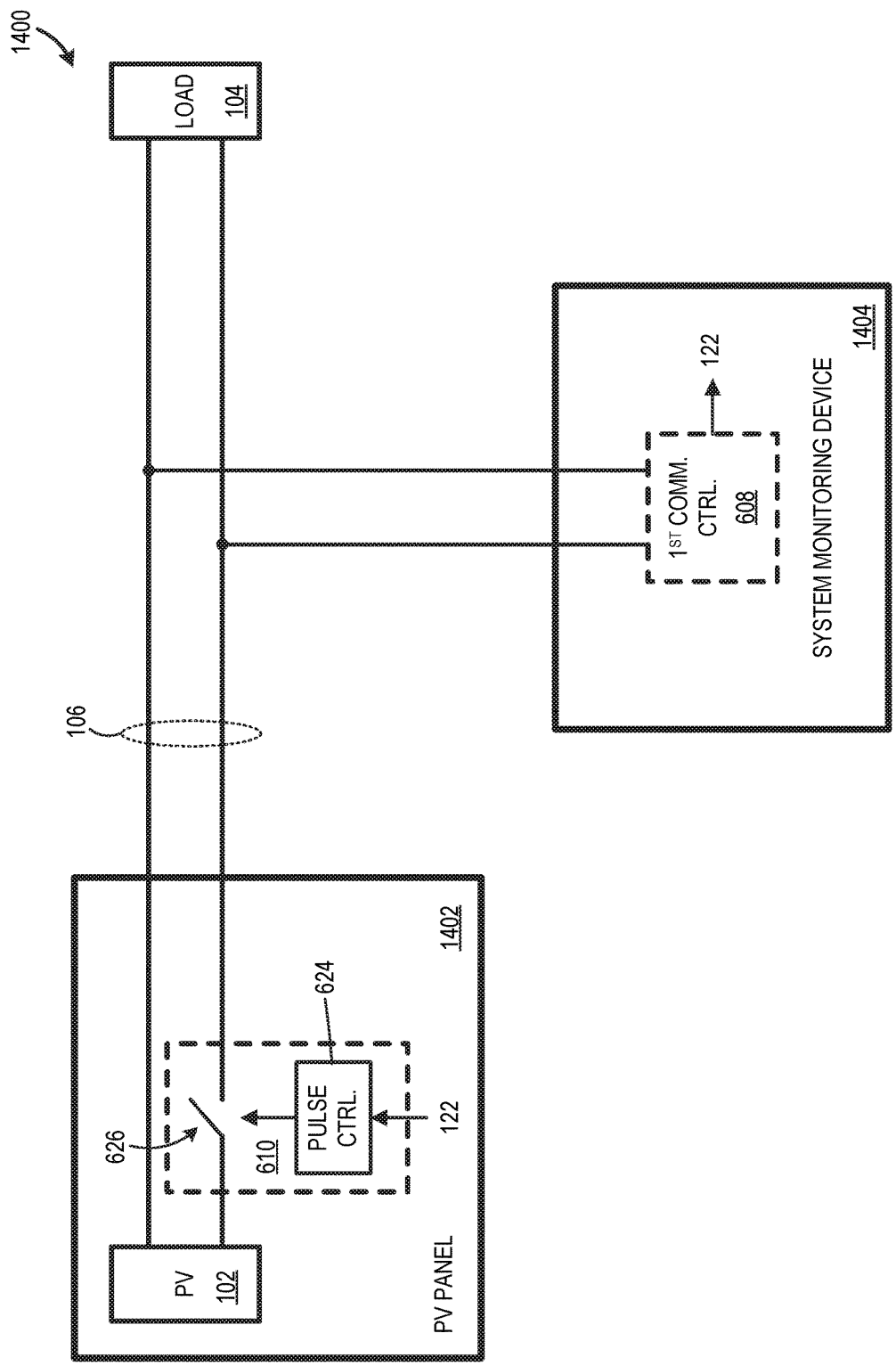
FIG. 14 illustrates a photovoltaic system like that of FIG. 6, but a where second communication controller is co-packaged with photovoltaic device in a photovoltaic panel, and where a first communication controller is part of a system monitoring device, according to an embodiment.

As yet another example, FIG. 14 illustrates a photovoltaic system 1400, which is similar to photovoltaic system 600 of FIG. 6, but where second communication controller 610 is co-packaged with photovoltaic device 102 in a photovoltaic panel 1402, and first communication controller 608 is part of a system monitoring device 1404. In this system, second communication controller 610 communicates status or fault information of photovoltaic device 102 to first communication controller 608, to enable monitoring by system monitoring device 1404. Details of first communication controller 608 are not shown in FIG. 13 to promote illustrative clarity.

Figure 15:
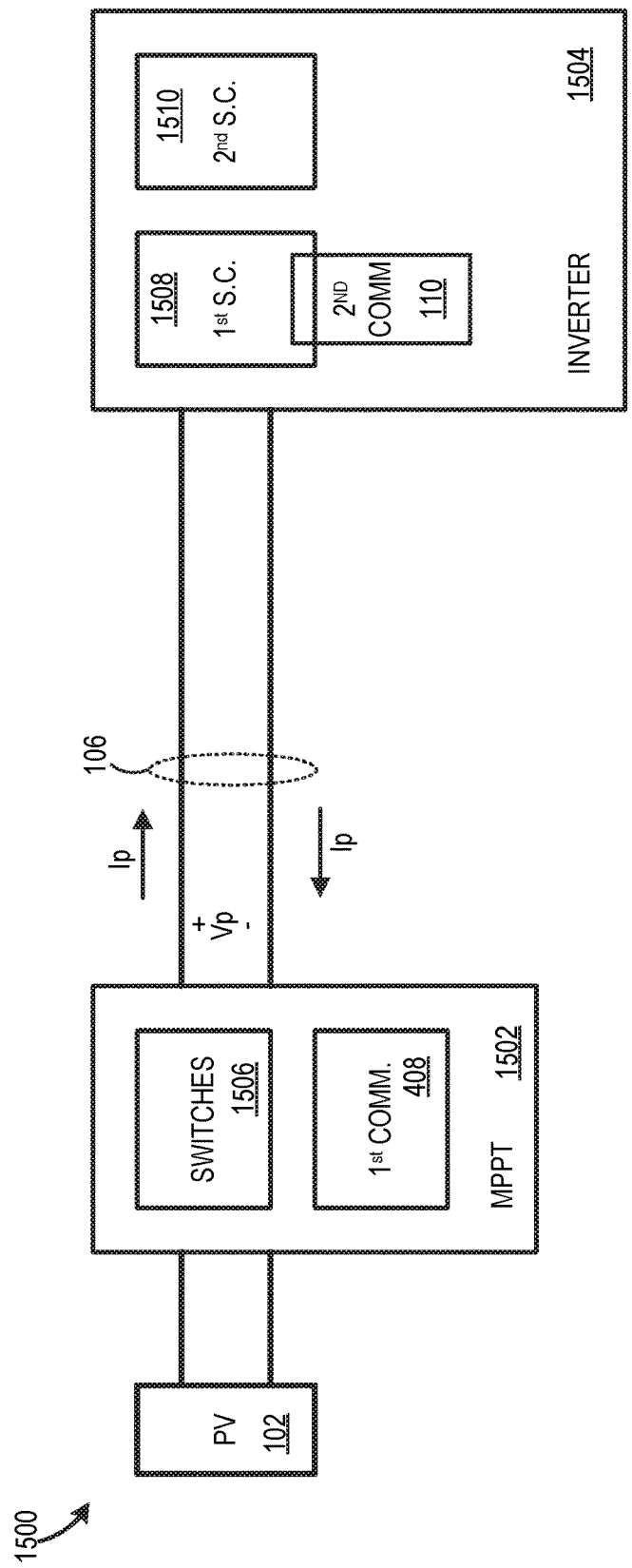
FIG. 15 illustrates a photovoltaic system which is similar to the FIG. 4 photovoltaic system, but where a first communication controller is part of an MPPT controller, and a second communication controller is part of an inverter, according to an embodiment.

In some embodiments, first communication controller 108, 408, 608, 808, or 1008 and/or second communication controller 110, 610, or 1010 share one or more components with another photovoltaic system element. For example, FIG. 15 illustrates a photovoltaic system 1500, which is similar to photovoltaic system 400 of FIG. 4, but where first communication controller 408 is part of an MPPT controller 1502, and second communication controller 110 is part of an inverter 1504, where inverter 1504 serves as load 104. MPPT controller 1502 is electrically coupled between photovoltaic device 102 and power line 106, and MPPT controller 1502 is capable of causing one or more switching devices 1506 therein to repeatedly switch between their conductive and non-conductive states in a manner which maximizes transfer of power from photovoltaic device 102 to inverter 1504. MPPT controller 1502 has, for example, a buck-type, boost-type, or buck-boost-type topology. Current sensing circuitry used for MPPT in MPPT controller 1502 also serves as current sensing module 412 in some embodiments. Details of first communication controller 408 and second communication controller 110 are not shown in FIG. 15 to promote illustrative clarity.

In some alternate embodiments, first communication controller 408 is replaced with first communication controller 108 of FIG. 1. In these embodiments, voltage sensing circuitry used for MPPT in MPPT controller 1502 also serves as voltage sensing module 112. Voltage Vp may be directly sensed, or voltage Vp may be estimated, such as from a duty cycle of one or more switching circuits 1506.

In some embodiments, second communication controller 110 sends disable and enable commands to first communication controller 408, and in these embodiments, MPPT controller 1502 is capable of controlling switching devices 1506 to enable or disable availability of power from photovoltaic device 102 to power line 106, thereby changing operating mode of MPPT controller 1502. In certain embodiments supporting disabling and enabling, MPPT controller 1502 causes photovoltaic device 102 to provide a small amount of power to power line 106 in the disable operating mode, to allow for communication of information via power line 106 during the disable mode. For example, in a particular embodiment, MPPT controller 1502 reduces voltage Vp on power line 106 to about twenty volts in response to receiving a disable command from second communication controller 110.

Inverter 1504 includes a first switching circuit 1508 and a second switching circuit 1510. Second switching circuit 1510 converts DC power from photovoltaic device 102 into AC power. In some embodiments, second switching circuit 1510 has a half-bridge or a full-bridge topology. First switching circuit 1508 interfaces second switching circuit 1510 with power line 106. In certain embodiments, first switching circuit 1508 has a boost-type topology for increasing magnitude of voltage Vp to a voltage that is suitably high for use by second switching circuit 1510. First switching circuit 1508 optionally further includes MPPT capability to maximize power extracted from photovoltaic device 102.

Second communication controller 110 uses one or more switching devices of first switching circuit 1508, as symbolically illustrated by the overlap of second communication controller 110 and first switching circuit 1508, to change operation of power line 106 in the voltage domain, current domain, or power domain, as well as to generate pulses on power line 106 to transmit information. For example, in some embodiments, one or more switches of first switching circuit 1508 shunt power line 106 to transfer information, such as in a manner similar to that discussed above with respect to FIGS. 2, 3, and 5. As another example, in some other embodiments, one or more switches of first switching circuit 1508 impede flow of current Ip through power line 106 to transfer information, such as in a manner similar to that discussed above with respect to FIGS. 7 and 9. As another example, in some other embodiments, one or more switches of first switching circuit 1508 change magnitude of power drawn by inverter 1504 to transfer information, such as in a manner similar to that discussed above with respect to FIG. 11. As yet another example, in some other embodiments, first switching circuit 1508 increases magnitude of voltage Vp to a value higher than the open circuit voltage of photovoltaic device 102, such that inverter 1504 injects current into power line 106 and polarity of current Ip reverses, causing power to flow through power line 106 from inverter 1504 to photovoltaic device 102, thereby changing operation of power line 106. In these particular embodiments, detecting module 414 is configured to generate current signal 420 in response to current signal 418 representing a change in polarity of a DC component of current Ip, which indicates "reverse" flow of power in photovoltaic system 1500, i.e., from inverter 1504 to photovoltaic device 102.

Furthermore, in some embodiments, second communication controller 110 is configured to encode operating state of power line 106 to represent and transmit information by causing first switching circuit 1508 to change voltage Vp, current Ip, or power through power line 106 between two or more non-zero values to transfer information, such as based on peak magnitude, frequencies, and/or patterns in the voltage, current, or power domains. For example, in particular embodiments, second communication controller 110 causes first switching circuit 1508 to generate a sine wave, a triangle wave, or a square wave in the voltage, current, or power domains to represent and transmit information from inverter 1504 to MPPT controller 1502 via power line 106.

Figure 16:
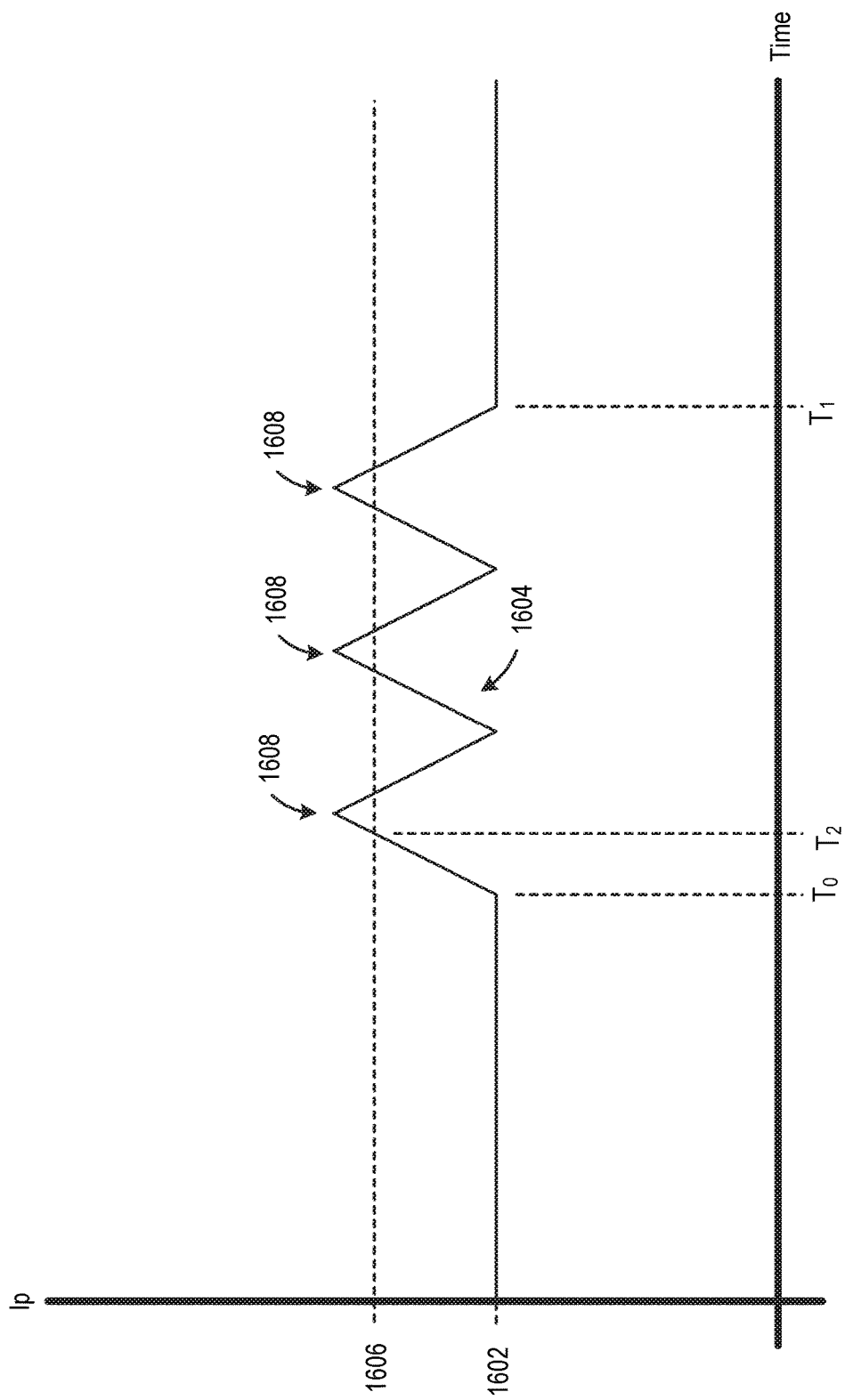
FIG. 16 illustrates one example of the FIG. 15 photovoltaic system transmitting information across a power line via a triangle wave generated by the inverter, according to an embodiment.

FIG. 16 illustrates one example of system 1600 transmitting information across power line 106 via a triangle wave generated by inverter 1604. Prior to time $T_0$, current Ip flowing through power line 106 has value 1602 which is, for example, a maximum power point current of photovoltaic device 102. At time $T_0$, second communication controller 110 causes switching devices in first switching circuit 1508 to switch such that current Ip has a triangle wave 1604 shape until time $T_1$. Current sensing module 412 of first communication controller 408 generates current signal 418 representing current Ip. Detecting module 414 detects current Ip rising above a threshold value 1606 at time $T_2$, and in response, detecting module 414 asserts change signal 420. Decoding module 416 then decodes triangle wave 1604, such as based on the number, frequency, and/or pattern of peaks 1608 in the triangle wave, to obtain information 122, in response to assertion of change signal 420.

Figure 17:
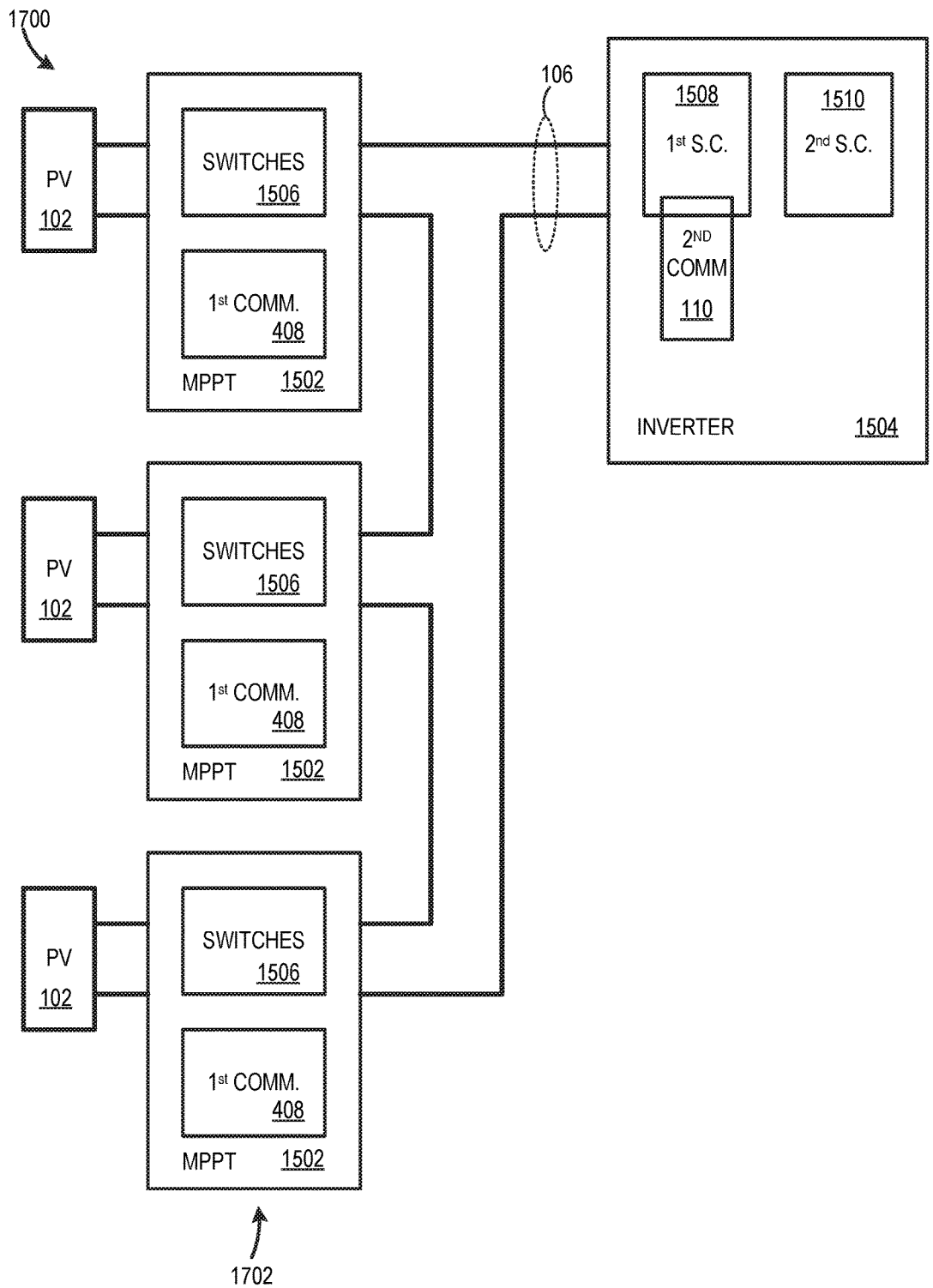
FIG. 17 illustrates a photovoltaic system which is similar to the FIG. 15 photovoltaic system, but including multiple MPPT controllers with their outputs electrically coupled in series to form a string, according to an embodiment.

It is anticipated that some photovoltaic systems will include multiple instances of first communication controller 108, 408, 608, 808, or 1008 and/or second communication controller 110, 610, or 1010, to allow for communication between more than two points. For example, FIG. 17 illustrates a photovoltaic system 1700, which is similar to photovoltaic system 1500 of FIG. 15, but including multiple MPPT controllers 1502 with their outputs electrically coupled in series to form a string 1702. String 1702 is electrically coupled to inverter 1504 via power line 106. Each MPPT controller 1502 is electrically coupled between a respective photovoltaic device 102 and power line 106. A first communication controller 408 is incorporated in each MPPT controller 1502, and therefore, second communication controller 110 in inverter 1504 is capable of communicating with each MPPT controller 1502 over power line 106. The number of strings 1702 and the number of MPPT controllers 1502 within each string 1702 may be varied without departing from the scope hereof.

Furthermore, any of the photovoltaic systems discussed above could be modified to support bidirectional communication over a power line. For example, in another alternate embodiment of photovoltaic system 100, a first communication controller 108 and a second communication controller 110 are co-packaged with photovoltaic device 102, and a first communication controller 108 and a second communication controller 110 are co-packaged with load 104. These dual instances of first communication controller 108 and second communication controller 110 enable two-way communication between photovoltaic device 102 and load 104 via power line 106.

Figure 18:
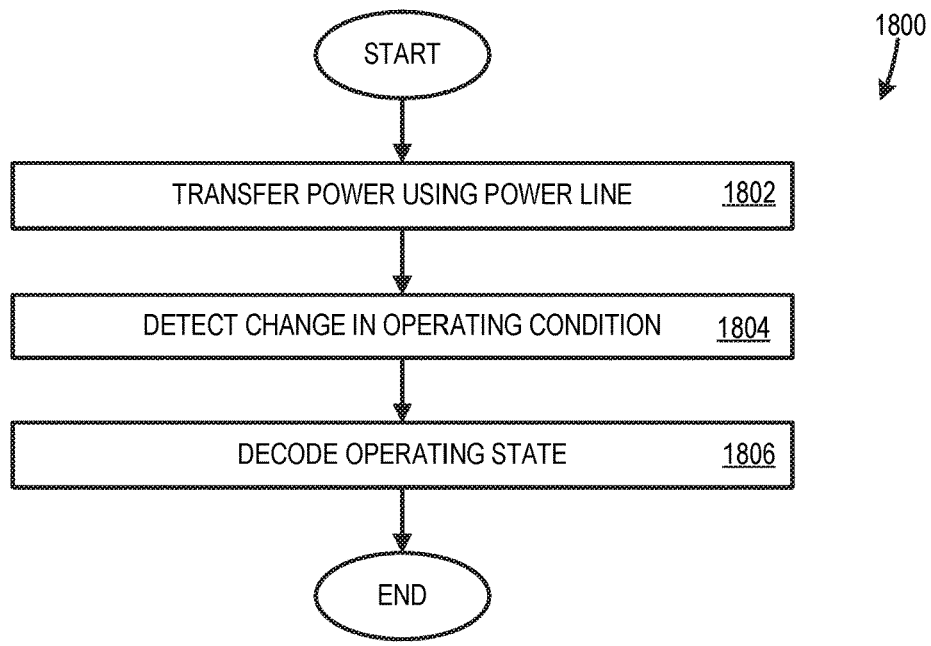
FIG. 18 illustrates a method for DC power line communication in a photovoltaic system, according to an embodiment.

FIG. 18 illustrates a method 1600 for DC power line communication in a photovoltaic system. In step 1802, power is transferred between a photovoltaic device and a load using a power line. In one example of step 1802, power is transferred between photovoltaic device 102 and load 104 using power line 106. (See FIG. 1). In step 1804, a change in operation of the power line is detected. In one example of step 1804, detecting module 116 detects voltage Vp on power line 106 dropping below a threshold value. In step 1806, operating state of the power line is decoded to obtain information, such as by decoding one or more pulses on the power line, in response to the detected change in operation of the power line. In one example of step 1806, decoding module 116 decodes data pulses 308 and 310 on power line 106 to obtain information 122. (See FIGS. 1 and 3).

Figure 19:
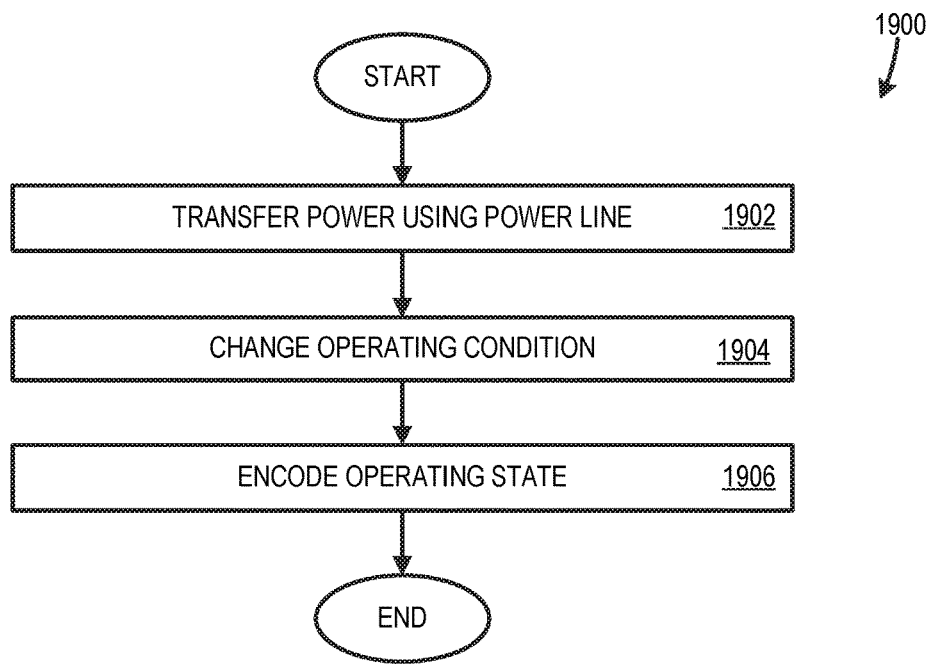
FIG. 19 illustrates another method for DC power line communication in a photovoltaic system, according to an embodiment.

FIG. 19 illustrates a method 1900 for DC power line communication in a photovoltaic system. In step 1902, power is transferred between a photovoltaic device and a load using a power line. In one example of step 1902, power is transferred between photovoltaic device 102 and load 104 using power line 106. (See FIG. 1). In step 1904, operation of the power line is changed. In one example of step 1904, pulse control module 124 causes switching device 126 to switch from its non-conductive state to its conductive state. In step 1906, operating state of the power line is encoded to represent information to be communicated, such as by generating one or more pulses on the power line to represent the information. In one example of step 1906, pulse control module 124 causes switching device 126 to switch between its conductive and non-conductive states several times to generate pulses 304-314. (See FIGS. 1 and 3).

Magnitude of current generated by a photovoltaic device will vary due to a number of factors, including but not limited to, available irradiance, ambient temperature, photovoltaic device aging, photovoltaic device soiling, and photovoltaic device shading. Consequently, photovoltaic device current magnitude may be low under certain maximum power point operating conditions, such as during early morning or late afternoon when available irradiance is low, or when the sun is partially obscured by a cloud. Such low current magnitude could be misconstrued as an event occurrence, such as a shutdown condition, in embodiments configured to detect change in operation in the current domain.

Figure 20:
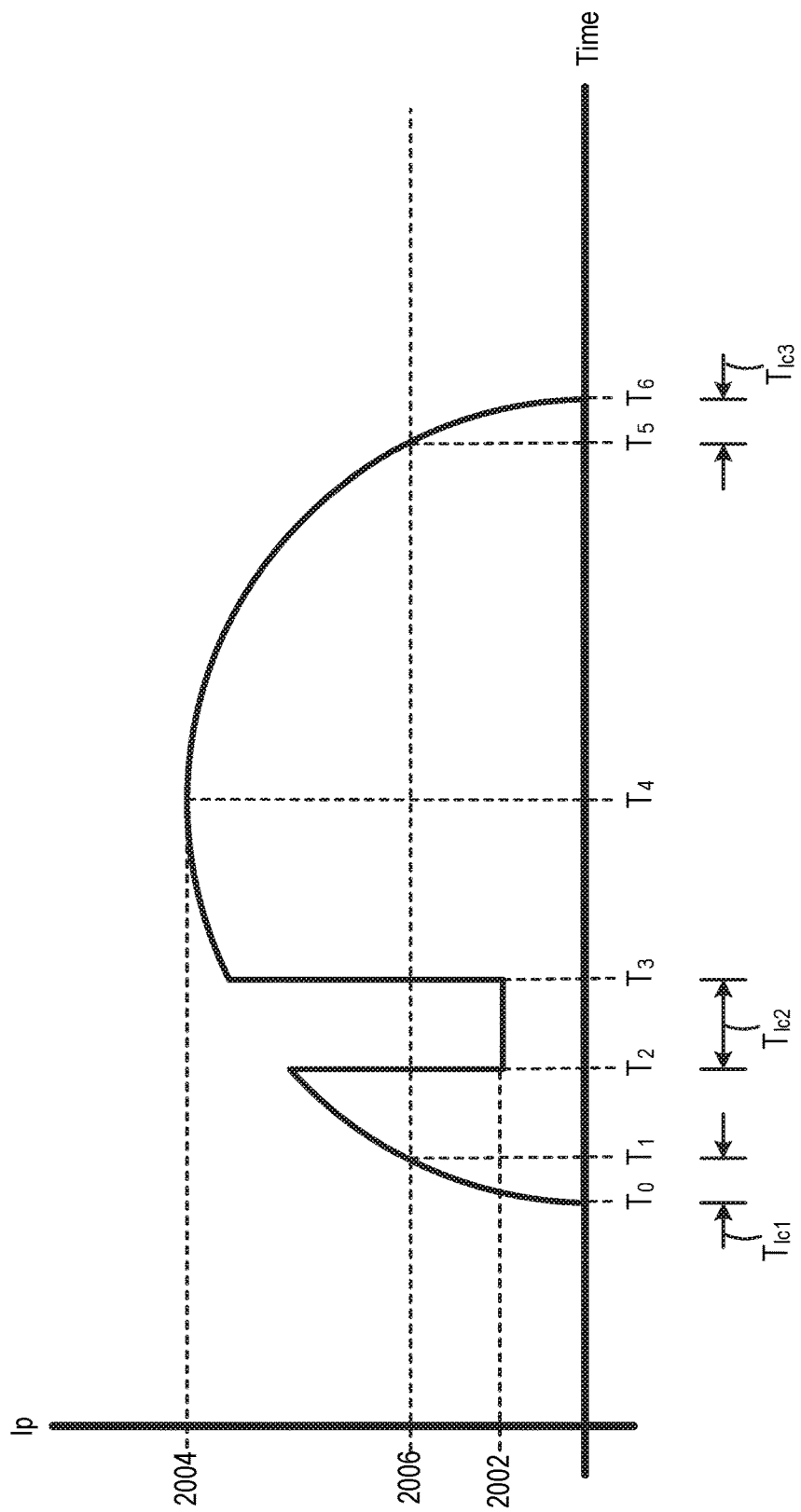
FIG. 20 illustrates one example of operation of the FIG. 8 photovoltaic system where low current magnitude is misconstrued as an event occurrence, according to an embodiment.

For example, FIG. 20 illustrates one example of operation of photovoltaic system 800 (FIG. 8) where low current magnitude is misconstrued as an event occurrence. In this example, sunrise occurs at $T_0$, and magnitude of current Ip begins to increases with the rising sun. From time $T_2$ to $T_3$, however, clouds partially obscure the sun, and magnitude of current Ip therefore drops to value 2002. At time $T_3$, the clouds clear, causing magnitude of current Ip to rise to a peak value of 2004 at time $T_4$. Time $T_4$ corresponds to noon, for example. Irradiance decreases after time $T_4$ due to movement of the sun, and magnitude of current Ip therefore decreases until current Ip reaches zero at time $T_6$ corresponding to sunset.

In the FIG. 20 example, detecting module 814 generates a change signal 820 in response to magnitude of current Ip dropping below a threshold value 2006. Consequently photovoltaic system 800 misconstrues the relatively low magnitude of current during each of time periods $T_{lc1}$, $T_{lc2}$, and $T_{lc3}$ as an event occurrence.

Figure 21:
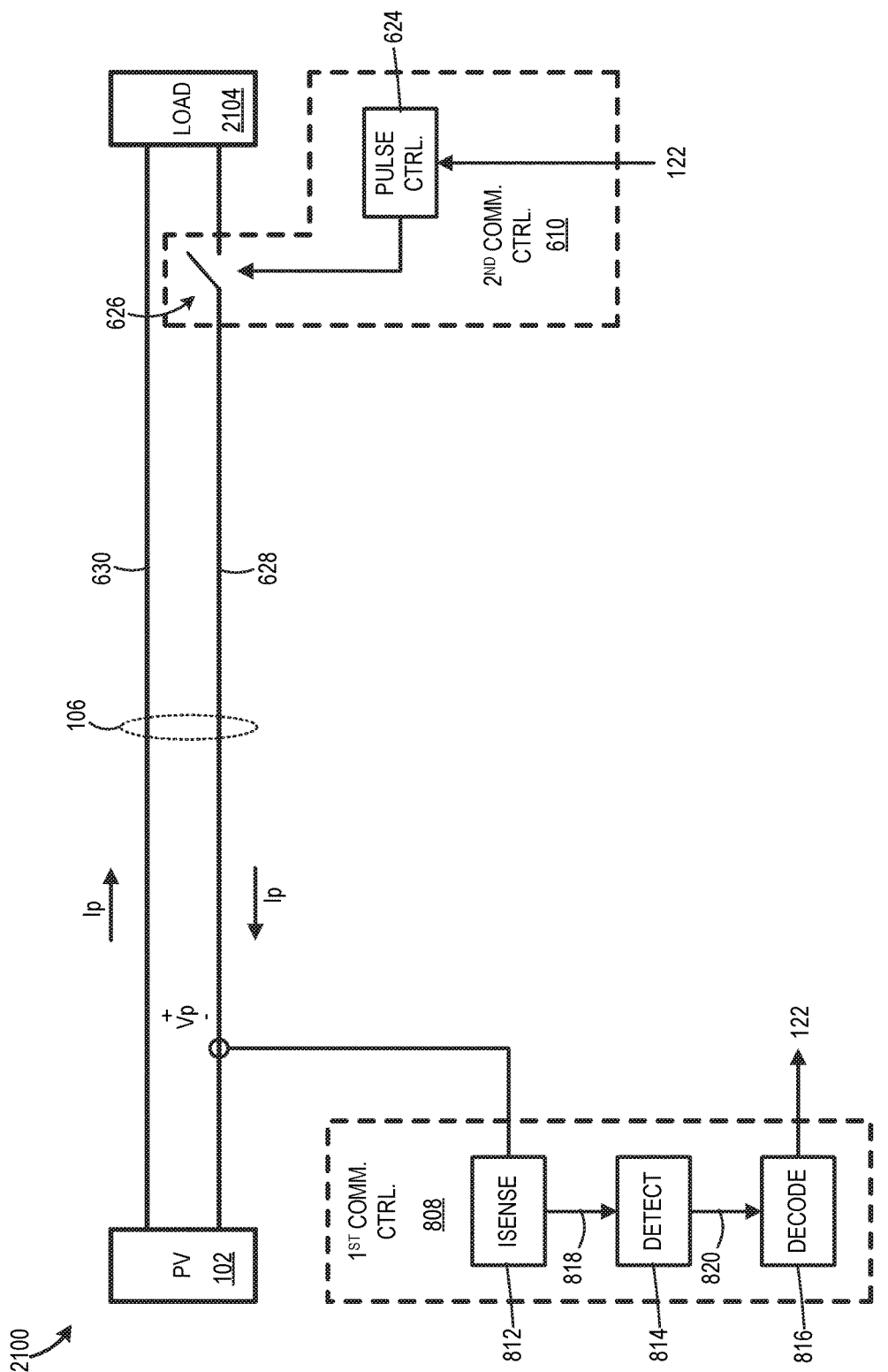
FIG. 21 illustrates a photovoltaic system capable of DC power line communication by changing operation of a power line in the current domain and including a load configured to ensure that power line current magnitude remains above a threshold value during operation of the photovoltaic system, according to an embodiment.

Applicant has determined that misconstruing low current magnitude as an event occurrence can be prevented by ensuring that current magnitude remains above a detection threshold during normal photovoltaic system operation. For example, FIG. 21 illustrates a photovoltaic system 2100, which is like photovoltaic system 800 of FIG. 8, but where load 104 is replaced with a load 2104 configured to ensure that magnitude of current Ip remains above a threshold value 2106 of detecting module 814 during normal operation of photovoltaic system 2100, where detecting module 814 generates a change signal 820 in response to current Ip falling below threshold value 2106. In some embodiments, load 2104 is an inverter configured to perform MPPT to maximize power provided by photovoltaic device 102 to load 2104 in a manner which ensures that magnitude of current Ip remains above threshold value 2106 during normal operation of photovoltaic system 2100. Second communication controller 610 is optionally combined with load 2104, and photovoltaic system 2100 could be modified to include additional photovoltaic devices 102 and first communication controllers 808 without departing from the scope hereof.

Figure 22:
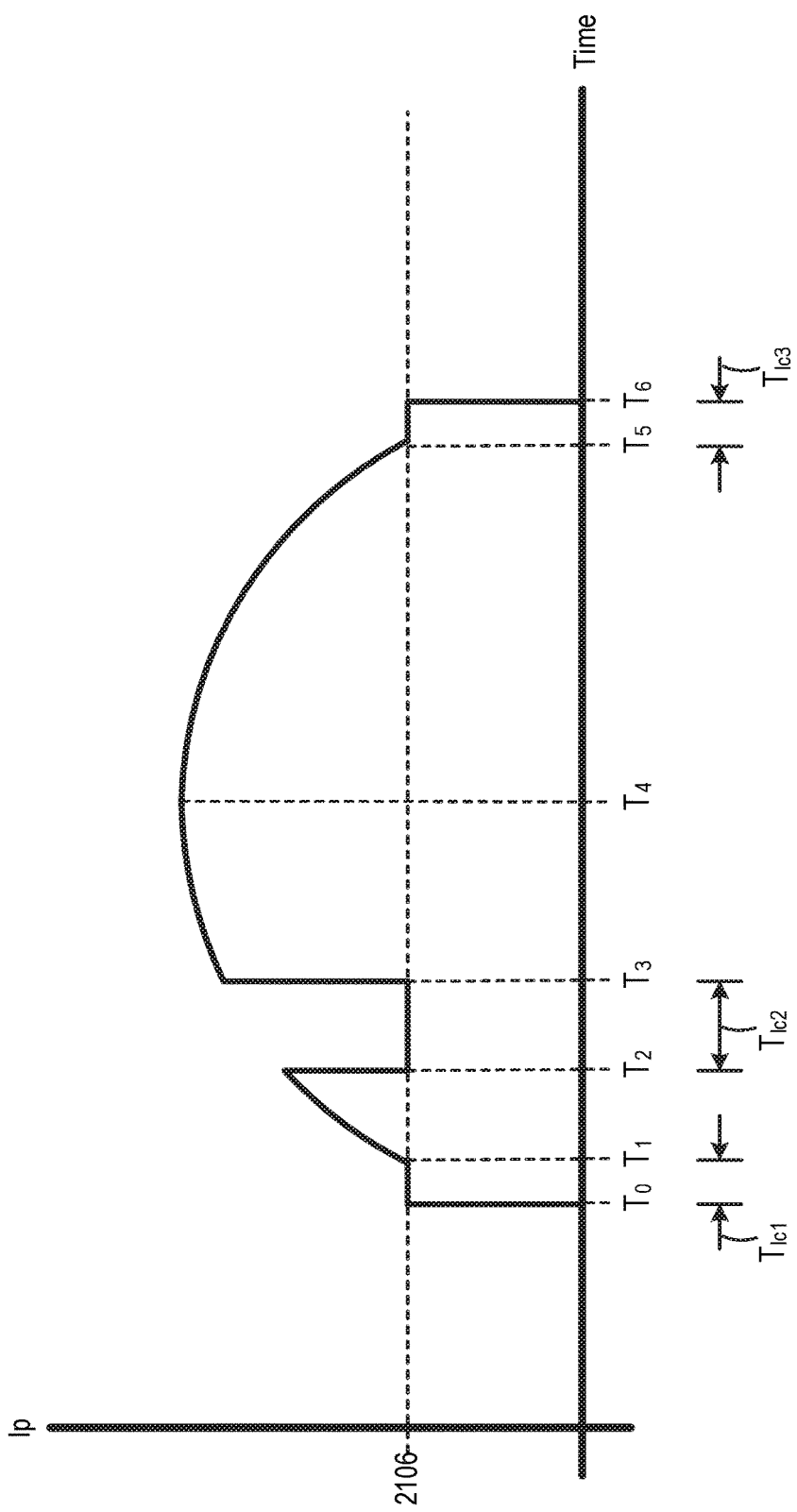
FIG. 22 illustrates one example of operation of FIG. 21 photovoltaic system analogous to the illustrated example of FIG. 20, according to an embodiment.

FIG. 22 illustrates one example of operation of photovoltaic system 2100 analogous to the illustrated example of FIG. 20. In contrast to the FIG. 20 example, however, load 2104 ensures that magnitude of current Ip remains above threshold value 2106 at all times, even during low-irradiance time periods $T_{lc1}$, $T_{lc2}$, and $T_{lc3}$. Consequently, photovoltaic system 2100 does not erroneously detect occurrence of an event during low irradiance periods.

The fact that load 2104 is configured to ensure that current Ip remains above threshold value 2106 during normal operation may cause photovoltaic device 102 to operate away from its maximum power point when the maximum power point current of the photovoltaic device is less than threshold value 2106. Applicant has determined that this potential drawback of photovoltaic system 2100 can be at least partially overcome by incorporating local MPPT with each photovoltaic device 102, thereby enabling each photovoltaic device 102 to operate at its maximum power point even when magnitude of current Ip is greater than the maximum power point current of the photovoltaic device.

Figure 23:
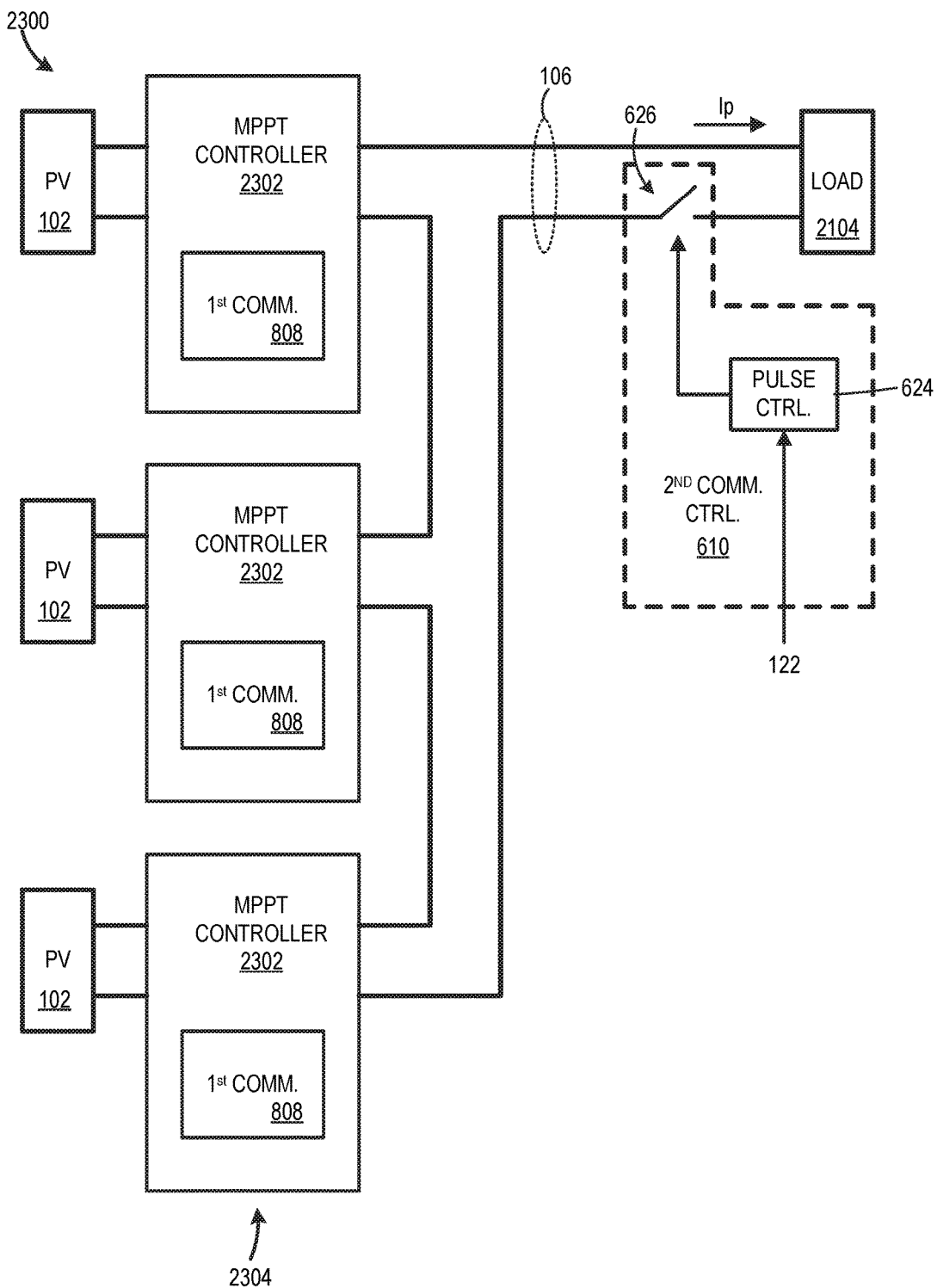
FIG. 23 illustrates a photovoltaic system which is similar to the FIG. 21 photovoltaic system, but includes multiple MPPT controllers with their outputs electrically coupled in series to form a string, according to an embodiment.

For example, FIG. 23 illustrates a photovoltaic system 2300 which is similar to photovoltaic system 2100 of FIG. 21, but includes multiple MPPT controllers 2302 with their outputs electrically coupled in series to form a string 2304. String 2304 is electrically coupled to load 2104 via power line 106. Each MPPT controller 2302 is electrically coupled between a respective photovoltaic device 102 and power line 106. A respective first communication controller 808 instance is incorporated in each MPPT controller 2302, and therefore, second communication controller 610 is capable of communicating with each MPPT controller 2302 over power line 106. Details of first communication controllers 808 are not shown in FIG. 23 to promote illustrative clarity. Each MPPT controller 2302 causes its respective photovoltaic device 102 to independently operate at its maximum power point even when the photovoltaic device's maximum power point current magnitude is below current Ip through power line 106, as constrained by load 2104. The number of strings 2304 and the number of MPPT controllers 2302 and photovoltaic devices 102 within each string 2304 may be varied without departing from the scope hereof. First communication controllers 808 could be separate from MPPT controllers 2302 without departing from the scope hereof.

Figure 24:
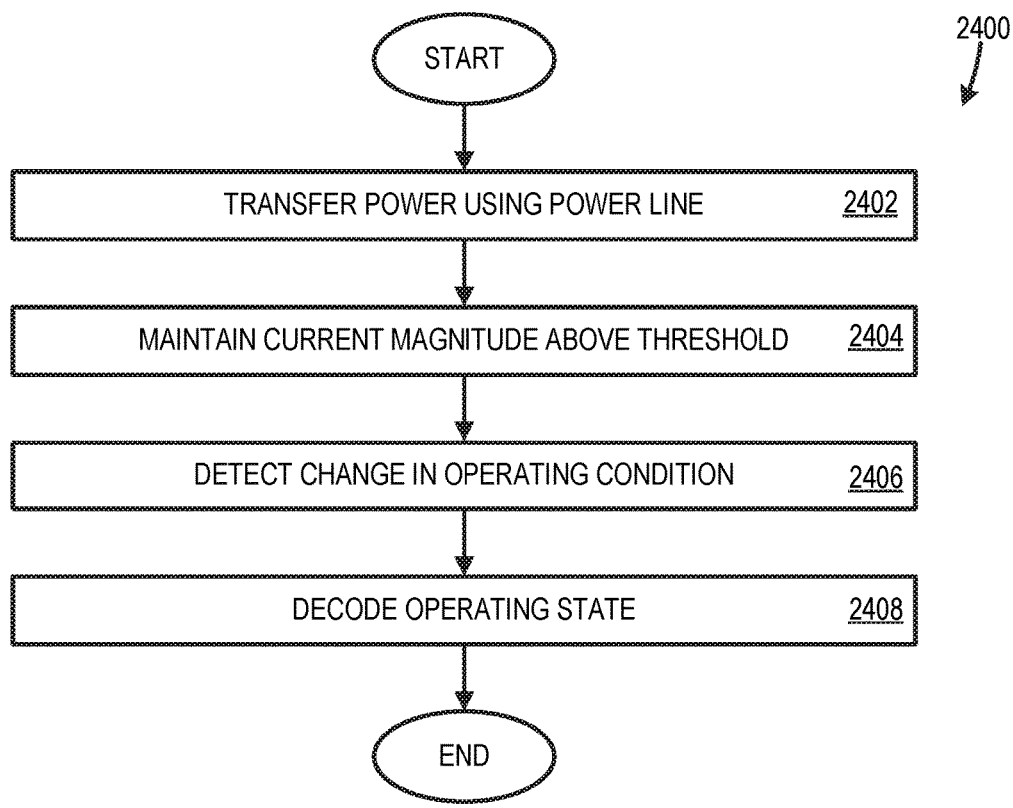
FIG. 24 illustrates another method for DC power line communication in a photovoltaic system, according to an embodiment.

FIG. 24 illustrates a method 2400 for DC power line communication in a photovoltaic system. In step 2402, power is transferred between at least one photovoltaic device and a load using a power line. In one example of step 2402, power generated by each photovoltaic device 102 in system 2300 of FIG. 23 is transferred to load 2104 via power line 106. In step 2404, magnitude of current flowing through the power line is maintained above a threshold value in a normal operating mode of the photovoltaic system. In one example of step 2404, load 2104 is an inverter which performs maximum power tracking in manner which ensures that magnitude of current Ip remains above threshold value 2106 during normal operation of photovoltaic system 2100.

In step 2406, a change in operation of the power line is detected in response to magnitude of a DC component of the current flowing through the power line falling below the threshold value. In one example of step 2406, detecting module 814 detects a DC component of current Ip flowing through power line 106 dropping below the threshold value. In step 2408, operating state of the power line is decoded to obtain information, such as by decoding one or more pulses on the power line, in response to the detected change in operation of the power line. In one example of step 2408, decoding module 816 decodes data 904 on power line 106 to obtain information 122. (See FIGS. 8 and 9).

Method 2400 optionally further includes independently performing maximum power point tracking for each photovoltaic device. In one example of this optional step, each MPPT controller 2302 causes its respective photovoltaic device 102 to independently operate at its maximum power point even when the photovoltaic device's maximum power point current magnitude is below current Ip through power line 106.

Applicant has additionally determined that MPPT activity in a photovoltaic system can be detected by monitoring electrical characteristics of a DC power line in the time or frequency domain. Detected MPPT activity can be used, for example, to enable and disable photovoltaic devices in accordance with system-level MPPT inverter operation. In certain embodiments, detected MPPT activity is deemed to indicate that a system-level MPPT inverter is operating, and photovoltaic devices are enabled in response. Conversely, in these embodiments, lack of detected MPPT activity is deemed to indicate that the system-level MPPT inverter is not operating, and photovoltaic devices are disabled in response. Accordingly, in certain embodiments, photovoltaic devices are enabled and disabled in accordance with detected MPPT activity of an inverter, thereby potentially eliminating the need for infrastructure to communicate enable/disable commands from the inverter to the photovoltaic devices.

Figure 25:
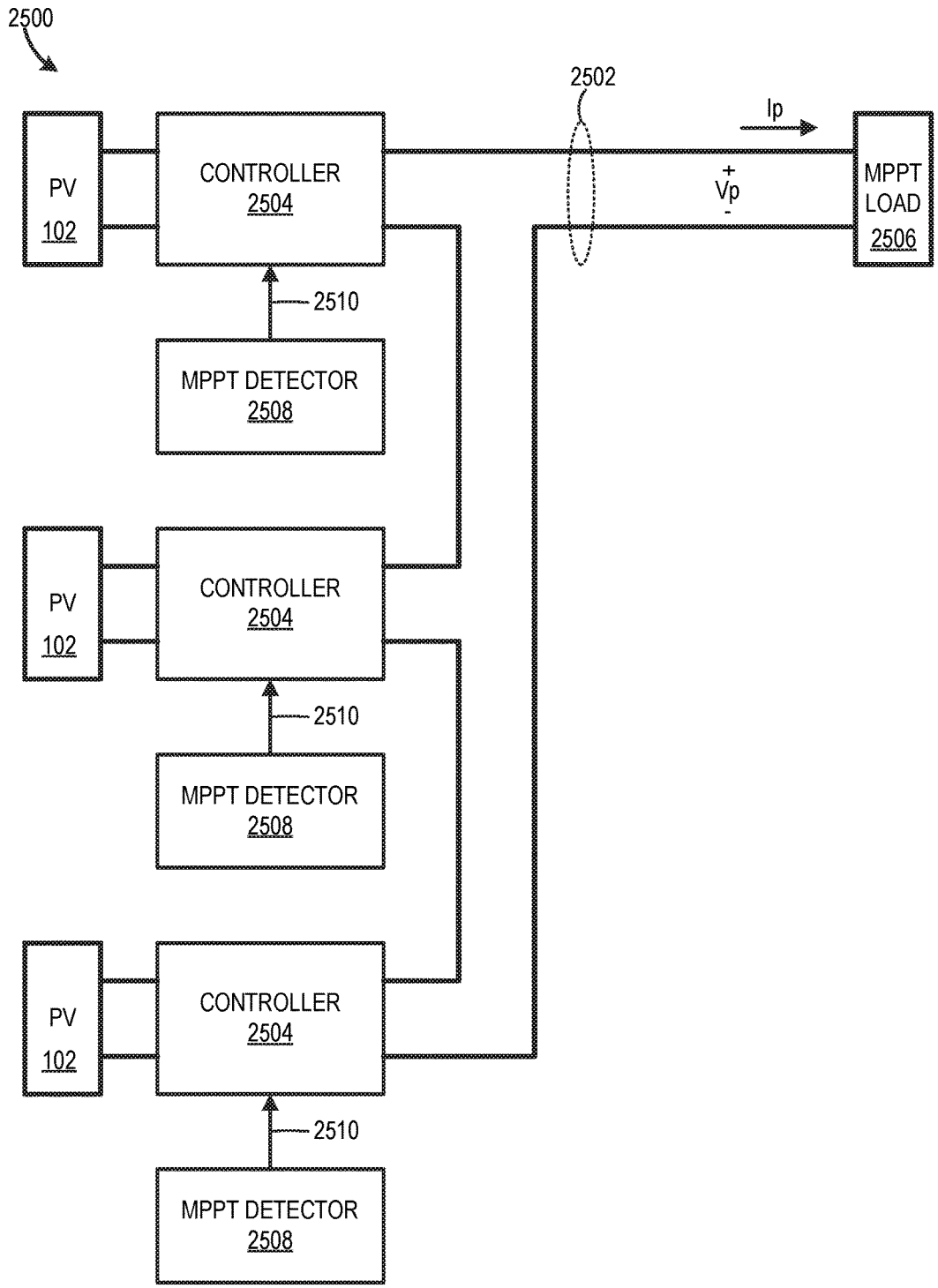
FIG. 25 illustrates a photovoltaic system that is capable of detecting MPPT activity, according to an embodiment.

FIG. 25 illustrates a photovoltaic system 2500 that is capable of detecting MPPT activity. Photovoltaic system 2500 includes one or more photovoltaic devices 102 electrically coupled to a power line 2502 via respective controllers 2504. Power line 2502 electrically couples each controller 2504 to a load 2506, such that photovoltaic devices 102 are electrically coupled to load 2506 via controllers 2504 and power line 2502. Load 2506 is configured to perform MPPT to maximize power collectively provided by photovoltaic devices 102 to load 2506. Load 2506 is, for example, an inverter for transforming DC power from photovoltaic devices 102 to AC power. Load 2506 could take other forms, however, without departing from the scope hereof, as long as load 2506 is capable of performing MPPT. For example, load 2506 could encompass two or more discrete elements, such as an MPPT controller electrically coupled to an inverter or a battery charger. The number of photovoltaic devices 102 and the manner that they are connected to load 2506 could vary without departing from the scope hereof. For example, although FIG. 25 illustrates photovoltaic devices 102 being connected to load 2506 in series, some or all of photovoltaic devices 102 could alternately be connected to load 2506 in parallel.

Photovoltaic system 2500 further includes a respective MPPT detector 2508 for each controller 2504, where each MPPT detector 2508 is configured to detect MPPT activity of load 2506 from electrical characteristics of power line 2502 in the time or frequency domain. Each MPPT detector 2508 is configured to assert a respective detection signal 2510 in response to detecting MPPT activity of load 2506, and each MPPT detector 2508 is further configured to de-assert its respective detection signal 2510 in response to not detecting MPPT activity of load 2506. Thus, the state of each detection signal 2510 indicates whether its respective MPPT detector 2508 has detected MPPT activity of load 2506. Detection signal 2510 is either a digital signal or an analog signal. In cases where detection signal 2510 is a digital signal, the asserted state of detection signal 2510 could correspond to either logic high or logic low, depending on the configuration of MPPT detectors 2508.

Each MPPT detector 2508 is configured to communicatively couple its detection signal 2510 to its respective controller 2504, and the controller is configured to enable and disable its respective photovoltaic device 102 at least partially based on the state of the detection signal. For example, in a particular embodiment, each controller 2504 is configured to enable its respective photovoltaic device 102 in response to detection signal 2510 from its respective MPPT detector 2508 being asserted, and in this embodiment, each controller 2504 is further configured to disable its respective photovoltaic device 102 in response to detection signal 2510 from its respective MPPT detector 2508 being de-asserted. Thus, in this embodiment, photovoltaic devices 102 are enabled and disabled in photovoltaic system 2500 at least partially according to whether load 2506 is performing MPPT.

Figure 26:
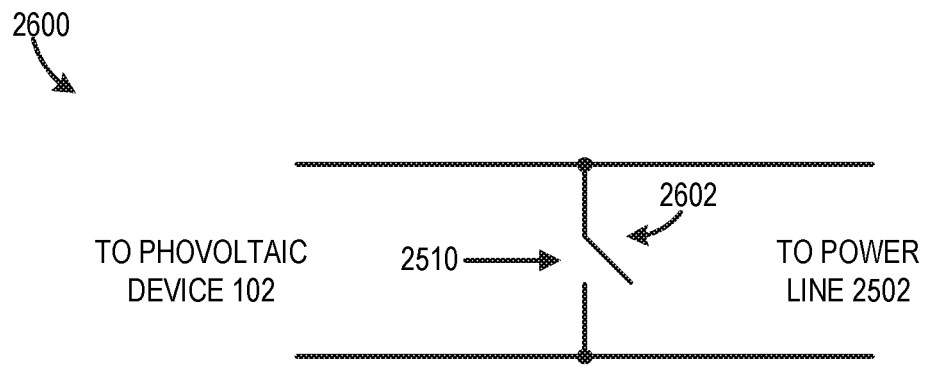
FIG. 26 illustrates one possible embodiment of a controller of the FIG. 25 photovoltaic system.

In some embodiments, each MPPT controller 2504 includes a switch electrically coupled in parallel or in series with its respective photovoltaic device 102 to enable and disable the photovoltaic device. For example, FIG. 26 illustrates a controller 2600, which is one possible embodiment of a controller 2504. Controller 2600 includes a switch 2602 electrically coupled in parallel with a respective photovoltaic device 102. Switch 2602 is configured to operate in its non-conductive state when a detection signal 2510 from a respective MPPT detector 2508 is asserted, so that the photovoltaic device 102 is enabled. Switch 2602 is further configured to operate in its conductive state when the detection signal 2510 from the respective MPPT detector 2508 is de-asserted, so that the photovoltaic device 102 is shorted and thereby disabled.

Figure 27:
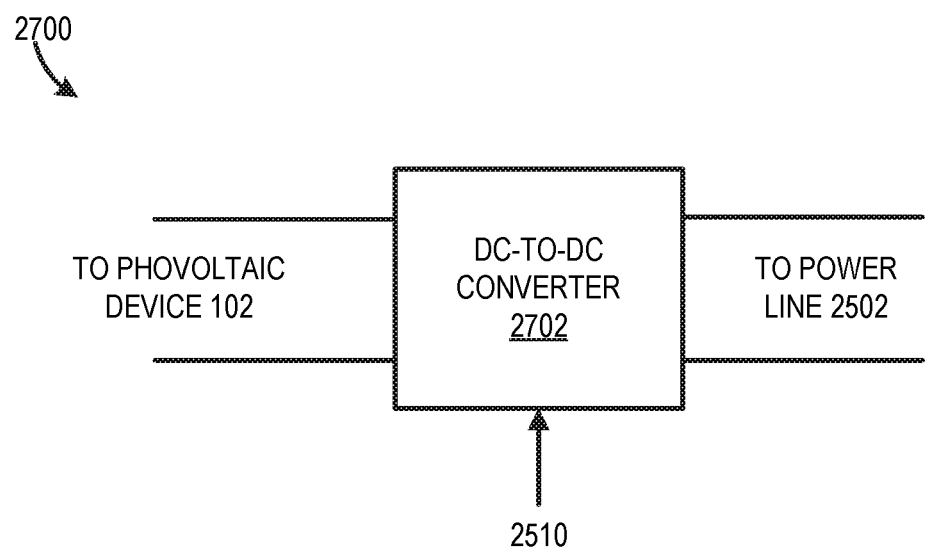
FIG. 27 illustrates another possible embodiment of a controller of the FIG. 25 photovoltaic system.

FIG. 27 illustrates a controller 2700, which is another possible embodiment of a controller 2504. Controller 2700 includes a DC-to-DC converter 2702, such as a buck converter, a boost converter, or a buck-boost converter, to interface its respective photovoltaic device 102 with power line 2502. DC-to-DC converter 2702 is configured to enable and disable its respective photovoltaic device 102 at least partially based on the state of detection signal 2510 from a respective MPPT detector 2508. In particular, DC-to-DC converter 2702 enables its respective photovoltaic device 102 in response to detection signal 2510 being asserted, and DC-to-DC converter 2702 disables its respective photovoltaic device 102 in response to detection signal 2510 being de-asserted. In some embodiments, DC-to-DC converter 2702 is further configured to perform MPPT to cause its respective photovoltaic device 102 to independently operate at its maximum power point.

MPPT detectors 2508 are implemented, for example, by electrical circuitry and/or by a processor executing instructions, in the form of firmware or software, stored in a memory. Although MPPT detectors 2508 and controllers 2504 are illustrated as discrete elements, one or more of these elements may be partially or completely combined without departing from the scope hereof. For example, some alternate embodiments of controller 2700 include an instance of MPPT detector 2508 in addition to DC-to-DC converter 2702, thereby eliminating the need for an MPPT detector separate from controller 2700. In such alternate embodiments, MPPT detector 2508 and DC-to-DC converter 2702 optionally share at least some common components.

Most MPPT algorithms periodically adjust photovoltaic system electrical operating conditions to find the photovoltaic system's maximum power point, such as using a "perturb and observe" algorithm as known in the art. Accordingly, certain embodiments of MPPT detectors 2508 detect MPPT activity of load 2506 from presence of a periodic electrical signal on power line 2502 generated by MPPT activity of load 2506. Discussed below are several possible implementations of MPPT detectors 2508 which detect MPPT activity from presence of a periodic electrical signal on power line 2502. It should be understood, however, that MPPT detectors 2508 are not limited to these particular implementations, and MPPT detectors 2508 could be implemented in other manners as long as MPPT detectors 2508 are capable of detecting MPPT activity of load 2506 from electrical characteristics of power line 2502 in the time or frequency domain.

Figure 28:
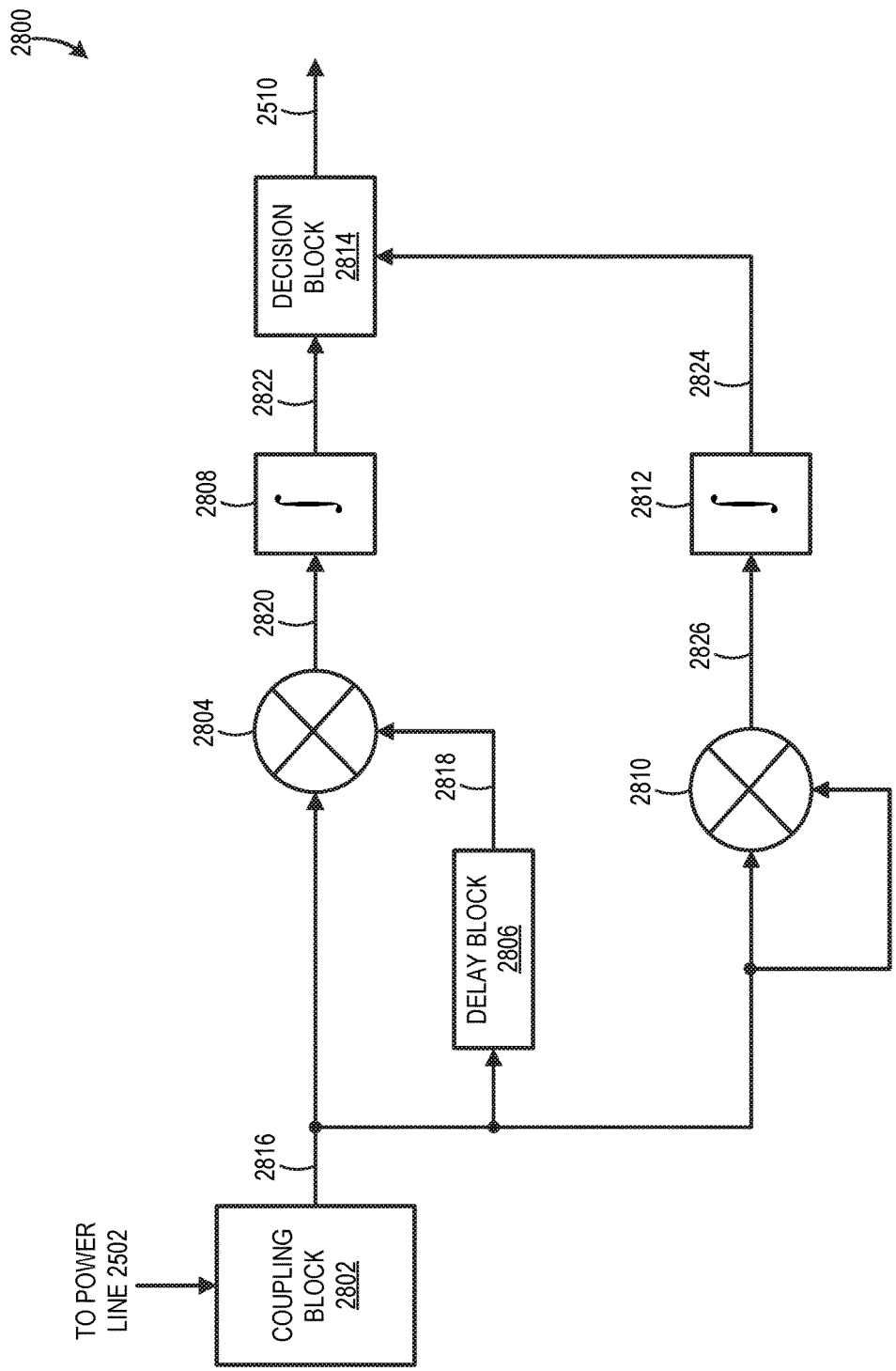
FIG. 28 illustrates one possible embodiment of an MPPT detector of the FIG. 25 photovoltaic system which uses autocorrelation to detect MPPT activity.

FIG. 28 illustrates a MPPT detector 2800, which is one possible embodiment of an MPPT detector 2508. MPPT detector 2800 includes a coupling block 2802, a first multiplication block 2804, a delay block 2806, a first integration block 2808, a second multiplication block 2810, a second integration block 2812, and a decision block 2814. Coupling block 2802 generates an AC component signal 2816 representing an AC component of either voltage Vp across power line 2502 or current Ip through power line 2502. AC component signal 2816 is an analog signal or a digital signal, depending on the configuration of coupling block 2802. In embodiments where AC component signal 2816 is an analog signal, coupling block 2802 includes, for example, a voltage divider to divide-down voltage Vp, an amplifier to amplify the divided-down voltage, and one or more capacitors to remove a DC component from the amplified divided-down voltage. In embodiments where AC component signal 2816 is a digital signal, coupling block 2802 includes, for example, a voltage divider to divide-down voltage Vp, an analog to digital converter (ADC) to convert the divided-down voltage to a digital signal, and a digital filter to remove a DC component from the digital signal.

MPPT detector 2800 asserts detection signal 2510 in response to an autocorrelation of AC component signal 2816 exceeding a reference value. In particular, delay block 2806 delays AC component signal 2816 over a range of autocorrelation lag values to generate a range of delay signals 2818, where the range of autocorrelation lag values is selected to encompass an expected period of an electrical signal on power line 2502 generated by MPPT activity of load 2506. First multiplication block 2804 multiplies AC component signal 2816 by each delay signal 2818 to generate a set of first multiplied signals 2820, and first integration block 2808 integrates each first multiplied signal 2820 over a predetermined period T to generate a set of autocorrelation signals 2822. Second multiplication block 2810 multiplies AC component signal 2816 by itself to generate a second multiplied signal 2826 corresponding to each first multiplied signal 2820, and second integration block 2812 integrates each second multiplied signal 2826 over period T to generate a respective reference signal 2824 for each autocorrelation signal 2822.

Each reference signal 2824 represents perfect correlation. Thus, the closer each autocorrelation signal 2822 is to its respective reference signal 2824, the greater the likelihood that the corresponding AC component signal 2816 includes an electrical signal with a period corresponding to the autocorrelation lag of the autocorrelation signal. Accordingly, decision block 2814 compares each autocorrelation signal 2822 to its respective reference signal 2824, and decision block 2814 asserts detection signal 2510 in response to a ratio of the autocorrelation signal 2822 to the reference signal 2824 exceeding a predetermined minimum threshold value.

Figure 29:
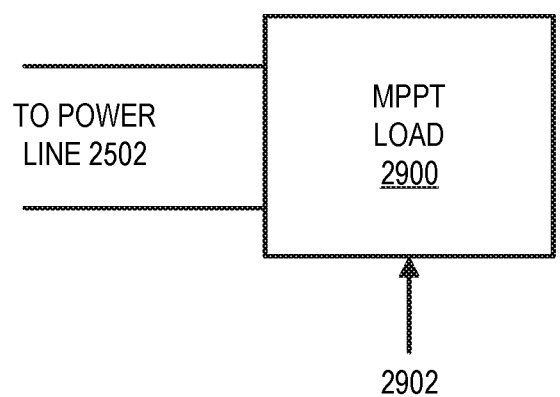
FIG. 29 illustrates an embodiment of a load of the FIG. 25 photovoltaic system configured to modulate power line voltage amplitude, power line current amplitude, or MPPT perturbation pulse width, according to a predetermined sequence.

MPPT perturbation step size may be increased beyond conventional values, and/or MPPT perturbation period can be selected to fall within a predetermined detection window, to enhance detectability in photovoltaic system 2500. Additionally, Applicant has determined that load 2506 can be configured to perform MPPT according to a specific pattern of alternating characteristics to improve signal-to-noise ratio and thereby improve reliability of MPPT activity detection. Accordingly, in certain embodiments, load 2506 is further configured to modulate power line 2502 voltage Vp amplitude, power line 2502 current amplitude Ip, and/or MPPT perturbation pulse width according to a sequence while performing MPPT, and MPPT detectors 2508 are configured to detect this sequence in an electrical signal on power line 2502, to thereby detect MPPT activity of load 2506. For example, FIG. 29 illustrates a load 2900 which is configured to modulate power line 2502 voltage Vp amplitude, power line 2502 current Ip amplitude, or MPPT perturbation pulse width according to a sequence 2902 while performing MPPT, for detection by an MPPT detector. Examples of possible sequences 2902 include, but are not limited to, pseudo noise (PN) codes such as Barker codes and Kasami codes, and other sequences with good autocorrelation properties.

Figure 30:
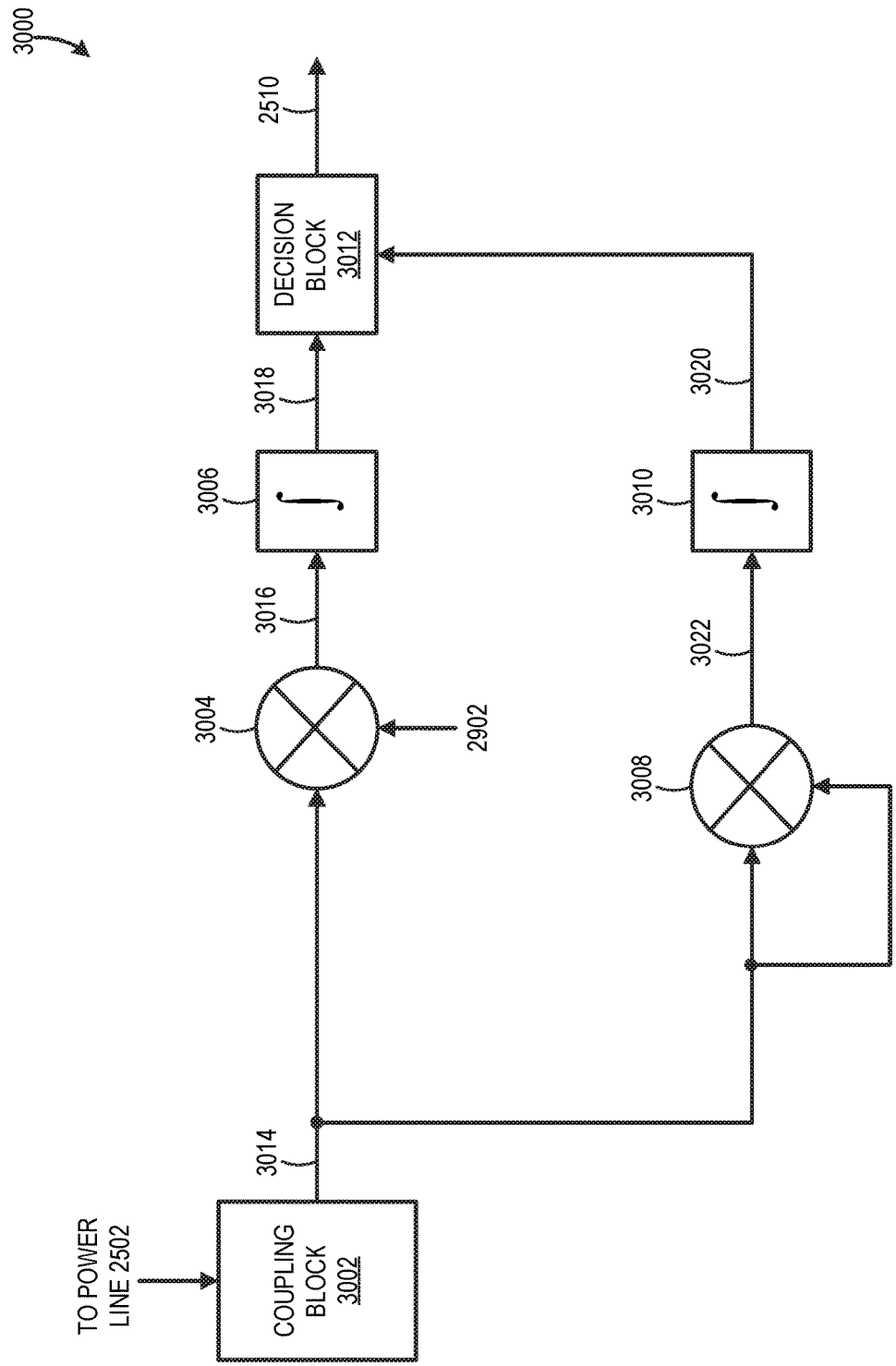
FIG. 30 illustrates one possible embodiment of an MPPT detector of the FIG. 25 photovoltaic system for use with the FIG. 29 load.

FIG. 30 illustrates an MPPT detector 3000, which is one possible embodiment of an MPPT detector for use with load 2900. MPPT detector 3000 is another embodiment of an MPPT detector 2508. MPPT detector 3000 includes a coupling block 3002, a first multiplication block 3004, a first integration block 3006, a second multiplication block 3008, a second integration block 3010, and a decision block 3012. Coupling block 3002 is analogous to coupling block 2802 of FIG. 28 and generates an AC component signal 3014 representing an AC component of either voltage Vp across power line 2502 or current Ip through power line 2502. AC component signal 3014 is either an analog signal or a digital signal, depending on the configuration of coupling block 3002.

MPPT detector 3000 asserts detection signal 2510 in response to a cross-correlation of AC component signal 3014 and sequence 2902 exceeding a reference value. In particular, first multiplication block 3004 multiplies AC component signal 3014 by sequence 2902 to generate a first multiplied signal 3016, and first integration block 3006 integrates first multiplied signal 3016 over a predetermined period T to generate a cross-correlation signal 3018. Second multiplication block 3008 multiplies AC component signal 3014 by itself to generate a second multiplied signal 3022 corresponding to each first multiplied signal 3016, and second integration block 3010 integrates each second multiplied signal 3022 over period T to generate a respective reference signal 3020 for each cross-correlation signal 3018.

Reference signal 3020 represents perfect correlation. Thus, the closer each cross-correlation signal 3018 is to its respective reference signal 3020, the greater the likelihood that the corresponding AC component signal 3014 includes an electrical signal corresponding to sequence 2902. Accordingly, decision block 3012 compares each cross-correlation signal 3018 to its respective reference signal 3020, and decision block 3012 asserts detection signal 2510 in response to a ratio of the cross-correlation signal to the reference signal exceeding a predetermined minimum threshold value.

FIGS. 31-36 illustrate examples of operation of load 2900 with several different sequences 2902. It should be appreciated, however, that load 2900 could be operated with different sequences 2902 and/or in different manners in response to sequences 2902 without departing from the scope hereof.

Figure 31:
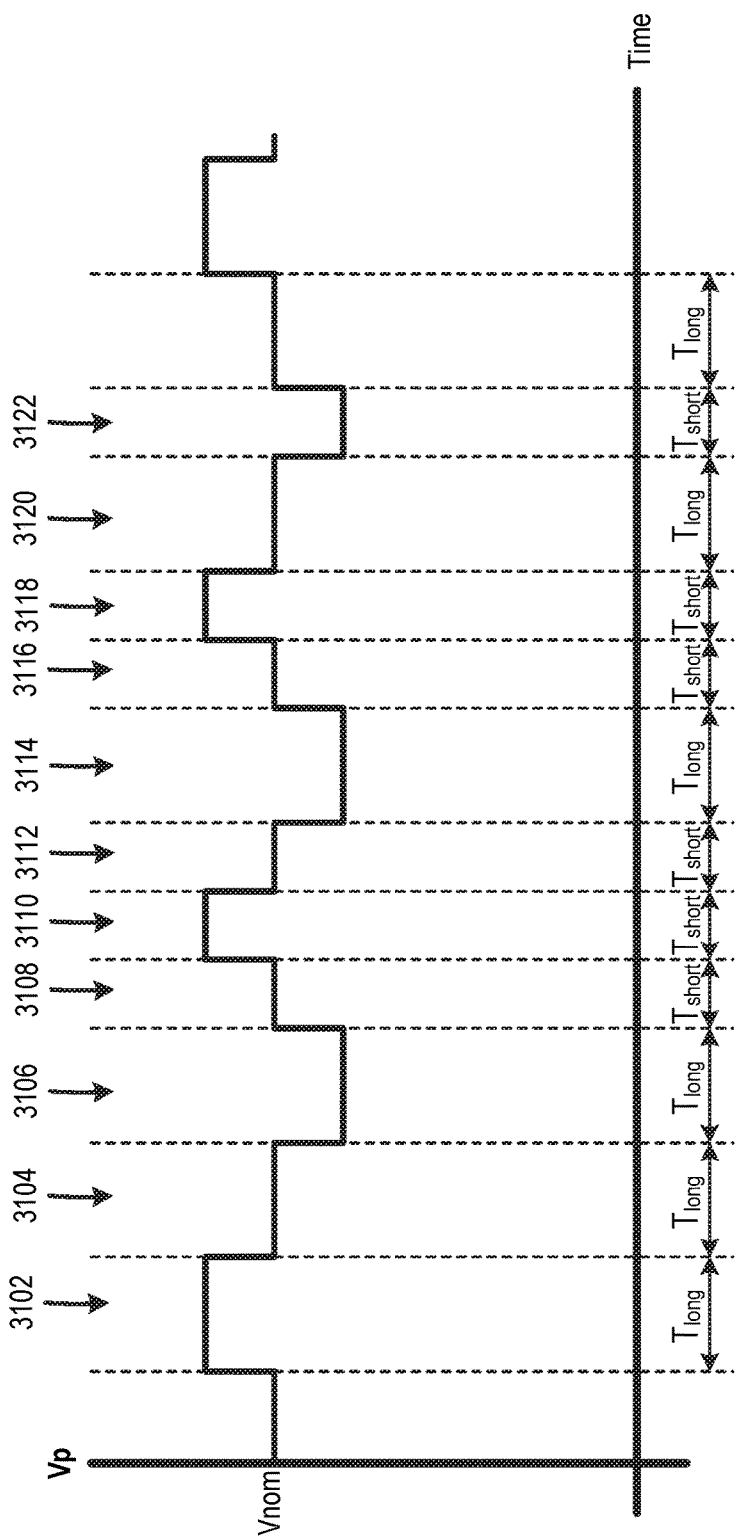
FIG. 31 is a graph illustrating one exemplary operating scenario of the FIG. 29 load according to an 11-bit Barker code, where the load modulates MPPT perturbation width according to the Barker code, according to an embodiment.

FIG. 31 is a graph of power line voltage Vp verses time illustrating one exemplary operating scenario of load 2900 where sequence 2902 is 11-bit Barker code having coefficients +1, +1, +1, −1, −1, −1 +1, −1, −1, +1, and −1, and where load 2900 modulates MPPT perturbation pulse width according to this Barker code. In particular, load 2900 perturbs voltage Vp as required to achieve system-level maximum power point operation of photovoltaic system 2500, and load 2900 modulates MPPT perturbation pulse width according to the Barker code. In the example of FIG. 31, load 2900 is perturbing voltage Vp around a nominal value Vnom to maintain maximum power point operation of photovoltaic system 2500. First through eleventh perturbations 3102-3122 have pulse widths $T_{long}$, $T_{long}$, $T_{long}$, $T_{short}$, $T_{short}$, $T_{short}$, $T_{long}$, $T_{short}$, $T_{short}$, $T_{long}$, and $T_{short}$, respectively, and this perturbation sequence repeats indefinitely. Each perturbation width $T_{long}$ corresponds to a Barker code coefficient of +1, and each perturbation width $T_{short}$ corresponds to a Barker code coefficient of −1.

Figure 32:
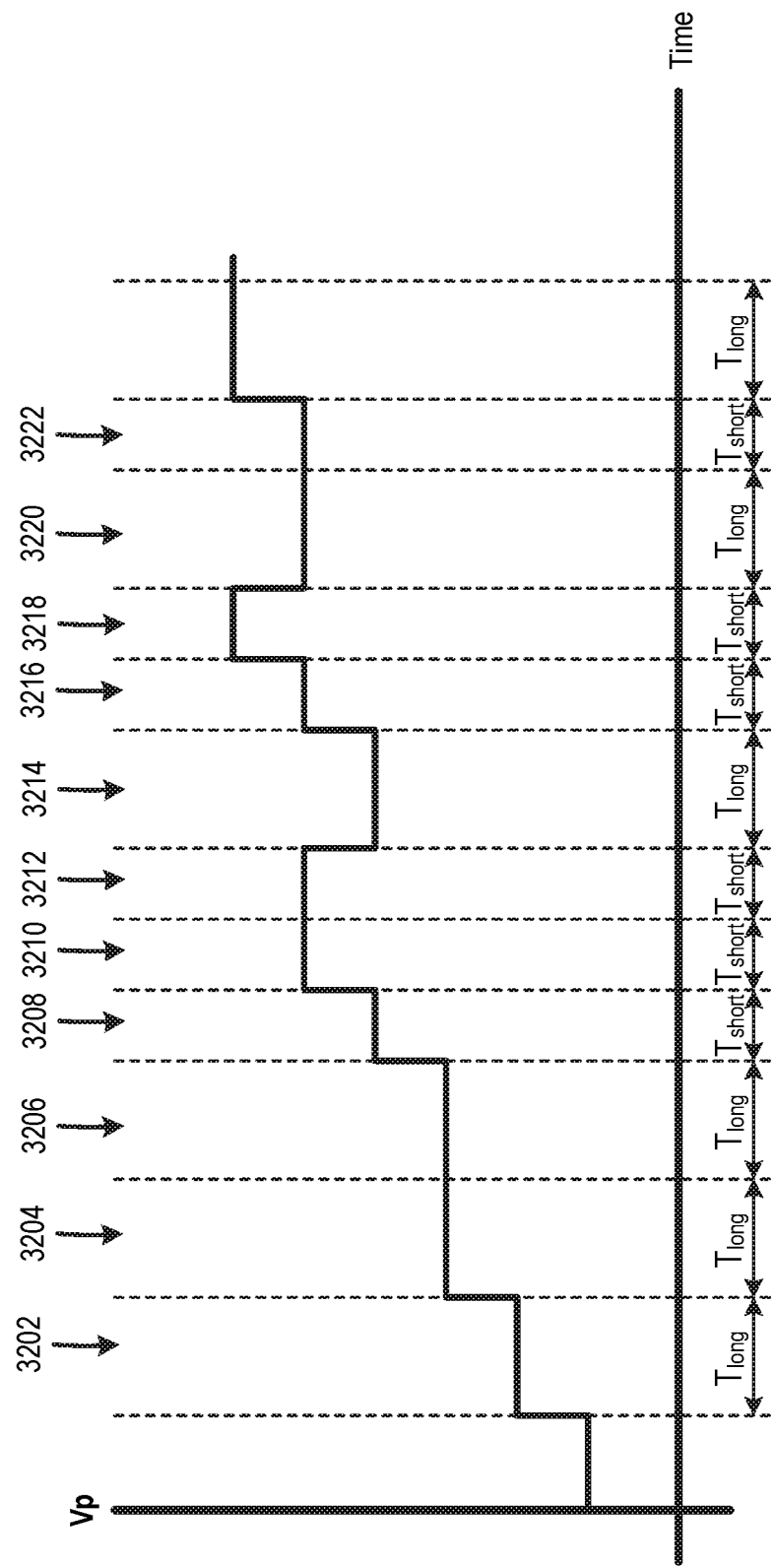
FIG. 32 is a graph illustrating another exemplary operating scenario of the FIG. 29 load according to an 11-bit Barker code, where the load modulates MPPT perturbation width according to the Barker code, according to an embodiment.

FIG. 32 is a graph of power line voltage Vp verses time illustrating another exemplary operating scenario of load 2900 where sequence 2902 is 11-bit Barker code having coefficients +1, +1, +1, −1, −1, −1 +1, −1, −1, +1, and −1, and where load 2900 modulates MPPT perturbation pulse width according to this Barker code. In this example, load 2900 is generally increasing voltage Vp over time to maintain maximum power point operation, such as in response to a change in operating conditions of photovoltaic devices 102 which requires that voltage Vp increase to maintain system-level maximum power point operation. In a manner analogous to the example of FIG. 31, load 2900 modulates MPPT perturbation pulse width according to the 11-bit Barker code to promote detection by MPPT detectors 2508. First through eleventh perturbations 3202-3222 have pulse widths $T_{long}$, $T_{long}$, $T_{long}$, $T_{short}$, $T_{short}$, $T_{short}$, $T_{long}$, $T_{short}$, $T_{short}$, $T_{long}$, and $T_{short}$, respectively, and this modulation sequence repeats indefinitely.

In another embodiment, sequence 2902 is either a first code or a second code, depending on whether load 2900 is performing a positive or negative MPPT adjustment, respectively. The first code is an 11-bit Barker code having coefficients +1, +1, +1, −1, −1, −1 +1, −1, −1, +1, and −1, and the second code is an inverse of the 11-bit Barker code and having coefficients −1, −1, −1, +1, +1, +1 −1, +1, +1, −1, and +1. Load 2900 modulates voltage Vp according to the second code to perform a positive MPPT adjustment, i.e., to increase voltage Vp to maintain system-level maximum power point operation of photovoltaic system 2500, because the second code has a net value of +1. Conversely, load 2900 modulates voltage Vp according to the first code to perform a negative MPPT adjustment, i.e., to decrease voltage Vp to maintain system-level maximum power point operation of photovoltaic system 2500, because the first code has a net value of −1.

Figure 33:
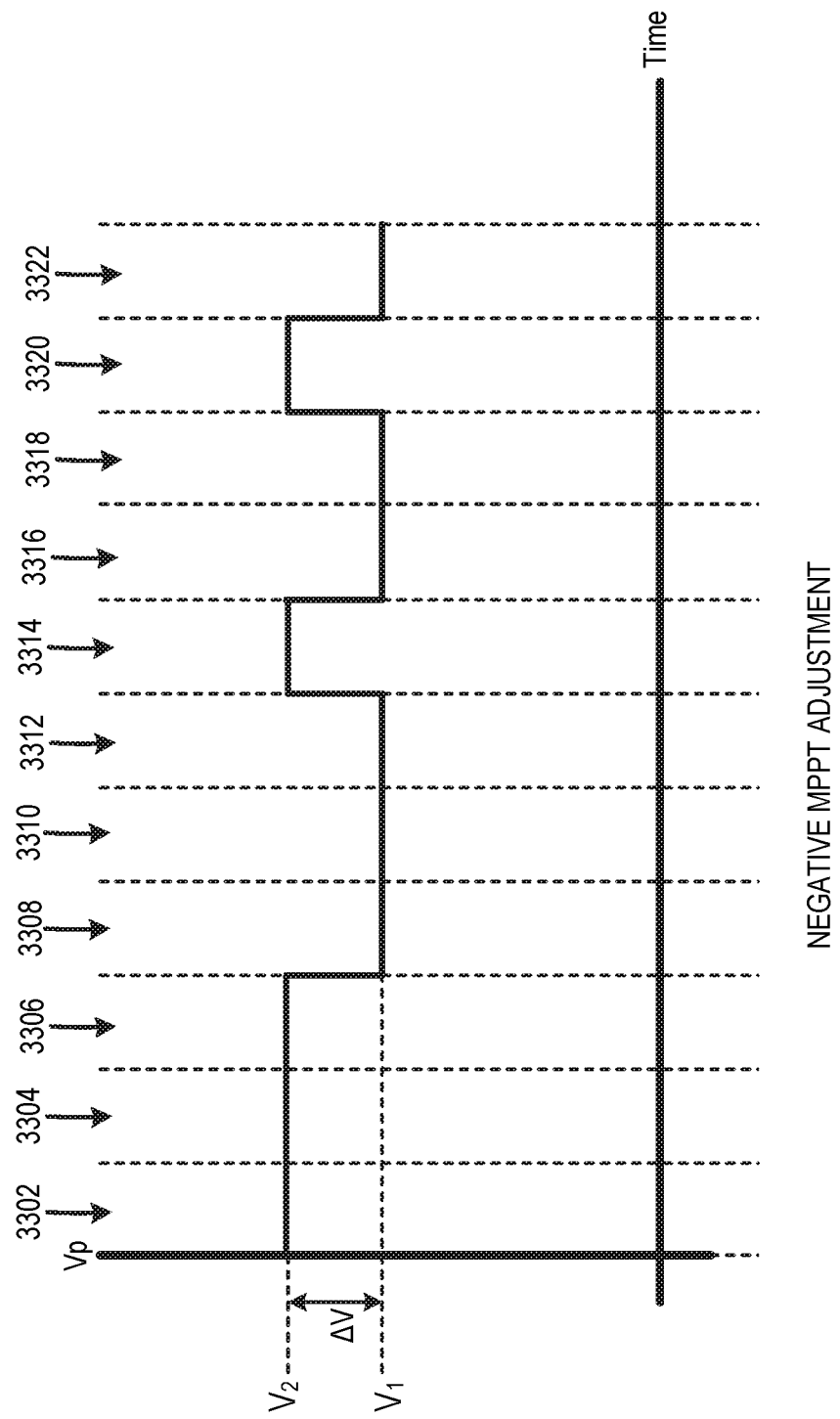
FIG. 33 illustrates an example of the FIG. 29 load modulating power line voltage Vp according to a first code to perform a negative MPPT adjustment, according to an embodiment.
Figure 34:
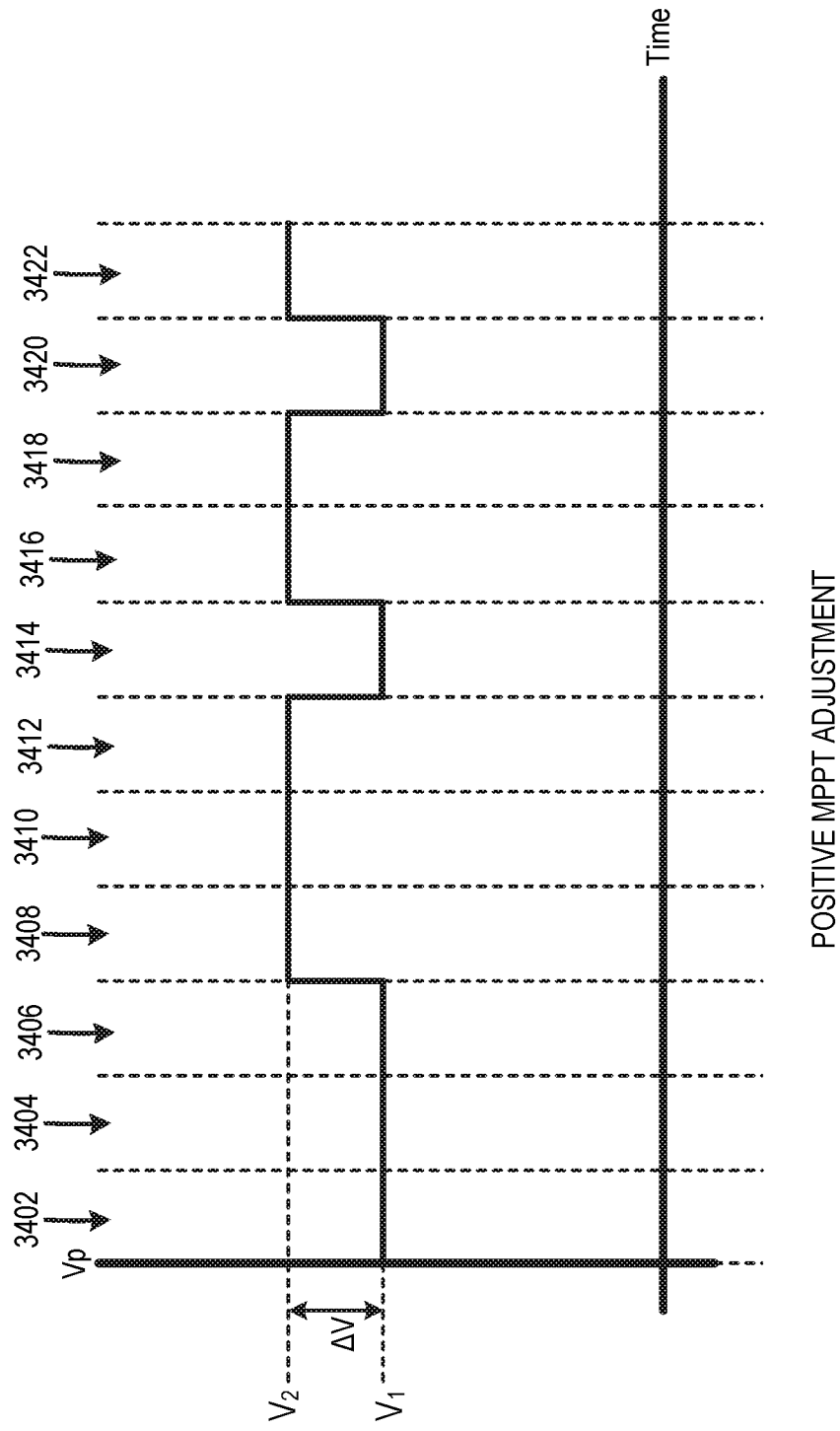
FIG. 34 illustrates an example of the FIG. 29 load modulating power line voltage Vp according to a second code to perform a positive MPPT adjustment, according to an embodiment.

FIG. 33 illustrates an example of load 2900 modulating voltage Vp amplitude according to the first code to perform a negative MPPT adjustment, and FIG. 34 illustrates an example of load 2900 modulating voltage Vp amplitude according to the second code to perform a positive MPPT adjustment. In the negative MPPT adjustment of FIG. 33, load 2900 toggles voltage Vp between a voltage $V_1$ and a voltage $V_2$ for a step of $\Delta V$ according to the first code, where perturbation pulses 3302, 3304, 3306, 3314, and 3320 each correspond to a coefficient of +1, and perturbation pulses 3308, 3310, 3312, 3316, 3318, and 3322 each correspond to a coefficient of −1. In the positive MPPT adjustment of FIG. 34, load 2900 toggles voltage Vp between voltage $V_1$ and voltage $V_2$ for a step of $\Delta V$ according to the second code, where perturbation pulses 3408, 3410, 3412, 3416, 3418, and 3422 each correspond to a coefficient +1, and perturbation pulses 3402, 3404, 3406, 3414, and 3420 each correspond to a coefficient −1.

In this embodiment, load 2900 performs negative and positive MPPT adjustments, such as respectively illustrated in FIGS. 33 and 34, as needed to maintain system-level maximum power point operation of photovoltaic system 2500. For example, if voltage Vp needs to increase to maintain system-level maximum power point operation of photovoltaic system 2500, load 2900 performs one or more positive MPPT adjustments, and if voltage Vp needs to decrease to maintain system-level maximum power point operation of photovoltaic system 2500, load 2900 performs one or more negative MPPT adjustment.

Figure 35:
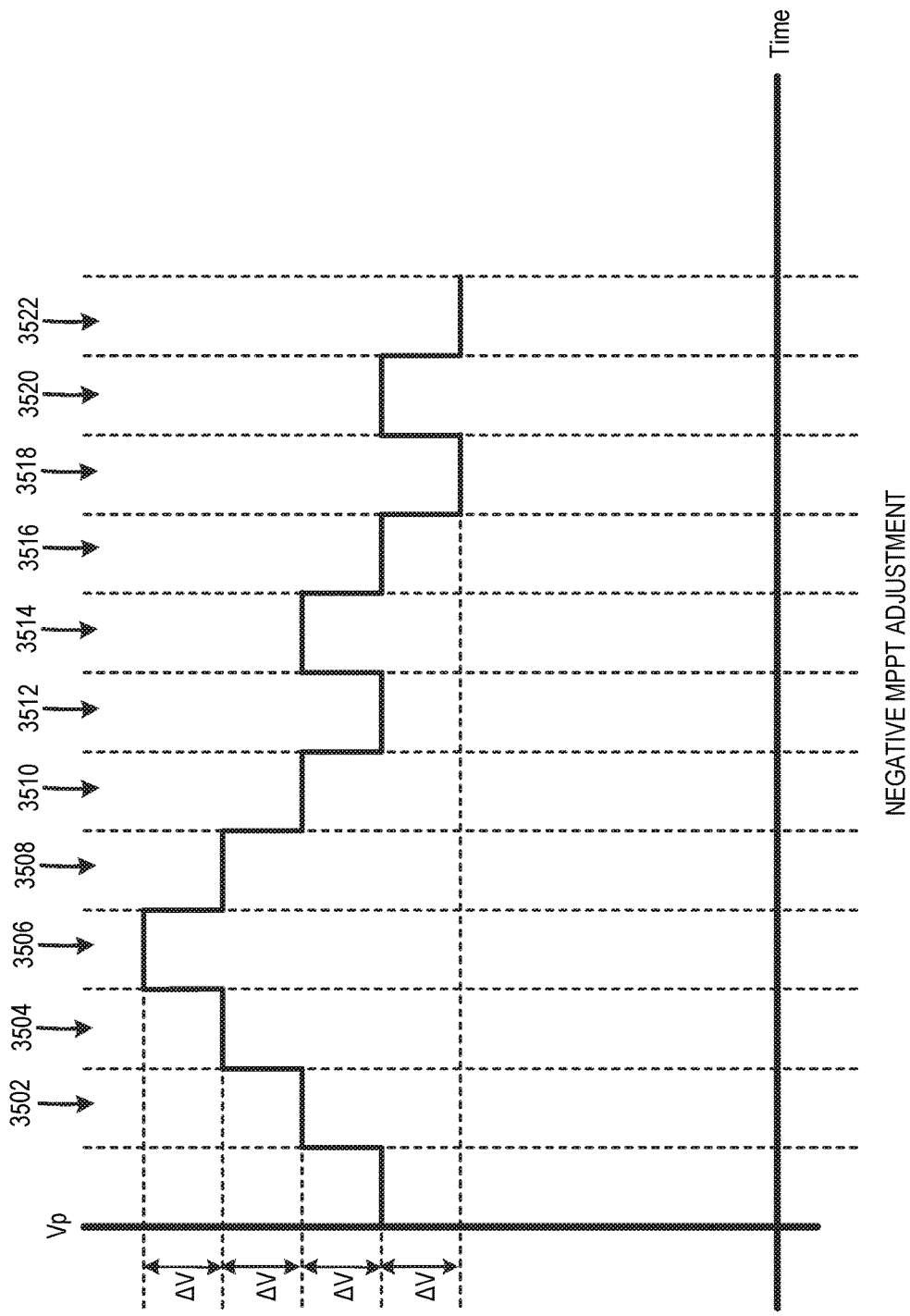
FIG. 35 illustrates an example of another embodiment of the FIG. 29 load modulating power line voltage in a cumulative manner according to the first code to perform a negative MPPT adjustment, according to an embodiment.
Figure 36:
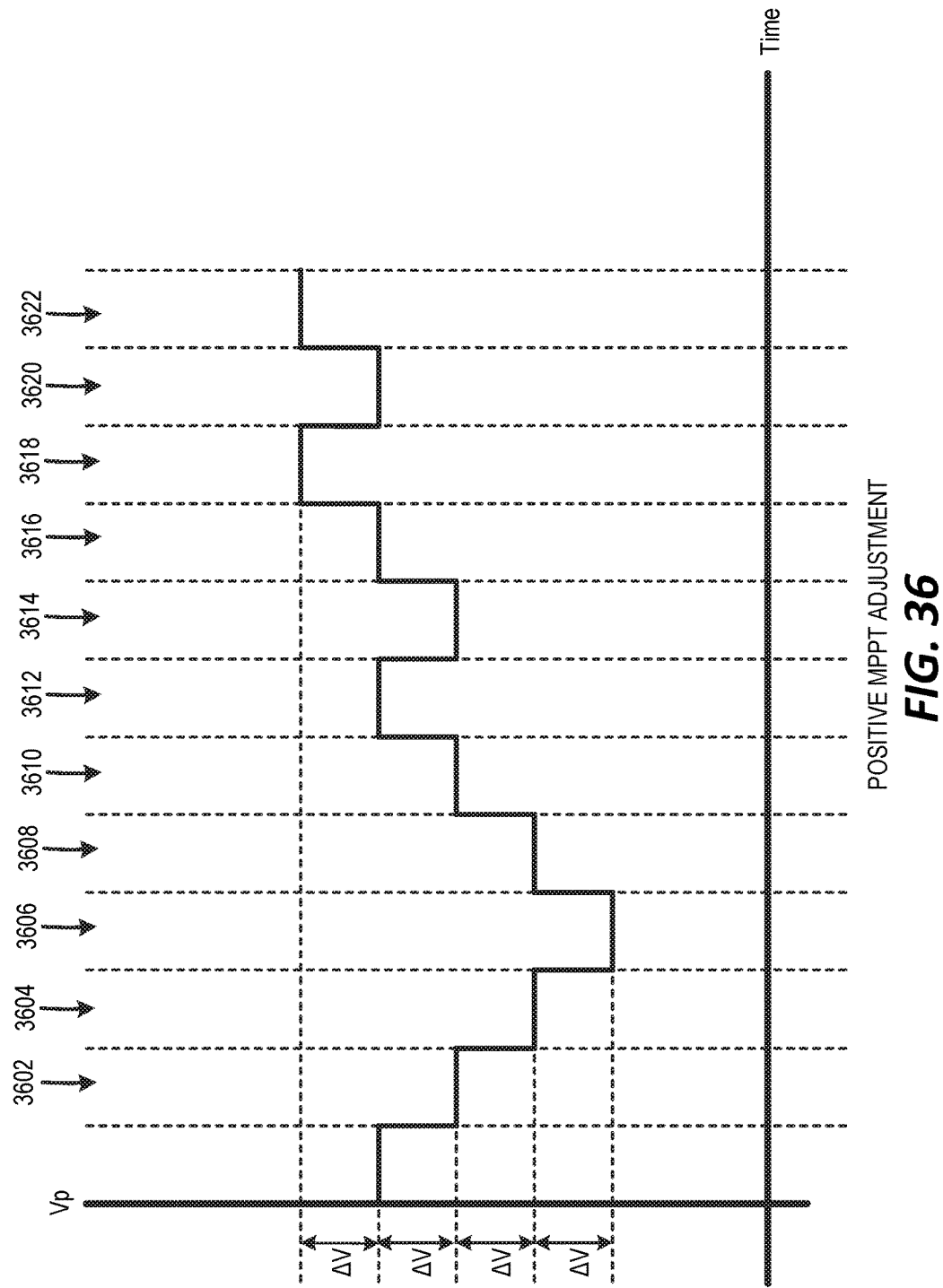
FIG. 36 illustrates an example of another embodiment of the FIG. 29 load modulating power line voltage in a cumulative manner according to the second code to perform a positive MPPT adjustment, according to an embodiment.

Load 2900 could be modified to modulate voltage Vp amplitude according to the first and second codes in a different manner than that illustrated in FIGS. 33 and 34. For example, FIG. 35 illustrates an example of another embodiment of load 2900 modulating voltage Vp amplitude in a cumulative manner according to the first code to perform a negative MPPT adjustment, and FIG. 36 illustrates an example of this embodiment of load 2900 modulating voltage Vp amplitude in a cumulative manner according to the second code to perform a positive MPPT adjustment. In each of the examples of FIGS. 35 and 36, load 2900 increases voltage Vp by $\Delta V$ in response to a coefficient of +1, and load 2900 decreases voltage Vp by $\Delta V$ in response to a coefficient of −1. In FIG. 35, each of perturbation pulses 3502, 3504, 3506, 3514, and 3520 corresponds to a coefficient of +1, and each of perturbation pulses 3508, 3510, 3512, 3516, 3518, and 3522 corresponds to a coefficient of −1. In FIG. 36, each of perturbation pulses 3608, 3610, 3612, 3616, 3618, and 3622 corresponds to a coefficient of +1, and each of perturbation pulses 3602, 3604, 3606, 3614, and 3620 corresponds to a coefficient of −1.

Modulating power line voltage Vp amplitude according to either the first or second code results in a net change to voltage Vp of a $\Delta V$. Larger net changes to voltage Vp could be obtained using a different sequence 2902. For example, modulating power line voltage Vp amplitude according to a 13-bit Barker code results in a net change of $5\Delta V$, assuming voltage changes between different Barker code coefficients by $\Delta V$. It is desirable that any sequence 2902 have good autocorrelation properties to promote detection by MPPT detectors 2508, as discussed above.

In some embodiments, sequence 2902 is used to communicate information in addition to presence of MPPT activity. In these embodiments, load 2902 changes operation of power line 2502 in the voltage, current, or power domain to represent the information, and photovoltaic system 2500 further includes one or more communication controllers configured to detect and decode the change in power line operation to obtain the information, such as using a technique similar to one or more of those discussed above with respect to FIGS. 1-19.

Figure 37:
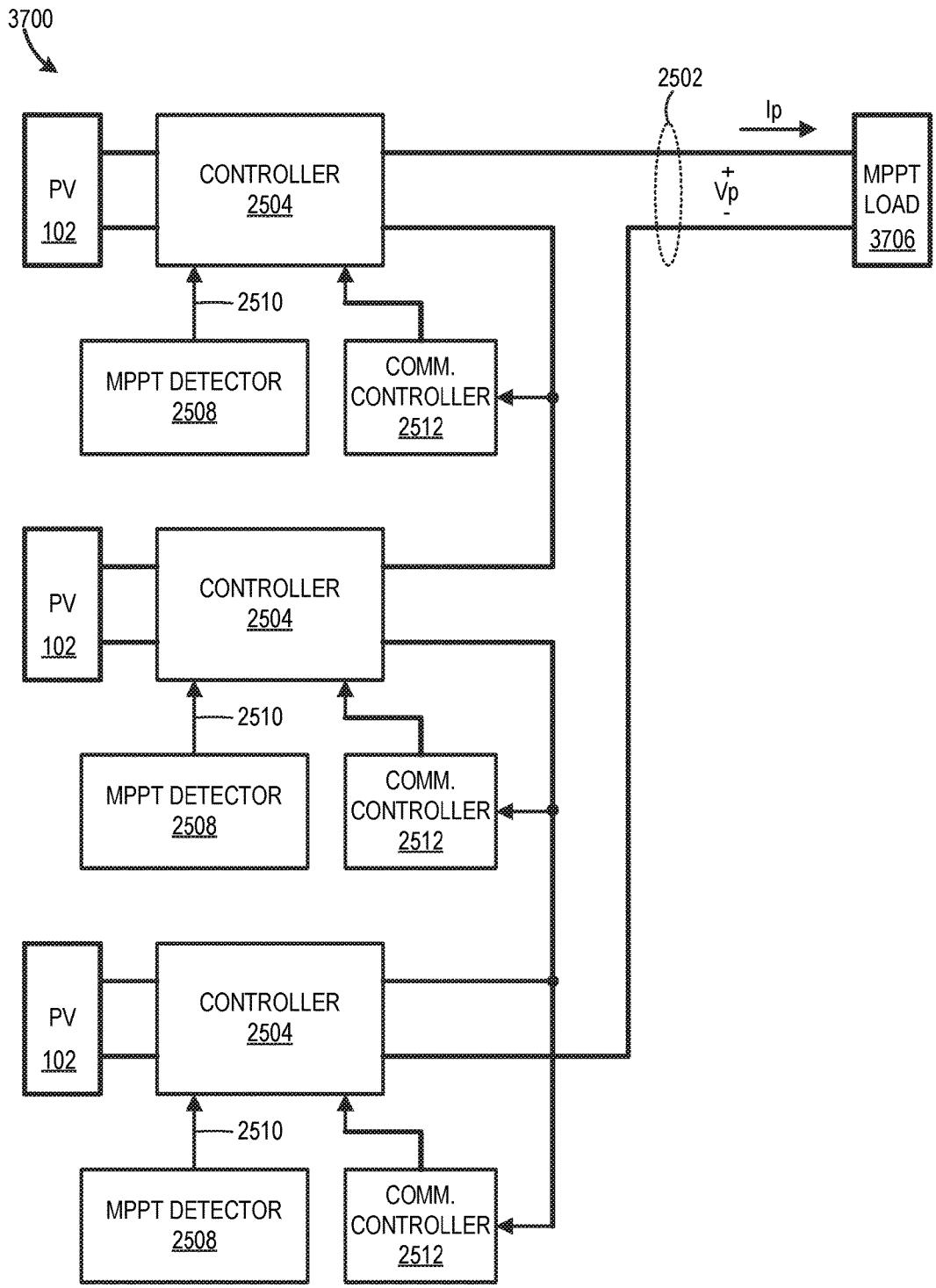
FIG. 37 illustrates a photovoltaic system that is like the FIG. 25 photovoltaic system, but further includes a respective communication controller for each photovoltaic device, according to an embodiment.

For example, FIG. 37 illustrates a photovoltaic system 3700 which is like photovoltaic system 2500 but further includes a respective communication controller 2512 for each photovoltaic device 102, and where load 2506 is replaced with load 3706. Load 3706 is like load 2506, but load 3706 is further configured to change operation of power line 2502 in the voltage, current, or power domain to communicate information, such as using a technique similar to one or more of those discussed above with respect to second communication controller 110 (FIG. 1), second communication controller 610 (FIG. 6), second communication controller 1010 (FIG. 10), and inverter 1504 (FIG. 15). Each communication controller 2512, in turn, is configured to detect and decode the change in power line operation to obtain the information, such as using a technique similar to one or more of those discussed above with respect to first communication controller 108 (FIG. 1), first communication controller 408 (FIG. 4), first communication controller 608 (FIG. 6), first communication controller 808 (FIG. 8), and first communication controller 1008 (FIG. 10).

In certain embodiments of photovoltaic system 2500, load 2506 is further configured to inject a signal mimicking MPPT activity onto power line 2502 when load 2506 is not performing MPPT. In this document, a signal mimicking MPPT activity is a signal that will be detected by MPPT detectors 2508 as MPPT activity of load 2506. For example, in some embodiments, load 2506 is configured to inject a signal mimicking MPPT activity onto power line 2506 to start-up photovoltaic system 2500, i.e., to cause MPPT detectors 2508 to change their respective detection signals 2510 from a de-asserted state to an asserted state such that each controller 2404 enables its respective photovoltaic device 102. As another example, in some embodiments, load 2506 is configured to inject a signal mimicking MPPT activity onto power line 2506 during operation outside of normal operating conditions such as during voltage limiting, current limiting, or power limiting events, to cause photovoltaic devices 102 to remain enabled. Load 2506 injects a signal mimicking MPPT activity onto power line 2502, for example, by generating perturbations in power line voltage Vp and/or in power line voltage Ip similar to those generated by load 2506 when performing MPPT. Load 2900 injects a signal mimicking MPPT activity onto power line 2502, for example, by modulating power line 2502 voltage Vp amplitude or power line 2502 current Ip amplitude according to sequence 2902 without performing MPPT.

Figure 38:
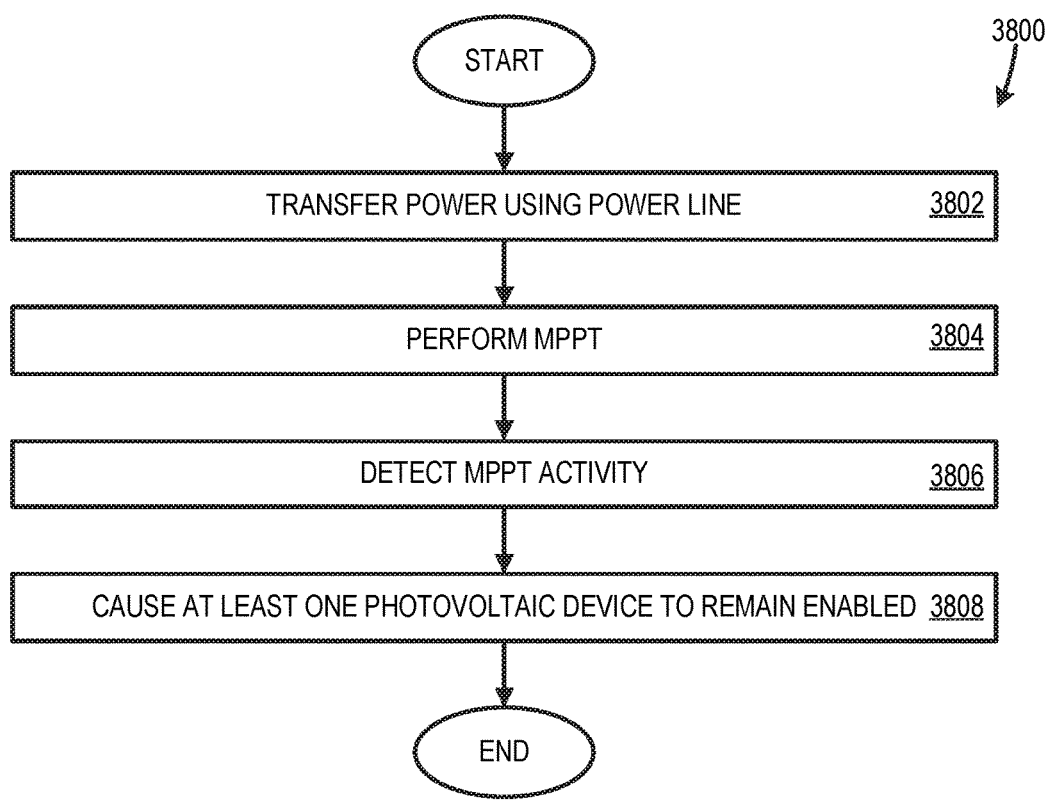
FIG. 38 illustrates yet another method for DC power line communication in a photovoltaic system, according to an embodiment.

FIG. 38 illustrates a method 3800 for DC power line communication in a photovoltaic system. In step 3802, power is transferred between at least one photovoltaic device and a load using a power line. In one example of step 3802, power generated by photovoltaic devices 102 is transferred to load 2506 via power line 2502 (FIG. 25). In step 3804, the load performs MPPT. In one example of step 3804, load 2506 performs MPPT, and in another example of step 3804, load 2900 (FIG. 29) performs MPPT while modulating power line 2502 voltage Vp amplitude, power line 2502 current Ip amplitude, or MPPT perturbation pulse width according to sequence 2902. In step 3806, MPPT activity of the load is detected. In one example of step 3806, MPPT detector 2800 (FIG. 28) detects MPPT activity of load 2506, and in another example of step 3806, MPPT detector 3000 (FIG. 30) detects MPPT activity of load 2900. In step 3808, the at least one photovoltaic device is caused to remain enabled in response to detecting MPPT activity of the load. In one example of step 3808, controller 2600 causes a respective photovoltaic device 102 to remain enabled in response to detection signal 2510 being asserted, and in another example of step 3508, controller 2700 causes a respective photovoltaic device 102 to remain enabled in response to detection signal 2510 being asserted.

Combinations of Features

Features described above may be combined in various ways without departing from the scope hereof. The following examples illustrate some possible combinations:

(A1) A method for direct current (DC) power line communication in a photovoltaic system may include (1) transferring power between a photovoltaic device and a load using a power line, (2) detecting a change in operation of the power line, and (3) in response to the detected change in operation of the power line, decoding operating state of the power line to obtain information.

(A2) In the method denoted as (A1), the step of detecting the change in operation of the power line may include at least one of (1) detecting magnitude of a DC component of a voltage on the power line dropping below a first threshold value and (2) detecting magnitude of a DC component of a current flowing through the power line rising above a second threshold value.

(A3) The method denoted as (A2) may further include changing operation of the power line by at least one of (a) causing magnitude of the DC component of the voltage on the power line to drop below the first threshold value and (b) causing magnitude of the DC component of the current flowing through the power line to rise above the second threshold value.

(A4) In the method denoted as (A3), the step of changing operation of the power line may further include at least one of (a) shunting the power line and (b) increasing current drawn by the load.

(A5) In the method denoted as (A1), the step of detecting the change in operation of the power line may include at least one of (1) detecting magnitude of a DC component of a voltage on the power line rising above a first threshold value and (2) detecting magnitude of a DC component of a current flowing through the power line falling below a second threshold value.

(A6) The method denoted as (A5) may further include changing operation of the power line by performing at least one of (1) causing magnitude of the DC component of the voltage on the power line to rise above the first threshold value and (2) causing magnitude of the DC component of the current flowing through the power line to fall below the second threshold value.

(A7) In the method denoted as (A6), the step of changing operation of the power line may further include at least one of (1) impeding flow of current through the power line and (2) decreasing current drawn by the load.

(A8) In the method denoted as (A1), the step of detecting the change in operation of the power line may include detecting magnitude of power flowing through the power line dropping below a threshold value.

(A9) The method denoted as (A8) may further include changing operation of the power line by reducing power drawn by the load.

(A10) In the method denoted as (A1), the step of detecting the change in operation of the power line may include detecting power flowing from the load to the photovoltaic device.

(A11) The method denoted as (A10) may further include changing operation of the power line by performing at least one of (1) injecting current into the power line and (2) raising a voltage on the power line.

(A12) In the method denoted as (A1), the step of detecting the change in operation of the power line may include detecting a change in polarity of a DC component of a current flowing through the power line.

(A13) The method denoted as (A12) may further include changing operation of the power line by performing at least one of (1) injecting current into the power line and (2) raising a voltage on the power line.

(A14) In any of the methods denoted as (A1) through (A13), the step of detecting the change in operation of the power line may include detecting persistence of the change in operation for at least a minimum predetermined time period.

(A15) In any of the methods denoted as (A1) through (A14), the step of detecting the change in operation of the power line may include detecting a predetermined pattern of the change in operation.

(A16) In any of the methods denoted as (A1) through (A15), the step of detecting the change in operation of the power line may include detecting a frequency of the change in operation.

(A17) In any of the methods denoted as (A1) through (A16), the step of decoding operating state of the power line may include at least one of (1) decoding a single change in operating state of the power line to obtain the information and (2) decoding a sequence of changes in operating state of the power line to obtain the information.

(A18) Any of the methods denoted as (A1) through (A17) may further include encoding operating state of the power line to represent the information, by performing at least one (1) changing magnitude of a DC component of a voltage on the power line, (2) changing magnitude of a DC component of a current flowing through the power line.

(A19) In the method denoted as (A18), the step of encoding may further include generating one or more pulses on the power line.

(A20) Any of the methods denoted as (A1) through (A17) may further include encoding operating state of the power line to represent the information, by changing polarity of a DC component of a current flowing through the power line.

(A21) In any of the methods denoted as (A1) through (A20), the steps of detecting and decoding may be performed by a communication controller co-packaged with the photovoltaic device.

(A22) In the method denoted as (A21), the information may include a disable command, and the method may further include reducing availability of power from the photovoltaic device to the power line in response to decoding the operating state of the power line to obtain the disable command.

(A23) In the method denoted as (A22), the step of reducing availability of power from the photovoltaic device to the power line may include controlling a switching circuit electrically coupled between the photovoltaic device and the power line, in a manner which reduces availability of power from the photovoltaic device at the power line.

(A24) In the method denoted as (A23), the switching circuit may have a topology selected from the group consisting of a buck-type topology, a boost-type-topology, and a buck-boost-type topology.

(A25) In the method denoted as (A22), the step of reducing availability of power from the photovoltaic device to the power line may include shorting the photovoltaic device or disconnecting the photovoltaic device from the power line.

(A26) In the method denoted as (A21), the information may include an enable command, and the method may further include increasing availability of power from the photovoltaic device to the power line in response to decoding the operating state of the power line to obtain the enable command.

(A27) In any of the methods denoted as (A1) through (A20), the steps of detecting and decoding may be performed by a communication controller that is part of a maximum power point tracking controller electrically coupled between the photovoltaic device and the power line, and the step of transferring power between the photovoltaic device and the load including causing a switching device of the maximum power point tracking controller to repeatedly switch between its conductive and non-conductive states in a manner which maximizes power transferred from the photovoltaic device to the load.

(A28) The method denoted as (A27) may further include changing an operating state of the maximum power point tracking controller in response to the information obtained in the step of decoding.

(A29) In any of the methods denoted as (A1) through (A20), the steps of detecting and decoding may be performed by a communication controller co-packaged with the load.

(A30) In the method denoted as (A29), the information may include information representing status of the photovoltaic device.

(A31) In either of the methods denoted as (A29) or (A30), the load may include an inverter for transforming power from the photovoltaic device to alternating current power, and the communication controller may be part of the inverter.

(A32) In any of the methods denoted as (A1) through (A20), the steps of detecting and decoding may be performed by a communication controller electrically coupled to the power line at a location remote from the photovoltaic device and the load.

(B1) A method for direct current (DC) power line communication in a photovoltaic system may include (1) transferring power between a photovoltaic device and a load using a power line, (2) changing operation of the power line, and (3) encoding operating state of the power line to represent information to be communicated.

(B2) In the method denoted as (B1), the step of changing operation of the power line may include at least one (1) causing magnitude of a DC component of a voltage on the power line to drop below a first threshold value and (2) causing magnitude of a DC component of a current flowing through the power line to rise above a second threshold value.

(B3) In the method denoted as (B2), the step of changing operation of the power line may further include at least one of (1) shunting the power line and (2) increasing current drawn by the load.

(B4) In the method denoted as (B1), the step of changing operation of the power line may include at least one (a) causing magnitude of a DC component of a voltage on the power line to rise above a first threshold value and (b) causing magnitude of a DC component of a current flowing through the power line to fall below a second threshold value.

(B5) In the method denoted as (B4), the step of changing operation of the power line may further include at least one of (1) impeding flow of current through the power line and (2) decreasing current drawn by the load.

(B6) In the method denoted as (B1), the step of changing operation of the power line may include decreasing power drawn by the load below a threshold value.

(B7) In the method denoted as (B1), the step of changing operation of the power line may include transferring power from the load to the photovoltaic device.

(B8) In the method denoted as (B7), the step of changing operation of the power line may further include at least one of (1) injecting current into the power line and (2) raising a voltage on the power line.

(B9) In the method denoted as (B1), the step of changing operation of the power line may include changing polarity of a DC component of a current flowing through the power line.

(B10) In the method of (B9), the step of changing operation of the power line may further include at least one of (a) injecting current into the power line and (b) raising a voltage on the power line.

(B11) In any of the methods denoted as (B1) through (B10), the step of changing operation of the power line may include changing operation of the power line for at least a minimum predetermined time period.

(B12) In any of the methods denoted as (B1) through (B11), the step of changing operation of the power line may include changing operation of the power line according to a predetermined pattern.

(B13) In any of the methods denoted as (B1) through (B12), the step of changing operation of the power line may include changing operation of the power line at a predetermined frequency.

(B14) In any of the methods denoted as (B1) through (B13), the step of encoding operating state of the power line may include at least one (1) changing magnitude of a DC component of a voltage on the power line and (2) changing magnitude of a DC component of a current flowing through the power line.

(B15) In the method denoted as (B14), the step of encoding operating state of the power line may further include generating one or more pulses on the power line.

(B16) In any of the methods denoted as (B1) through (B13), the step of encoding operating state of the power line may include changing polarity of a DC component of a current flowing through the power line.

(B17) In any of the methods denoted as (B1) through (B16), the steps of changing and encoding may be performed by a communication controller co-packaged with the load.

(B18) In the method denoted as (B17), the load may include an inverter for transforming power from the photovoltaic device to alternating current power, and the communication controller may be part of the inverter.

(B19) In the method denoted as (B18), the step of changing operation of the power line may include at least one of (1) causing the inverter to raise a voltage on the power line and (2) causing the inverter to inject current into the power line.

(B20) In any of the methods denoted as (B1) through (B19), the information to be communicated may include a command selected from the group consisting of a command to enable availability of power from the photovoltaic device and a command to reduce availability of power from the photovoltaic device.

(B21) In any of the methods denoted as (B1) through (B16), the steps of changing and encoding may be performed by a communication controller co-packaged with the photovoltaic device.

(B22) In the method denoted as (B21), the information to be communicated may include information representing status of the photovoltaic device.

(B23) In any of the methods denoted as (B1) through (B16), the steps of changing and encoding may be performed by a switching circuit electrically coupled between the photovoltaic device and the power line, and the step of changing operation of the power line may include controlling a switching device of the switching circuit.

(B24) In any of the methods denoted as (B1) through (B16), the steps of changing and encoding may be performed by a communication controller electrically coupled to the power line at a location remote from the photovoltaic device and the load.

(C1) A communication controller for direct current (DC) power line communication in a photovoltaic system may include (1) a detecting module configured to detect a change in operation of the power line and (2) a decoding module configured to, in response to the change in operation of the power line detected by the detecting module, decode operating state of the power line to obtain information.

(C2) The communication controller denoted as (C1) may further include a voltage sensing module configured to generate a voltage signal representing voltage on the power line, wherein the detecting module is further configured to monitor the voltage signal and detect the change in operation of the power line in response to the voltage on the power line dropping below or rising above a threshold value.

(C3) The communication controller denoted as (C1) may further include a current sensing module configured to generate a current signal representing current flowing through the power line, wherein the detecting module is further configured to monitor the current signal and detect the change in operation of the power line in response to the current flowing through the power line dropping below or rising above a threshold value.

(C4) The communication controller denoted as (C1) may further include a current sensing module configured to generate a current signal representing current flowing through the power line, wherein the detecting module is further configured to monitor the current signal and detect the change in operation of the power line in response to a change in polarity of the current flowing through the power line.

(C5) The communication controller denoted as (C1) may further include a power sensing module configured to generate a power signal representing power being transmitted through the power line, wherein the detecting module is further configured to monitor the power signal and detect the change in operation of the power line in response to power flowing through the power line (a) dropping below a first threshold value, (b) rising above a second threshold value, or (c) flowing through the power line from a load to a photovoltaic device.

(D1) A communication controller for direct current (DC) power line communication in a photovoltaic system may include (1) a switching device for electrically coupling to the power line and (2) a pulse control module configured to: (a) cause the switching device to change operating states and thereby change operation of the power line and (b) cause the switching device to switch to encode operating state of the power line to represent information to be communicated.

(E1) An inverter may include any one of the communication controllers denoted as (C1) through (C5) or (D1).

(F1) A photovoltaic system may include (1) the inverter denoted as (E1), (2) a photovoltaic device, and (3) a power line electrically coupling the photovoltaic device to the inverter.

(G1) A photovoltaic system may include (1) a photovoltaic device, (2) an inverter, (3) a power line electrically coupling the photovoltaic device and the inverter, and (4) any one of the communication controllers denoted as (C1) through (C5) electrically coupled to the power line, wherein the inverter is configured to perform at least one of the following steps: (a) raise a voltage on the power line to change operation of the power line, and (b) inject current into the power line to change operation of the power line.

(H1) A photovoltaic system may include (1) a photovoltaic device and (2) any one of the communication controllers denoted as (C1) through (C5) or (D1) electrically coupled to the photovoltaic device.

(H2) In the photovoltaic system denoted as (H1), the communication controller of the photovoltaic system may be part of a maximum power point tracking controller electrically coupled to the photovoltaic device.

(H3) In the photovoltaic system denoted as (H1), the communication controller of the photovoltaic system may be co-packed with the photovoltaic device.

(H4) The photovoltaic system denoted as (H1) may further include (1) a load and (2) a power line electrically coupling the photovoltaic device to the load, where the communication controller of the photovoltaic system is electrically coupled to the power line.

(I1) A method for DC power line communication in a photovoltaic system may include (1) transferring power between at least one photovoltaic device and a load using a power line, (2) maintaining a magnitude of a current flowing through the power line above a threshold value in a normal operating mode of the photovoltaic system, (3) detecting a change in operation of the power line in response to magnitude of a DC component of the current flowing through the power line falling below the threshold value, and (4) in response to the detected change in operation of the power line, decoding operating state of the power line to obtain information.

(I2) In the method denoted as (I1), the step of maintaining the magnitude of the current flowing through the power line above the threshold value in the normal operating mode of the photovoltaic system may include performing maximum power point tracking by an inverter electrically coupled to the power line in a manner which causes the magnitude of the current flowing through the power line to remain above the threshold value.

(I3) Either of the methods denoted as (I1) and (I2) may further include independently performing maximum power point tracking for each of the at least one photovoltaic device.

(I4) In any of the methods denoted as (I1) through (I3), the step of detecting the change in operation of the power line may include detecting persistence of the change in operation for at least a minimum predetermined time period.

(I5) In any of the methods denoted as (I1) through (I4), the step of detecting the change in operation of the power line may include detecting a predetermined pattern of the change in operation.

(I6) In any of the methods denoted as (I1) through (I5), the information may include a disable command, and the method may further include reducing availability of power from the at least one photovoltaic device to the power line in response to decoding the operating state of the power line to obtain the disable command.

(J1) A photovoltaic system may include (1) a power line, (2) at least one photovoltaic device electrically coupled to the power line, (3) a load electrically coupled to the power line, where the load is configured to ensure that a magnitude of current flowing through the power line remains above a threshold value during normal operation of the photovoltaic system, and (4) a communication controller configured to detect a change in operation of the power line in response to current flowing through the power line dropping below the threshold value.

(J2) In the photovoltaic system denoted as (J1), the load may include an inverter configured to perform maximum power point tracking to maximize power provided by the at least one photovoltaic device to the load in a manner which ensures that the magnitude of current through the power line remains above the threshold value.

(J3) Either of the photovoltaic systems denoted as (J1) and (J2) may further include a respective maximum power point tracking controller electrically coupled between each of the at least one photovoltaic device and the power line.

(K1) A method for DC power line communication in a photovoltaic system may include (1) transferring power between at least one photovoltaic device and a load using a power line, (2) performing MPPT by the load, (3) detecting MPPT activity of the load, and (4) in response to detecting the MPPT activity of the load, causing the at least one photovoltaic device to remain enabled.

(K2) The method denoted as (K1) may further include detecting lack of MPPT activity of the load and in response to detecting lack of MPPT activity of the load, disabling the at least one photovoltaic device.

(K3) Either of the methods denoted as (K1) or (K2) may further include (1) injecting a signal mimicking MPPT activity onto the power line, (2) detecting the signal mimicking MPPT activity as MPPT activity of the load, and (3) in response to detecting the signal mimicking MPPT activity as MPPT activity of the load, enabling the at least one photovoltaic device.

(K4) In any of the methods denoted as (K1) through (K3), the step of detecting MPPT activity of the load may include asserting a detection signal in response to an autocorrelation of an AC component signal exceeding a reference value, where the AC component signal represents an alternating current component of voltage across the power line or current through the power line.

(K5) In any of the methods denoted as (K1) through (K3), the step of performing MPPT by the load may include modulating at least one of power line voltage amplitude, power line current amplitude, or MPPT perturbation pulse width according to a sequence, and the step of detecting MPPT activity of the load may include detecting the sequence in an electrical signal on the power line.

(K6) In the method denoted as (K5), the step of detecting the sequence in the electrical signal on the power line may include asserting a detection signal in response to a cross-correlation of an AC component signal and the sequence exceeding a reference value, where the AC component signal represents an alternating current component of voltage across the power line or current through the power line.

(K7) In either of the methods denoted as (K5) or (K6), the sequence may include a pseudo noise code.

(L1) A photovoltaic system may include (1) a power line, (2) at least one photovoltaic device electrically coupled to the power line, (3) a load electrically coupled to the power line, where the load is configured to perform MPPT, (4) a MPPT detector configured to detect MPPT activity of the load, and (5) a controller configured to cause the at least one photovoltaic device to remain enabled in response to the MPPT detector detecting MPPT activity of the load.

(L2) In the photovoltaic system denoted as (L1), (1) the MPPT detector may be further configured to detect lack of MPPT activity of the load, and (2) the controller may be further configured to disable the at least one photovoltaic device in response to the MPPT detector detecting lack of MPPT activity of the load.

(L3) In either of the photovoltaic systems denoted as (L1) or (L2), the MPPT detector may be further configured to assert a detection signal in response to an autocorrelation of an AC component signal exceeding a reference value, where the AC component signal represents an alternating current component of voltage across the power line or current through the power line.

(L4) In either of the photovoltaic systems denoted as (L1) or (L2), the load may be further configured to modulate at least one of power line voltage amplitude, power line current amplitude, or MPPT perturbation pulse width according to a sequence, and the MPPT detector may be configured to detect MPPT activity of the load by detecting the sequence in an electrical signal on the power line.

(L5) In the photovoltaic system denoted as (L4), the MPPT detector may be further configured to assert a detection signal in response to a cross-correlation of an AC component signal and the sequence exceeding a reference value, where the AC component signal represents an alternating current component of voltage across the power line or current through the power line.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween

What is claimed is:

1. A method for direct current (DC) power line communication in a photovoltaic system, comprising:
    transferring power between at least one photovoltaic device and a load using a power line;
    performing maximum power point tracking (MPPT) by the load;
    detecting MPPT being performed by the load; and
    in response to detecting the MPPT being performed by the load, causing the at least one photovoltaic device to remain enabled,
    wherein the steps of performing MPPT and detecting MPPT are performed by different respective devices.

2. The method of claim 1, further comprising:
    detecting lack of MPPT being performed by the load; and
    in response to detecting lack of MPPT being performed by the load, disabling the at least one photovoltaic device.

3. The method of claim 2, further comprising, after the step of the disabling the at least one photovoltaic device:
    injecting a signal mimicking MPPT activity onto the power line;
    detecting the signal mimicking MPPT activity as MPPT being performed by the load; and
    in response to detecting the signal mimicking MPPT activity as MPPT being performed by the load, enabling the at least one photovoltaic device.

4. The method of claim 2, wherein the step of detecting MPPT being performed by the load comprises asserting a detection signal in response to an autocorrelation of an AC component signal exceeding a reference value, the AC component signal representing an alternating current component of voltage across the power line or current through the power line.

5. The method of claim 2, wherein:
    the step of performing MPPT by the load comprises modulating at least one of power line voltage amplitude, power line current amplitude, or MPPT perturbation pulse width according to a sequence; and
    the step of detecting MPPT being performed by the load comprises detecting the sequence in an electrical signal on the power line.

6. The method of claim 5, wherein the step of detecting the sequence in the electrical signal on the power line comprises asserting a detection signal in response to a cross-correlation of an AC component signal and the sequence exceeding a reference value, the AC component signal representing an alternating current component of voltage across the power line or current through the power line.

7. The method of claim 6, the sequence comprising a pseudo noise code.

8. A photovoltaic system, comprising:
    a power line;
    at least one photovoltaic device electrically coupled to the power line;
    a load electrically coupled to the power line, the load configured to perform maximum power point tracking (MPPT);
    a MPPT detector separate from the load and configured to detect MPPT being performed by the load; and
    a controller configured to cause the at least one photovoltaic device to remain enabled in response to the MPPT detector detecting MPPT being performed by the load.

9. The photovoltaic system of claim 8, wherein:
    the MPPT detector is further configured to detect lack of MPPT being performed by the load; and
    the controller is further configured to disable the at least one photovoltaic device in response to the MPPT detector detecting lack of MPPT being performed by the load.

10. The photovoltaic system of claim 9, wherein the MPPT detector is further configured to assert a detection signal in response to an autocorrelation of an AC component signal exceeding a reference value, the AC component signal representing an alternating current component of voltage across the power line or current through the power line.

11. The photovoltaic system of claim 9, wherein:
    the load is further configured to modulate at least one of power line voltage amplitude, power line current amplitude, or MPPT perturbation pulse width according to a sequence; and
    the MPPT detector is configured to detect MPPT being performed by the load by detecting the sequence in an electrical signal on the power line.

* * * * *